United States Patent [19]

Nakayama et al.

[11] Patent Number: 5,041,978
[45] Date of Patent: Aug. 20, 1991

[54] POWER TRAIN CONTROL APPARATUS

[75] Inventors: Yasunari Nakayama, Kure; Mitsuru Nagaoka, Hiroshima, both of Japan

[73] Assignee: Mazda Motor Corporation, Hiroshima, Japan

[21] Appl. No.: 465,757

[22] Filed: Jan. 16, 1990

[30] Foreign Application Priority Data

Jan. 17, 1989 [JP] Japan .................................... 1-9570

[51] Int. Cl.$^5$ ..................... B60K 17/34; B60K 28/00; B60K 41/20
[52] U.S. Cl. ................................ 364/426.03; 180/197
[58] Field of Search ....................... 364/426.03, 426.02, 364/424.1; 180/197, 233, 248; 303/99

[56] References Cited

U.S. PATENT DOCUMENTS

| 4,154,487 | 5/1979 | Vannani | 180/197 |
| 4,849,891 | 7/1989 | Krohn et al. | 364/426.03 |
| 4,884,651 | 12/1989 | Harada et al. | 364/426.03 |
| 4,967,869 | 11/1990 | Nagaoka et al. | 180/197 |
| 4,981,190 | 1/1991 | Nakayama et al. | 180/197 |

FOREIGN PATENT DOCUMENTS 60-248440 12/1985 Japan .
61-268529 11/1986 Japan .
63-41245 2/1988 Japan .

Primary Examiner—Parshotam S. Lall
Assistant Examiner—Gary D. Yacura
Attorney, Agent, or Firm—Price, Heneveld, Cooper, DeWitt & Litton

[57] ABSTRACT

The control apparatus eliminates the adverse effects upon a moving vehicle caused by interference between two control operations taking place at the same time. For example, the control of torque applied to the wheels simultaneously subjected to wheel slip control can cause competing contradictory instructions to be issued to control the rotation of the wheel. When a wheel undergoing slip control is instructed by the torque split control to increase torque, the torque split control is cancelled. When the torque split control decreases the torque applied to a wheel and the wheel continues to slip, the wheel is subjected to slip control and the torque applied is reduced to prevent slip. When a wheel undergoing slip control has increased torque applied, the slip of the wheel is monitored and the torque is reudced to bring the slip below a predetermined limit.

13 Claims, 24 Drawing Sheets

| NUMBER OF SLIPPED WHEELS (SN) | SLIPPED WHEEL | | CONTROL |
|---|---|---|---|
| 1 | | | BRAKE CONTROL ONLY (EBF = 1, ETF = 0) |
| 2 | FL, FR | | BRAKE CONTROL AND THROTTLE CONTROL (EBF = ETF = 1) (TGTR = TG3 × γ) |
| | FL, RL / FR, RR | | BRAKE CONTROL AND THROTTLE CONTROL (EBF = ETF = 1) (TGTR = TG2 × γ) |
| | FL, RR / FR, RL | | BRAKE CONTROL ONLY (EBF = 1, ETF = 0) |
| 3 | | SIMULTANEOUSLY | THROTTLE CONTROL ONLY (EBF = 0, ETF = 1) (TGTR = TG2 × γ) |
| | | NOT SIMULTANEOUSLY | BRAKE CONTROL AND THROTTLE CONTROL (EBF = ETF = 1) (TGTR = TG2 × γ) |
| 4 | | | STOP BRAKE CONTROL (EBF = 0) TGTR = 0 (FULL CLOSED) |

FIG. 2A (SLIP CONTROL)

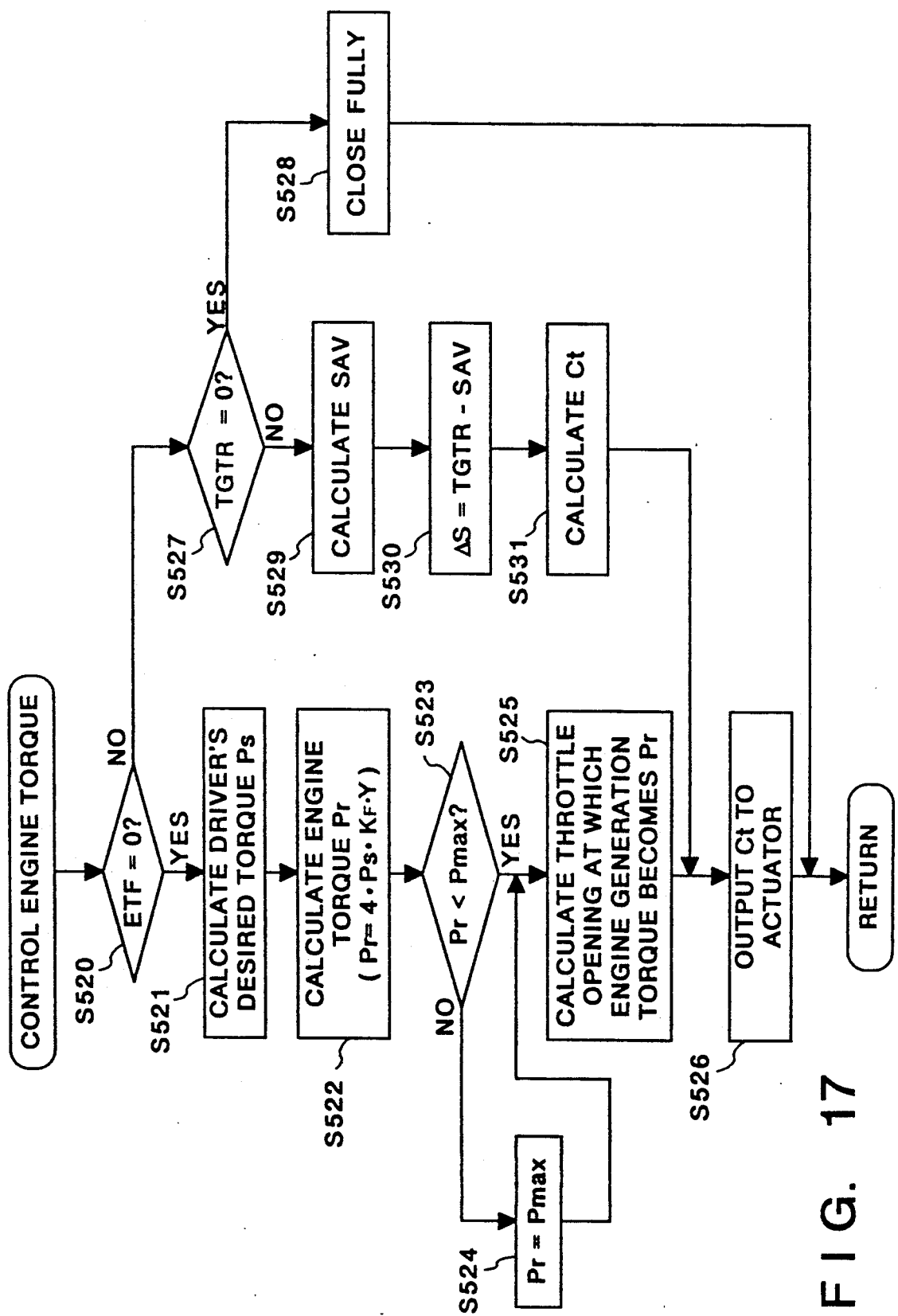
F I G. 17

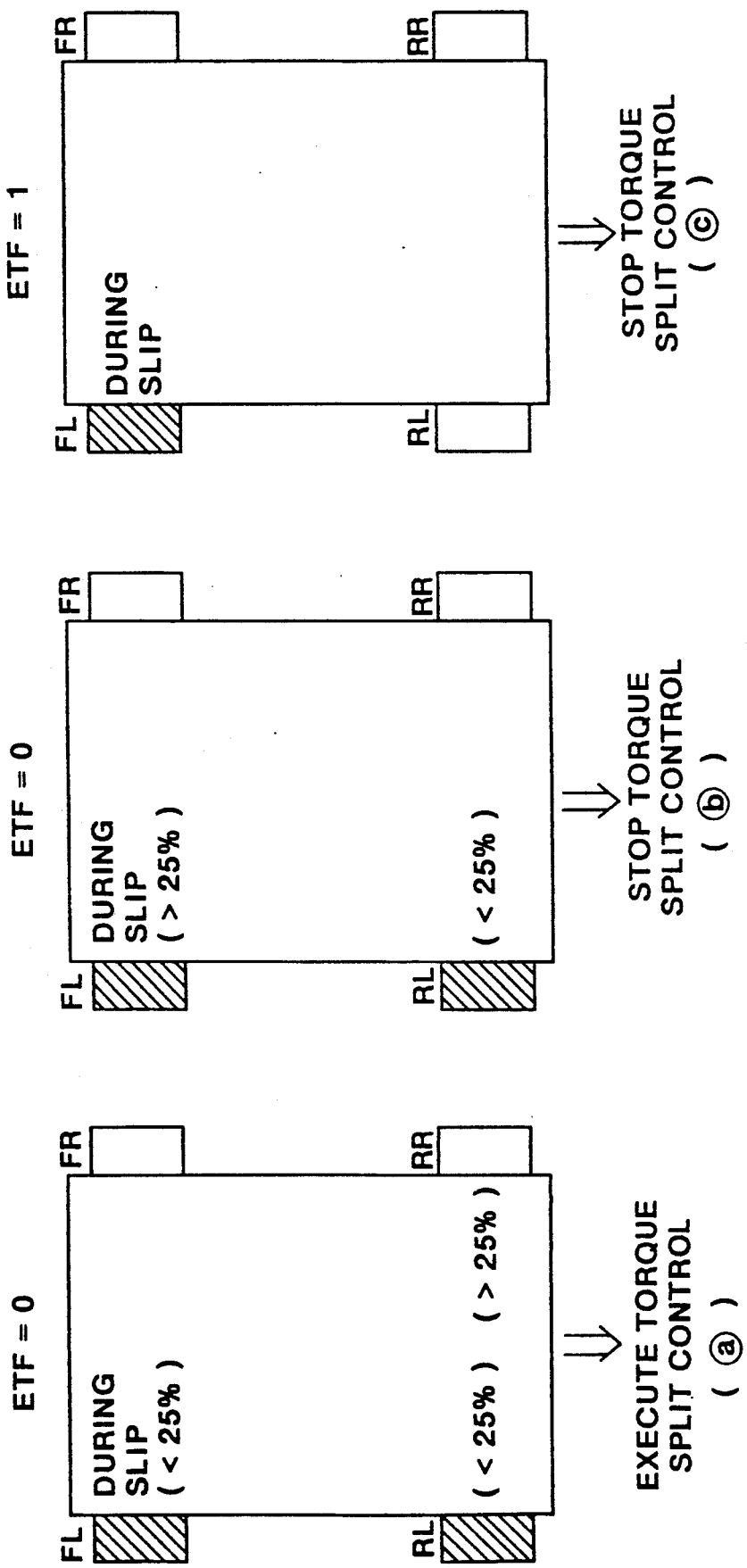

POWER TRAIN CONTROL APPARATUS

BACKGROUND OF THE INVENTION

1. Field of the Invention

The present invention relates to a power train control apparatus having a torque distribution control function capable of varying the torque distribution to the front wheels and the rear wheels, or to the right wheels and the left wheels of a four-wheel drive vehicle or the torque distribution to the right wheel and the left wheel of a two-wheel drive vehicle and a slip control function capable of varying the braking force to be applied to each of the wheels in accordance with the state of slip of each of the wheels.

Hitherto, a torque distribution control (or a torque split control) and a slip control (or a traction control) have been conducted in order to improve the running stability of vehicles. The former control is a control to properly distribute the engine torque to each of the wheels in order to particularly improve the running performance on a curve or at the time of start of the vehicle. Namely, the torque distribution control performed as described above is conducted to correspond to the change in the load, to be applied to wheels, in accordance with the change in the attitude of the vehicle due to the change in the operation of the accelerator or the operation of the steering wheel. The slip control is conducted so as to control the slip ratio for the purpose of causing the state of the slip of the wheels to be taken place suitably. Namely, the slip control is conducted for the purpose of controlling the slip of the wheels caused from reasons (for example, running on a low-resistance road) which are individual from the operation performed by the driver.

As described above, the torque distribution control and the slip control have been respectively developed for the different purposes, and which are respectively conducted in different systems. However, since the above-described two control operations cause the torque for rotating the wheels to be changed, one of the control operation necessarily influences the other control operation. Therefore, an object of the control apparatus according to the present invention is to eliminate adverse effects upon the vehicle running caused from the interference between the two control operations.

Then, a variety of disclosed or suggested conventional technologies relating to the slip control and/or the torque distribution control will be described in terms of the structure, the operation and the problems involved therein prior to making the specific description about the thesis and the structure of the present invention.

Hitherto, a variety of technological ideas, for distributing different torque levels to the four wheels in, for example, a four-wheel drive vehicle (abbreviated to "a 4WD vehicle" hereinafter), has been suggested. For example, a technological means has been disclosed in Japanese Patent laid-Open No. 60-248440 in which the output from the engine is distributed to each of the wheels by a center differential gear and individual brake means is provided for each of the four wheels in order to independently control force for braking the wheels. As a result, when slip takes place in each of the wheels due to the state of the road, braking force is applied to the wheel which is being slipped. Thus, the force for rotating the wheel, which is being slipped, can be reduced. When the wheel, which is being slipped, is braked as described above, the difference in torque takes place in each of the other wheels. Therefore, a proper force for operating each of the four wheels can be obtained.

Since a vehicle is positioned in contact with the ground with the four wheels thereof, performance about the allowable slip is restricted by a frictional force of the tire defined by a product ($\mu \cdot W$) of the friction coefficient $\mu$ of the road and a load W applied to the tire (the wheel). If the sum of the vectors of the components of the force applied to the tire, such as the rotating force, the braking force, centrifugal force and the like, is out of the above-described tire frictional force, a stable running performance of the vehicle cannot be obtained.

When the load W applied to the tire is shifted due to a longitudinal or lateral acceleration generated during the operation of the vehicle, the load applied to the four wheels becomes different from each other, causing the ability of the tires supporting the action of the vehicle to be also different from each other. In particularly, when the friction coefficient $\mu$ from the road is low, the influence of the load W upon the vehicle running becomes critical.

Therefore, the above-described 4WD vehicle achieves stable running performance even if the road has the low friction coefficient $\mu$ by properly distributing the wheel rotating torque to the four wheels and thereby reducing the load to be applied to each of the tires.

However, if the four wheels are coupled to one another by a center differential gear, the same wheel rotating torque is distributed to the front wheels and the rear wheels. As a result, the wheel to which a relatively light load is applied can be easily slipped. Therefore, performance of the vehicle is restricted by the tire whose ability has deteriorated, while the performance of the tire, whose load has been enlarged, cannot be exhibited.

However, when the 4WD vehicle of the type described above is arranged such that different torque is distributed to, for example, the front and rear wheels in order to overcome the above-described problem, each of the wheels can further effectively exhibit the road gripping performance. However, a structure, constituted such that the above-described torque distribution is changed by the adjustment of the strength of the connection (the frictional force) established in a clutch disposed in the above-described center differential gear, necessarily causes a great engine output to be directly distributed to the clutch. It leads to a problem in that the size of the clutch portion is enlarged and thereby the limitation occurs in mounting the clutch device. Therefore, the weight of the clutch device must be enlarged and the cost is thereby raised.

However, the above-described conventional technology, which is structured such that the brake device is provided for each of the front wheels and the rear wheels so as to be independently operated and the wheel which is being slipped is braked when the front wheel or the rear wheel is slipped, causes the vehicle speed to be reduced. Therefore, the running performance of the vehicle deteriorates, and particularly the accelerating performance of the same deteriorates.

Therefore, a torque split control system was suggested recently which is structured in accordance with the following knowledges: the state in which different torque is distributed to the front wheels and the rear wheels or to the right wheels and the left wheels is necessary takes place mainly in two cases, that is, a case in which the friction coefficient μ of the road is a small level and the running mode is the acceleration mode in which the wheel load is shifted due to the acceleration, and another case, that is, a turning mode in which centrifugal force is applied to the same wheel in addition to the wheel rotating force. Since there is, in usual, a great surplus torque in the engine output in the state described above, a certain engine output loss is permitted. Therefore, even if the torque split control is conducted, the vehicle does not encounter the deceleration in the vehicle speed. It leads to a fact that the necessity of providing a mechanism, which directly varies the amount of the torque to be transmitted, in the torque transmission passage can be eliminated.

The torque split control apparatus of this type, for use in a 4WD vehicle arranged such that the engine output is, as described above, transmitted to each of the four wheels, comprises: engine-output control means for controlling the change in the engine output; and braking force control means for controlling the independent change in the braking force to be applied to the front and rear wheels or the right and the left wheels. The operation of the engine-output control means and that of the braking force control means are controlled by torque distribution change means whereby the torque distribution to four wheels can be changed by the action of the braking force to be applied to any of four wheels by the braking force control means and by increase in the engine output, which corresponds to the above-described braking force, said increase being conducted by the engine output control means.

The above-described torque split control apparatus for use in the 4WD vehicle is arranged in such a manner that the front and rear wheels or the right and the left wheels whose torque is intended to be reduced is applied with a predetermined braking force by the braking force control means, while an engine output which corresponds to the torque reduced due to the braking force thus applied is distributed to the other wheels by the engine-output control means. As a result, the total engine output including increase in the engine output can be properly distributed to the front and the rear wheels. The torque, to be transmitted to the wheel on which the braking force acts, is reduced by the quantity which corresponds to the applied braking force. Therefore, torque which actually acts on the road from all of the wheels is the same torque before the above-described torque distribution is conducted, that is, before the braking operation. Namely, only torque to be transmitted to the wheel which is braked is reduced and torque to be transmitted to the wheel which is not braked is relatively enlarged.

As a result, the road-gripping force of the wheel which is being slipped is enlarged, causing the slip of this wheel to be prevented. Therefore, the running stability of the vehicle can be improved.

Furthermore, there is a so-called slip control (a traction control) system for controlling the driven wheels of a 4WD vehicle arranged similarly to the above-described torque split control system. If the wheel slips excessively on a road, the vehicle cannot usually run with the road gripped by its wheels. Therefore, proper running characteristics cannot be obtained due to a drift-out caused from wheel spins. In this case, a slip control apparatus for controlling the slip of the driven wheel with respect to the road is used, the slip control apparatus being arranged in such a manner that the brake device provided for the vehicle is operated similarly to the case where the above-described split control is conducted or the engine output is reduced for the purpose of preventing the occurrence of the slip of the driven wheels.

When the slip of the driven wheel on a road is prevented by the slip control apparatus of the type described above, it is necessary for the state in which the driven wheel slips on the road by a quantity exceeding a predetermined level to be detected. In addition, it is necessary for the vehicle speed to be first detected in order to determine a slip ratio or the like which serves as a reference of the driven wheel which is being slipped by a quantity exceeding a predetermined level. The vehicle speed can be relatively easily detected in accordance with the circumferential speed of the follower wheel which does not frequently slip in the case of a 2WD vehicle arranged such that only the front or the rear wheels are driven. However, it is difficult to detect it in the case of the 4WD mode of the 4WD vehicle where both the front wheels and the rear wheels can be driven as described above since there are no follower wheels.

A slip control apparatus for use in a 4WD vehicle has been suggested as disclosed in, for example, Japanese Patent Laid-Open No. 62-289429 in order to overcome the problems taken place when the slip ratio in the 4WD vehicle is detected. The slip control apparatus is arranged in such a manner that: the circumferential speed of each of the four wheels is obtained; the state in which each of the wheels slips by a quantity exceeding a predetermined level with respect to a road is detected on the basis of the thus-obtained circumferential speed; and the vehicle speed is specifically estimated on the basis of the minimal circumferential speed of the wheels.

The slip control apparatus for a 4WD vehicle, arranged such that the state in which each of the wheels slips on a road can be detected and the vehicle speed can be estimated, performs a control when a wheel slip with respect to a road by a quantity exceeding a predetermined level is detected, the control being arranged to reduce the torque for rotating the wheel from which the slip state exceeding a predetermined level has been detected in order to cause the slip ratio or the quantity of the slip of the wheel from which the slip state exceeding a predetermined level has been detected. The target value in the control described above is determined regardless of the number of the wheels from which the slip state exceeding a predetermined level has been detected.

In general, the number of the wheels of a 4WD vehicle from which the slip on a road has been detected becomes the number which corresponds to the state of the vehicle running or the road condition (the friction coefficient of the road or the like). The greater the number of the wheels which slips by a quantity exceeding a predetermined level, the larger the influence upon the running stability of the vehicle is. Therefore, it is preferable that the target slip ratio or the quantity of the slip be determined to a low level and thereby the running stability of the vehicle be first secured at the time of the slip control in inverse proportion to the number of the wheels from which the slip state exceeding a predetermined level has been detected. On the contrary, the target slip ratio or the quantity of the slip be determined to a high level and thereby the running characteristics of the vehicle such as the accelerating performance or the cruising performance be first secured at the time of the slip control in inverse proportion to the number of the wheels from which the slip state exceeding a predetermined level has been detected.

Recently, a precise slip control apparatus for a 4WD vehicle has been disclosed which is arranged to act when the slip state exceeding a predetermined level has been detected from any of the wheels of the 4WD vehicle, the slip control apparatus being provided with torque control means for changing the torque acting on the wheel from which the slip state exceeding a predetermined level has been detected. Thus, the slip ratio or the quantity of slip of the wheel is caused to agree with a predetermined target value. Furthermore, a target slip ratio or the same of the quantity of slip are determined in accordance with the vehicle running state or the road condition so that desired running characteristics can be obtained with the running stability of the vehicle secured substantially.

As described above, the slip control (the traction control) of the driven wheel and the torque distribution control (the torque split control) of the same contribute to achieve the stable running of the vehicle and thereby improve the driving stability and the accelerating performance. However, the inventors of the present invention found a fact that a vehicle provided with the above-described two systems can arise the following problem when the two systems are simultaneously operated:

For example, there are two case in which the above-described slip control operation is obstructed by the torque distribution (the torque split) control conducted in accordance with the quantity of movement of the vehicle body or the quantity of the operation of the driver and another case in which the same is not obstructed. Therefore, the torque distribution control must be conducted in accordance with the state of the vehicle. That is, when there is a fear that the slip control is obstructed and thereby the vehicle running stability deteriorates, the torque distribution control must be cancelled. However, if the torque distribution control is conducted and only the slip control is conducted in the other case, the accelerating performance of the vehicle deteriorates inevitably.

On the other hand, when the torque distribution control is conducted as described above in accordance with the quantity of movement of the vehicle body or the quantity of the operation by the driver, the performance of each of the tires for each of the front and rear wheels can be caused to exhibit maximally as described above. However, if the force to rotate the wheel is enlarged by a level exceeding the limit of the performance of the tires which becomes different depending upon the road condition (in particular, the friction coefficient $\mu$ of a road), the wheel spin cannot be prevented. For example, the limit difference in the performance of tires due to the state of the action of the vehicle is reduced on a road whose friction coefficient $\mu$ is a low level such a snowy road. In this case, the increase in the distribution of the wheel rotating force can cause the spins of the wheels depending upon the positions of the wheels or the number of the wheels.

In order to prevent the spin taken place in the above-described case, it is effective to conduct the above-described slip control so as to reduce the torque acting on the wheel. However, if the above-described torque distribution control is rapidly shifted to the slip control, the wheels from which the rotating force must be reduced lose their controlling ability with respect to the road. Furthermore, the rapid change in the distributed quantity of the wheel rotating force causes the vehicle to move instably.

SUMMARY OF THE INVENTION

To this end, an object of the present invention is to quickly secure the running stability when a wheel, which is being subjected to a slip control, is subjected to a torque distribution control, the running stability being established by quickly stopping slip of the wheel, which is being slip-controlled, by preventing increase in the torque distributed to the wheel, which is being slip-controlled, by a torque distribution control operation.

In order to achieve the above-described object, according to the present invention, there is provided a power train control apparatus for totally controlling a transmission of engine output torque to wheels, the power train control apparatus comprising:

torque distribution means for independently distributing the engine output torque to each of the wheels with controlling the quantity of torque to be distributed;

slip control means for detecting a slipped state of each of the wheels and controlling the level of the slip of thus detected slipped wheel so as reduce slip below a predetermined level;

determination means for determining whether or not torque, to be transmitted to a wheel which is subjected to the slip control by the slip control means, is increased when the torque distribution means further acts on the wheel; and torque restricting means arranged to receive an output from the determination means for the purpose of controlling the slip control means and/or the torque distribution means so as to reduce torque to be transmitted to at least the wheel which is subjected to the slip control when torque to be transmitted to the wheel which is subjected to the slip control is increased, whereby torque to be transmitted to the wheel is restricted.

A further object of the present invention is to prevent a wheel, to which a reduced torque is distributed in a torque distribution control, from a novel slip when the wheel, which is being subjected to a torque distribution control, is subjected to a slip control, the prevention being established by controlling increase in the torque distributed to the wheel.

In order to achieve the above-described object, according to the present invention, there is provided a power train control apparatus for controlling the overall transmissions of engine output torque to wheels, the power train control apparatus for totally controlling a transmission of engine output torque to wheels, the power train control apparatus comprising:

torque distribution means for independently distributing the engine output torque to each of the wheels with controlling the quantity of torque to be distributed;

slip control means for controlling slip of the wheels so as to reduce the slip below a predetermined level;

first detection means for detecting a wheel which is subjected to a slip control performed by the slip control means;

second detection means arranged to receive an output from the detection means for the purpose of detecting a fact that the slip control is applied to the wheel which is subjected to the slip control when the torque distribution means is being operated; and restricting means arranged to receive an output from the second detection means for the purpose of restricting increase in torque to be applied to the wheel which is subjected to the slip control when torque to be distributed to the wheel which is subjected to the slip control exceeds a predetermined level.

Other objects and advantages of the invention will become apparent during the following discussion of the accompanying drawings, wherein:

BRIEF DESCRIPTION OF THE DRAWINGS

FIG. 2A shows a table which lists aspects of the slip controls according to the embodiments;

FIG. 17 is a flow chart of the sub-routine in the engine torque control according to the second embodiment;

FIGS. 20A to 20C illustrate the second interference state according to the second embodiment.

DETAILED DESCRIPTION OF THE PREFERRED EMBODIMENT

Figure 1:
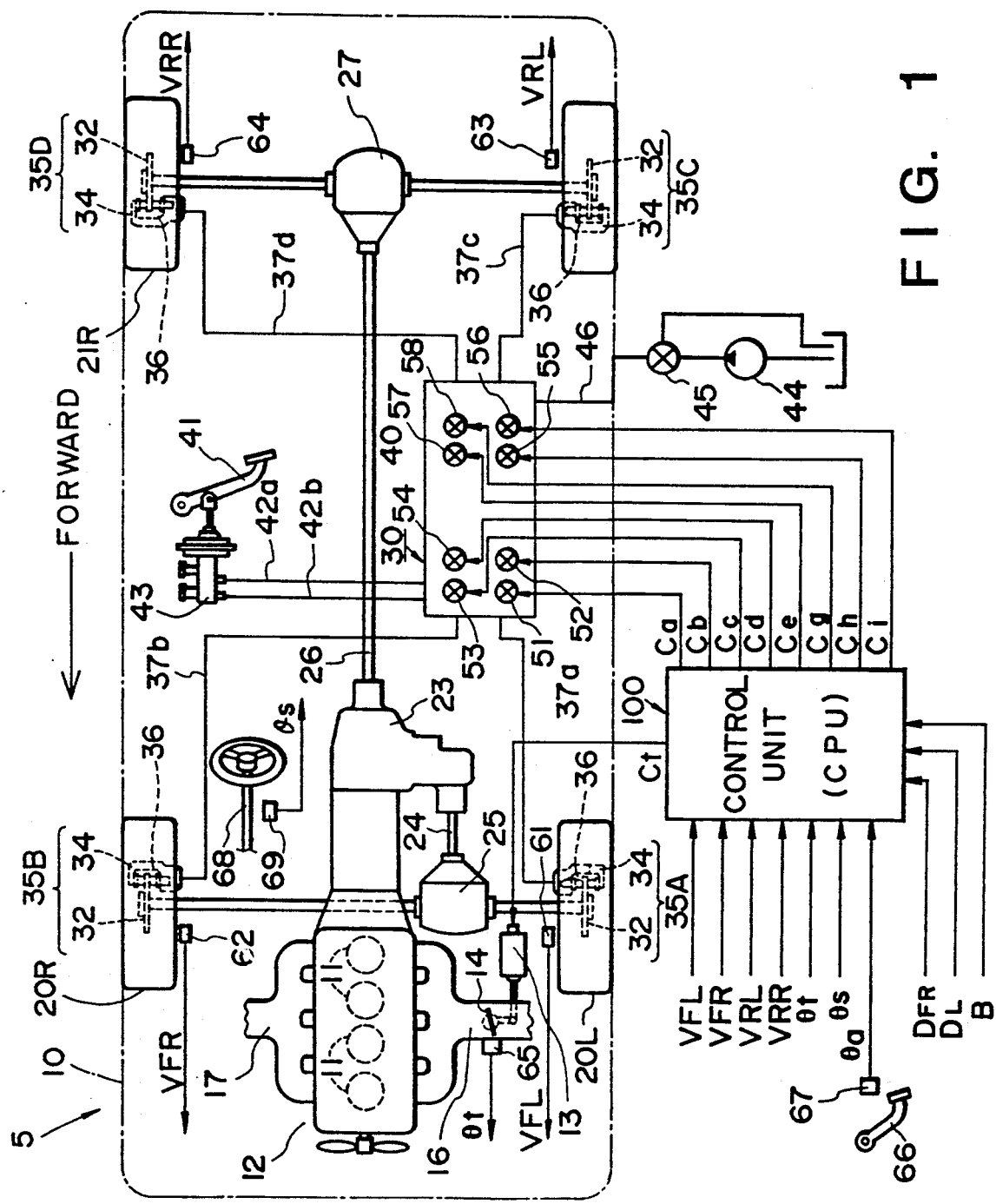
FIG. 1 illustrates the overall structure of a control system common to a first and second embodiments of a power train control apparatus according to the present invention.

Then, a first and a second embodiments of a power train control apparatus according to the present invention will be described.

According to the embodiments, a torque distribution control (a torque split control) in accordance with a change in the load distribution to the wheels is, for example, conducted in such a manner that the degree of braking to be applied to the wheel whose torque is desired to be reduced is increased, while the degree of braking to be applied to the wheel whose torque is desired to be increased is reduced. The engine torque derived for use as the braking force is compensated by increasing the overall engine output.

A slip control for making the state of the wheel slip proper is achieved by: a brake control arranged in such a manner that a target slip ratio is determined for each of the wheels and a proper braking force is applied to each of the wheels so as to establish the target slip ratios; and an engine torque control for controlling the slip ratios of the wheels by controlling the engine output in accordance with the difference between the target slip ratios and an average slip ratio.

The control apparatus according to the first embodiment is arranged such that the torque split control in which the torque applied to the wheel is able to properly correspond to change in the load applied to the wheel and the slip control (the traction control) for eliminating the wheel slip are independently conducted so as to improve the vehicle running stability and the accelerating performance.

The control apparatus according to the second embodiment is constituted in order to overcome a problem, which can be arisen in the control apparatus according to the first embodiment in that the slip control and the torque split control interfere with each other since the above-described two controls are independently conducted. The states of the interference are classified into the following two cases:

(1) When the wheel which is to be slip-controlled since it is being slipped is independently subjected to the torque split control, torque for rotating this wheel can be increased due to the torque split control. Since the increase in the rotating torque causes slip to become excessive, the torque increase due to the torque split control is prevented in the wheel which is subjected to the slip control. The state of interference of the type described above is called "a first interference state" in the second embodiment to be described later.

(2) The control described in (1) is characterized in that the increase in the torque for rotating the wheel, which is being subjected to the slip control, is prevented and further slip can be thereby prevented. However, torque of a wheel to which reduced torque is applied is increased by the prohibition of the torque distribution. As a result, an excessive rotating force is applied to this wheel, causing a fear of a dangerous drift-out to occur. Therefore, if the control mode is shifted to the slip control, the wheel to which torque applied has been reduced is arranged to be subjected to the slip control regardless of whether or not the wheel is actually slipping for the purpose of preventing a novel wheel slip.

First, the structure of hardware of the apparatus which is common to both the first and the second embodiments will be described prior to the description of the control operation of the first embodiment and the second embodiment.

System Structure

FIG. 1 schematically illustrates the overall structure of the system of the apparatus according to the first and the second embodiments, FIG. 1 also illustrating the basic structure of a 4WD vehicle to which the embodiments above are applied.

Referring to FIG. 1, a straight four-cylinder engine 12 is, for example, mounted on the front portion of a car body 10 of a 4WD vehicle. The engine 12 comprises four cylinders 11 each of which is arranged to be supplied with air-fuel mixture of a predetermined air-fuel ratio and formed by fuel supplied from a fuel supply system and sucked air, the air-fuel mixture being supplied through an intake passage 16 in which a throttle valve 14, which is arranged to be electrically opened/closed by a throttle actuator 13, is provided. The air-fuel mixture supplied to the cylinders 11 is exhausted through an exhaust passage 17 after the air-fuel mixture has been burnt due to the action of an ignition system consisting of an ignition plug, a distributor, an igniter and the like. The combustion of the air-fuel mixture causes the engine 12 to be rotated, torque generated from the engine 12 then passing through a torque transmission passage including a transmission 22, a center differential mechanism 23, a front-wheel propeller shaft 24, a differential mechanism 25, a rear-wheel propeller shaft 26, and a differential mechanism 27. Then, the torque is transmitted to a front left wheel 20L, a front right wheel 20R, a rear left wheel 21L and a rear right wheel 21R, respectively.

A brake control portion 30 is provided, the brake control portion 30 being communicated with the front left wheel 20L, the front right wheel 20R, the rear left wheel 21L and the rear right wheel 21R. The brake control portion 30 has disc brakes 35A to 35D each of which comprises a disc 32 and a caliper 34 having a brake pad pressing the disc 32, the disc 32 being provided for each of the front left wheel 20L, the front right wheel 20R, the rear left wheel 21L and the rear right wheel 21R. The caliper 34 provided for each of the disc brakes 35A to 35D is provided with a wheel cylinder 36. Pipes 37a to 37d, extending from a liquid-pressure adjustment portion 40, are connected to the corresponding wheel cylinders 36. When liquid braking pressure is supplied to the wheel cylinders 36 from the liquid-pressure adjustment portion 40 through the pipes 37a to 37d, the calipers 34 presses the brake pads to the discs 32 at a pressure of the level corresponding to the supplied liquid braking pressure. As a result, the front left wheel 20L, the front right wheel 20R, the rear left wheel 21L and the rear right wheel 21R are independently braked.

Liquid pressure of a level corresponding to the movement of a brake pedal 41 is supplied to the liquid pressure adjustment portion 40 from a power cylinder 43 provided so as to accompany with the brake pedal 41 through pipes 42a and 42b. Furthermore, operating liquid pressure formed by a pump 44 and a regulating valve 45 is supplied to the liquid pressure adjustment portion 40 through a pipe 46. The liquid pressure adjustment portion 40 is arranged to conduct a normal brake control operation in a normal mode in which no traction control, that is, no slip control is conducted, the normal brake control operation being conducted in such a manner that: it forms liquid braking pressure of a level corresponding to the movement of the brake pedal 41 so as to supply the liquid braking pressure to the disc brakes 35A to 35D through the pipes 37a to 37d. The liquid pressure control portion 40 acts, in the slip control mode, so as to form liquid braking pressure of levels respectively corresponding to the disc brakes 35A to 35D depending upon the states of the included electromagnetic valves 51 to 58, the liquid braking pressure being then selectively supplied by the same to the disc brakes 35A to 35D.

The electromagnetic valves 51 to 58 are arranged to form a pair consisting of the electromagnetic valves 51 and 52, a pair consisting of the electromagnetic valves 53 and 54, a pair consisting of the electromagnetic valves 55 and 56 and a pair consisting of the electromagnetic valves 57 and 58. The pairs thus formed are respectively arranged to take part in the adjustments of the liquid braking pressure to be applied to the disc brakes 35A to 35D provided for the corresponding front left wheel 20L, front right wheel 20R, rear left wheel 21L and rear right wheel 21R. When the electromagnetic valves 51, 53, 55 and 57, each of which is one of the components of the pairs, are opened and the electromagnetic valves 52, 54, 56 and 58, each of which is another component of the pairs, are closed, the level of the braking pressure to be supplied to the disc brakes 35A to 35D is raised. On the contrary, when the electromagnetic valves 51, 53, 55 and 57, each of which is one of the components of the pairs, are closed and the electromagnetic valves 52, 54, 56 and 58, each of which is another component of the pairs, are opened, the level of the braking pressure to be supplied to the disc brakes 35A to 35D is lowered. Furthermore, when all of the above-described electromagnetic pairs are closed, the level of the liquid braking pressure to be supplied to the disc brakes 35A to 35D is retained.

The actions of the electromagnetic valve 51 to 58 are controlled by control signals Ca to Ch supplied from a brake control portion in a control unit 100, as described later, so as to be used in the desired controls.

That is, according to this embodiment, a control unit 100 is provided in addition to the above-described components, the control unit including a brake control portion for controlling the actions of the above-described electromagnetic valves 51 to 58, a throttle control portion for controlling the operation of the above-described throttle actuator 13 and a torque distribution control portion for distribution torque to each of the wheels. The control unit 100 is arranged to receive signals VFL, VFR, VRL and VRR representing the circumferential speed of the corresponding wheels, that is, the front left wheel 20L, the front right wheel 20R, the rear left wheel 21L and the rear right wheel 21R, the signals being obtained from speed sensors 61 to 64 which are provided for the corresponding wheels, that is, the front left wheel 20L, the front right wheel 20R, the rear left wheel 21L and the rear right wheel 21R.

The control unit 100 also receives the opening degree ($\theta t$) of the throttle vale 14, the opening degree ($\theta t$) being obtained from a sensor 65 for detecting the degree of opening of the throttle valve 14. Furthermore, the control unit 100 receives a movement $\theta a$ of an accelerator pedal 66 and a signal $\theta s$ representing the steering angle of the front left wheel 20L and that of the front right wheel 20R, the signal $\theta s$ being obtained from a steering-angle sensor 69 provided so as to be communicated with the steering wheel 68.

Signals for use in the controls are shown on the following table 1:

TABLE 1

| Types | Sig's | Meaning |
|---|---|---|
| Input Signals | VFL | Circumferential speed of front left wheel |
| | VFR | Circumferential speed of front right wheel |
| | VRL | Circumferential speed of rear left wheel |
| | VRR | Circumferential speed of rear right wheel |
| | Θa | Displacement of accelerator |
| | Θt | Degree of opening of throttle |
| | Θs | Steering angle |
| | β | Boost pressure |
| | DFR | Acceleration in the longitudinal direction of car body |
| | DL | Acceleration in the lateral direction of car body |
| Output Signals | Ca to Ch | Brake control signals |
| | Ct | Throttle driving signal |
| Working Data | Vn | Estimated vehicle speed |
| | TGBR | Target slip ratio of braking |
| | TGTR | Target slip ratio of throttle |
| | SFL | Actual slip ratio of front left wheel |
| | SFR | Actual slip ratio of front right wheel |
| Working Data | SRL | Actual slip ratio of rear left wheel |
| | SRR | Actual slip ratio of rear right wheel |
| | SN | Total number of wheel which are being slipped |
| | SSN | Number of wheels slipped simultaneously |
| | SFFL | Flag showing slip of front left wheel (1: generation of slip) |
| | SFFR | Flag showing slip of front right wheel (1: generation of slip) |
| | SFRL | Flag showing slip of rear left wheel (1: generation of slip) |
| | SFRR | Flag showing slip of rear right wheel (1: generation of slip) |
| | EBF | Flag for executing brake control (1: execution of control) |
| | ETF | Flag for executing throttle control (1: execution of control) |
| | SAV | Average slip ratio |
| | VAV | Average speed of car body |
| | SFQ | Flag for determining slip (1: generation of slip) |
| | γ | Correction coefficient for slip ratio |
| | ε | Deviation of speed |
| | TG1 to TG3 | Constants for target slip ratio |
| | KB | Basic ratio of distributing engine output torque to two rear wheels |
| | KF | Final ratio of distributing engine output torque to two rear wheels |
| Working Data | Y | Ratio of distributing engine output torque to two right wheels |
| | Ps | Engine output desired by driver |
| | PR | Necessary engine output |
| | PMAX | Maximum engine output |
| | FO | Torque distribution flag (1: torque to be distributed to front wheels is larger than rear wheels, 0: torque to be distributed to front wheels is smaller than rear wheels) |
| | Fl | Turn flag (1: left turn, 0: right turn) |

Outline of Control

Then, the outline of the control performed in accordance with the first embodiment will be described.

The control unit 100 receives the above-described detection signals VFL, VFR, VRL and VRR at a predetermined cycle. The control unit 100 then calculates the estimated vehicle speed and the circumferential acceleration in accordance with the circumferential speed of each of the front left wheel 20L, the front right wheel 20R, the rear left wheel 21L and the rear right wheel 21R, the circumferential speed being denoted by each of the detection signals VFL, VFR, VRL and VRR. Thus, the control unit determines whether or not each of the front left wheel 20L, the front right wheel 20R, the rear left wheel 21L and the rear right wheel 21R has slipped by a degree exceeding a predetermined level by making comparisons between the circumferential speed thus calculated and a predetermined reference value Aa. If the control unit 100 determines the circumferential speed of any of front left wheel 20L, the front right wheel 20R, the rear left wheel 21L and the rear right wheel 21R exceeds the predetermined value Aa, it is determined that slip exceeding a predetermined level has taken place. As a result, the control unit 100 performs the slip control. On the other hand, if the control unit 100 determines the circumferential speed of any of front left wheel 20L, the front right wheel 20R, the rear left wheel 21L and the rear right wheel 21R is lower than the predetermined value Aa, the control unit 100 performs the normal throttle open degree control.

When the normal throttle open degree control is performed, a target throttle open degree is determined in accordance with the movement of the accelerator pedal 66 denoted by the accelerator movement detection signal $\theta a$. Furthermore, the throttle valve operating signal (a feedback control signal) Ct is formed for the purpose of causing the open degree of the throttle valve 14 denoted by the throttle open degree detection signal $\theta t$ to come closer to the normal target throttle open degree, the throttle valve operating signal Ct corresponding to the difference between the normal target-throttle open degree and the actual open degree of the throttle valve 14 so as to be supplied to the throttle actuator 13. As a result, the throttle valve 14 is opened/-closed by the throttle actuator 13 so that the control is conducted in such a manner that the degree of opening of the throttle valve 14 coincides with the normal target throttle opening degree. The normal target throttle opening of the throttle valve 14 is arranged to have a characteristics with which it increases proportionally (linearly) to the movement of the accelerator pedal 66.

When the slip control is performed by the control unit 100, the detected circumferential speed of each of the left wheel 20L, the front right wheel 20R, the rear left wheel 21L and the rear right wheel 21R is used. A detection of the wheel which is being slipped (to be called "a slipped wheel") of the four wheels and a detection of the number of the slipped wheels are respectively conducted. If a plurality of slipped wheels are detected, the number of the wheels which have been substantially simultaneously slipped is detected. In accordance with the above-described detections, the estimated vehicle speed, which is used when the target slip ratio is determined, is determined and the slip control mode is determined.

Estimation of Vehicle Speed

When the estimated vehicle speed is determined by the control unit 100, the estimated vehicle speed Vn−1 (where n represents a positive integer) is calculated in accordance with the circumferential speed of the left wheel 20L, the front right wheel 20R, the rear left wheel 21L and the rear right wheel 21R represented by the corresponding detection signals VFL, VFR, VRL and VRR which have been received previously by one cycle. In the two running modes, that is a high speed mode in which the estimated vehicle speed Vn−1 thus calculated is higher than the above-described reference value Vh and in a low speed mode in which the thus calculated estimated vehicle speed is less than the reference value Vh and also the steering angle of the front left wheel 20L and that of the front right wheel 20R represented by the steering angle signal $\theta s$ are less than $\theta 1$, the lowest circumferential speed determined from a group consisting of the circumferential speed of the front left wheel 20L, that of the front right wheel 20R, that of the rear left wheel 21L and that of the rear right wheel 21R is multiplied by a predetermined correction coefficient $\alpha 0$ (where $\alpha 0 < 1$). As a result, the estimated vehicle speed at this time is calculated in such a manner that:

$$Vn = \alpha 0 \times \min\{VFL, VFR, VRL, VRR\}$$

In the low speed turning mode in which the estimated vehicle speed Vn−1 is less than the reference value Vh and the steering angle $\theta s$ of the front left wheel 20L and that of the front right wheel 20R exceed $\theta 1$, the estimated vehicle speed is arranged to be determined under a different mode determined in accordance with the circumferential speed of the wheel (to be called "a non-slipped wheel" hereinafter) which is not slipped on the road by a degree exceeding a predetermined level and on the basis of the detected slipped wheels and of the number of the slipped wheels.

The vehicle speed is determined in the low speed turning mode as follows: if it has been detected that the number of the slipped wheels is zero or one and also if a fact that the vehicle is turning left has been detected in accordance with the steering angle of the front left wheel 20L and that of the front right wheel 20R, the estimated vehicle speed Vn is calculated by having the average value of the circumferential speed of the front left wheel 20L and that of the rear right wheel 21R multiplied by a predetermined correction coefficient $\alpha 1$ in the case where the front left wheel 20L and the rear right wheel 21R are respectively non-slipped wheels. Thus, the estimated vehicle speed Vn is calculated. In the case where if it has been detected that at least either of the front left wheel 20L and the rear right wheel 21R is a slipped wheel and also if the left turn of the vehicle has been detected, the average value of the circumferential speed of the non-slipped wheels, that is, the front right wheel 20R and that of the rear left wheel 21L are multiplied by the correction coefficient $\alpha 1$ so that the estimated vehicle speed Vn is calculated. On the other hand, if a fact that the number of the slipped wheels is zero or one has been detected and also if the right turn of the vehicle has been detected, the average value of the circumferential speed of the front right wheel 20R and that of the rear left wheel 21L, which are the non-slipped wheels, are multiplied by the correction coefficient $\alpha 1$ so that the estimated vehicle speed Vn is calculated in the case where the front right wheel 20R and the rear left wheel 21L are respectively non-slipped wheels. Furthermore, if it has been detected that at lest either of the front right wheel 20R and the rear left wheel 21L is the slipped wheel and also if the right turn of the vehicle has been detected, the average value of the circumferential speed of the non-slipped wheels, that is, that of the front left wheel 20L and the rear right wheel 21R is multiplied by the correction coefficient $\alpha 1$ so that the estimated vehicle speed Vn is respectively calculated.

If a fact that two wheels are being slipped has been detected and if the non-slipped wheels are the front left wheel 20L and the front right wheel 20R or the rear left wheel 21L and the rear right wheel 21R, the average value of the circumferential speed of the front left wheel 20L and that of the front right wheel 20R or the average value of the circumferential speed of the rear left wheel 21L and that of the rear right wheel 21R is multiplied by a predetermined correction coefficient $\alpha 2$ so that the estimated vehicle speed Vn is calculated. If the non-slipped wheels are the front left wheel 20L and the rear left wheel 21L or the front right wheel 20R and the rear right wheel 21R, the circumferential speed of the wheel of the non-slipped wheels whose trajectory approximates the path swept out by the center-of-gravity point of the vehicle is multiplied by the correction coefficient $\alpha 2$ so that the estimated vehicle speed Vn is calculated. Specifically, when the non-slipped wheels are the front left wheel 20L and the rear left wheel 21L in the case where the vehicle is turning right, the circumferential speed of the front left wheel 20L is multiplied by the correction coefficient $\alpha 2$. In the case where the vehicle is turning left, the circumferential speed of the rear left wheel 21L is multiplied by the correction coefficient $\alpha 2$. On the other hand, when the non-slipped wheels are the front right wheel 20R and the rear right wheel 21R and the vehicle is turning right, the circumferential speed of the front right wheel 20R is multiplied by the correction coefficient $\alpha 2$. In the case where the vehicle is turning left, the circumferential speed of the rear right wheel 21R is multiplied by the correction coefficient $\alpha 2$. Thus, the estimated vehicle speed Vn for each of the above-described cases is calculated.

On the other hand, in the case where the non-slipped wheels are the front left wheel 20L and the rear right wheel 21R or the front right wheel 20R and the rear left wheel 21L, the average value of the circumferential speed of the front left wheel 20L and that of the rear right wheel 21R or the average value of the circumferential speed of the front right wheel 20R and that of the rear left wheel 21L is multiplied by the correction coefficient $\alpha 2$ so that the estimated vehicle speed Vn is calculated.

In the case where a fact that the number of the slipped wheels is three has been detected, the circumferential speed of the one non-slipped wheel is multiplied by a correction coefficient $\alpha 3$ so that the estimated vehicle speed Vn is calculated.

In the case where a fact that all of the front left wheel 20L, the front right wheel 20R, the rear left wheel 21L and the rear right wheel 21R are the slipped wheels has been detected, the estimated vehicle speed Vn which is the value which has been calculated immediately before the above-detection is arranged to be the estimated vehicle speed Vn.

It is preferable that the above-described correction coefficients $\alpha 1$, $\alpha 2$ and $\alpha 3$ be arranged to become smaller in the sequential order as $1>\alpha 1>\alpha 2>\alpha 3$ in order to overcome a problem which can take place in that the vehicle becomes instable in proportion to the number of the slipped wheels.

As described above, since the estimated vehicle speed can be determined in the mode determined in accordance with the results of the detection of the wheel of the four wheels which is slipping and the detection of the number of the slipped wheels, the actual running conditions can be readily taken into consideration by a relatively simple structure without a necessity of using an expensive absolute vehicle-speed sensor. As a result, the estimated vehicle speed can be properly determined which does not deviate from the actual vehicle speed.

Slip Control

The control unit 100 performs the slip control of the slipped wheel in accordance with information about the number of the slipped wheels and information of the wheel which is being slipped with the estimated vehicle speed determined as described above, the slip control being performed by the control unit 100 in accordance with a predetermined control processes as follows:

That is, when the slip control is conducted by the control unit 100, a brake control (a control the braking force) and a throttle control (a control of the engine torque) are first and selectively conducted. The brake control causes the brake control hydraulic pressure circuit portion 30 to apply braking force to the front left wheel 20L, the front right wheel 20R, the rear left wheel 21L and the rear right wheel 21R in accordance with the number of the slipped wheels stored in the counter SN and with the combination established by the four flags (SFFR, SFFL, SFRL, SFRR) showing the corresponding slipped wheels. The throttle control reduces the engine output by reducing the open degree of the throttle valve 14. Furthermore, the target slip ratio TGBR employed for the purpose of performing the above-described brake control is determined to the smallest value TG1 of the predetermined three control constants TG1 to TG3 (where $0<TG1<TG2<TG3$). In addition, the target slip ratio TGTR employed for the purpose of performing the above-described throttle control is determined to any of the values TG1 to TG3, where the slip ratio is defined by (wheel speed—vehicle speed)/wheel speed.

The thus determined target slip ratio TGBR for use in the brake control and the target slip ratio TGTR for use in the throttle control are respectively multiplied by one of correction coefficients $\gamma$ stored in the built-in memory in accordance with the number of the slipped wheels in the built-in memories, the correction coefficient which corresponds to the present number of the slipped wheels being used for the multiplication. As a result, the value of the target slip ratio TGBR and that of TGTR are corrected. The correction coefficient $\gamma$ for use to multiply the target slip ratios TGBR and TGTR is arranged to be 1 when the number of the slipped wheels is one and the same is arranged to be in inverse proportion to the number of the slipped wheels.

As a result of the arrangement conducted in such a manner that the correction coefficient $\gamma$ is in inverse proportion to the number of the slipped wheels, the target slip ratios TGBR and TGTR which have been corrected by the multiplication with the correction coefficient $\gamma$ can be made the values which correspond to the actual running condition and the road condition (in particular, the road resistance $\mu$).

When the above-described brake control and the throttle control are conducted, the estimated vehicle speed Vn thus calculated is used so that the actual slip ratios SFL, SFR, SRL and SRR of the corresponding front left wheel 20L, the front right wheel 20R, the rear left wheel 21L and the rear right wheel 21R are obtained from the following equations:

$$SFL = (VFLn - Vn)/VFLn$$
$$SRF = (VFRn - Vn)/VFRn$$
$$SRL = (VRLn - Vn)/VRLn$$
$$SRR = (VRRn - Vn)/VRRn$$

When the brake control is conducted, operation signals Ca to Ch are selectively formed by the control unit 100 in accordance with the results of comparisons made between the actual slip ratios SFL, SFR, SRL and SRR which have been calculated for each of the wheels as described above and the target slip ratio TGBR which has been corrected by the multiplication conducted with the correction coefficient $\gamma$. The operation signals Ca to Ch thus formed are supplied to the above-described electromagnetic valves 51 to 58 for varying the braking force. As a result, the level of the liquid braking pressure to be supplied to the disc brakes 35A to 35D provided for the corresponding front left wheel 20L, the front right wheel 20R, the rear left wheel 21L and the rear right wheel 21R can be adjusted. Thus, the control is conducted so as to make the slip ratio of the slipped wheel coincide with the target slip ratio TGBR which has been corrected by being multiplied by the correction coefficient $\gamma$.

When the throttle control is performed, the throttle valve operating signal Ct is formed by the control unit 100 as a results of comparisons made between the actual slip ratios SFL, SFR, SRL and SRR which have been calculated as described above and the target slip ratio TGTR which has been corrected by being multiplied by the correction coefficient $\gamma$. The throttle valve operation signal Ct thus formed is supplied to the throttle actuator 13 for controlling the variation of the engine torque. As a result, the open degree of the throttle valve 14 is adjusted, causing the torque to be controlled. Thus, the control for making the actual slip ratio of the slipped wheel coincide with the target slip ratio TGTR which has been corrected by being multiplied by the correction coefficient $\gamma$. However, if it is determined that the open degree of the throttle valve 14 $\theta t$ is larger than the normal target throttle open degree which is determined in accordance with the movement $\theta a$ of the accelerator pedal 66, the throttle control is stopped and the normal throttle open degree control is started.

Control pattern

Then, the control pattern according to the first and the second embodiments will be described with reference to FIG. 2A.

As described above, the brake control and the throttle control conducted in the slip control are selectively conducted in accordance with the number of the slipped wheels and the combination of the slipped wheels. However, if it is detected that the number of the slipped wheel is one, only the brake control is conducted.

Two Slipped Wheels

If it has been detected that the number of the slipped wheels is two, the control is conducted in accordance with one of six combinations established by two of the four wheels. That is, in the case where the rear left wheel 21L and the rear right wheel 21R are the slipped wheels, only the brake control is conducted. On the other hand, in the case where the front left wheel 20L and the front right wheel 20R are the slipped wheels, the influence from the slip upon the running stability becomes further critical in comparison with the case where the rear left wheel 21L and the rear right wheel 21R are the slip wheels. Therefore, the throttle control arranged such that the target slip ratio TGTR is determined to be a value obtained by multiplying the above-described determined value TG3 by the correction coefficient $\gamma$, the throttle control being arranged to be conducted in addition to the brake control. In the case where the slipped wheels are the front left wheel 20L and the rear left wheel 21L or the front right wheel 20R and the rear right wheel 21R, there is a fear of yawing taken place in the vehicle. Therefore, the throttle control arranged such that the target slip ratio TGTR is determined to be a value obtained by multiplying the determined value TG2 by the correction coefficient $\gamma$, the throttle control being arranged to be conducted in addition to the brake control. In the case where the slipped wheels are the front left wheel 20L and the rear right wheel 21R or the front right wheel 20R and the rear left wheel 21L, only the brake control is conducted.

As described above, in the case where a fact, that the number of the slipped wheels is two, has been detected, it is arranged that only the brake control is conducted since influence upon the running stability is considered to be relatively small. Therefore, a problem arisen in that the output from the engine is reduced and the torque for rotating the wheels is excessively lowered can be prevented. Thus, deterioration in the running characteristic such as the accelerating performance or the driving ability, which are the basic characteristic required for vehicles, can be prevented. Furthermore, in the case where the influence upon the running stability of the vehicle easily becomes critical, the throttle control is conducted in addition to the brake control. Therefore, yawing which influences the running stability of the vehicle can be effectively prevented.

Three Slipped Wheels

In the case where the number of the slipped wheels is three and each of the three wheels substantially simultaneously slips by a degree which exceeds a predetermined level, it is considered that the running condition of the vehicle is extremely instable. Therefore, only the throttle control is conducted in such a manner that the target slip ratio TGTR is determined to be a value calculated by multiplying the above-described determined value TG2 by the correction coefficient $\gamma$. In the case where the slips of the three wheels have not taken place simultaneously, the throttle control is conducted in addition to the brake control in such a manner that the target slip ratio TGTR is determined to be a value calculated by multiplying the determined value TG2 by the correction coefficient $\gamma$.

Four Slipped Wheels

If it has been detected that the number of the slipped wheels is four (that is, all of the wheels), the brake control is stopped and the throttle control is conducted in such a manner that the target slip ratio is arranged to be zero and the throttle valve 14 is fully closed. Then, in order to determine whether or not the slip of each of the four wheels has been prevented as a result of the full close of the throttle valve 14, the average circumferential speed VAV is obtained from an equation:

$$VAV = (VFLn + VFRn + VRLn + VRRn)/4.$$

The average circumferential speed VAV is used to calculate the sum deviation $\epsilon$ in accordance with an equation:

$$\epsilon = (VFLn - VAV)^2 + (VFRn - VAV)^2 + (VRLn - VAV)^2 + (VRRn - VAV)^2$$

so as to make a comparison between the sum deviation $\epsilon$ and a predetermined value Za. In the case where it has been determined that the sum deviation $\epsilon$ is larger than the predetermined value Za ($\epsilon > Za$), the slips of all of the four wheels have not been stopped. Therefore, the full closing of the throttle valve 14 is retained. On the other hand, if it has been determined that the sum deviation $\epsilon$ is equal to or less than Za ($\epsilon \leq Za$), each wheel is subjected to the slip control upon a determination made that the stops of all of the four wheels have been substantially stopped.

Figure 2B:
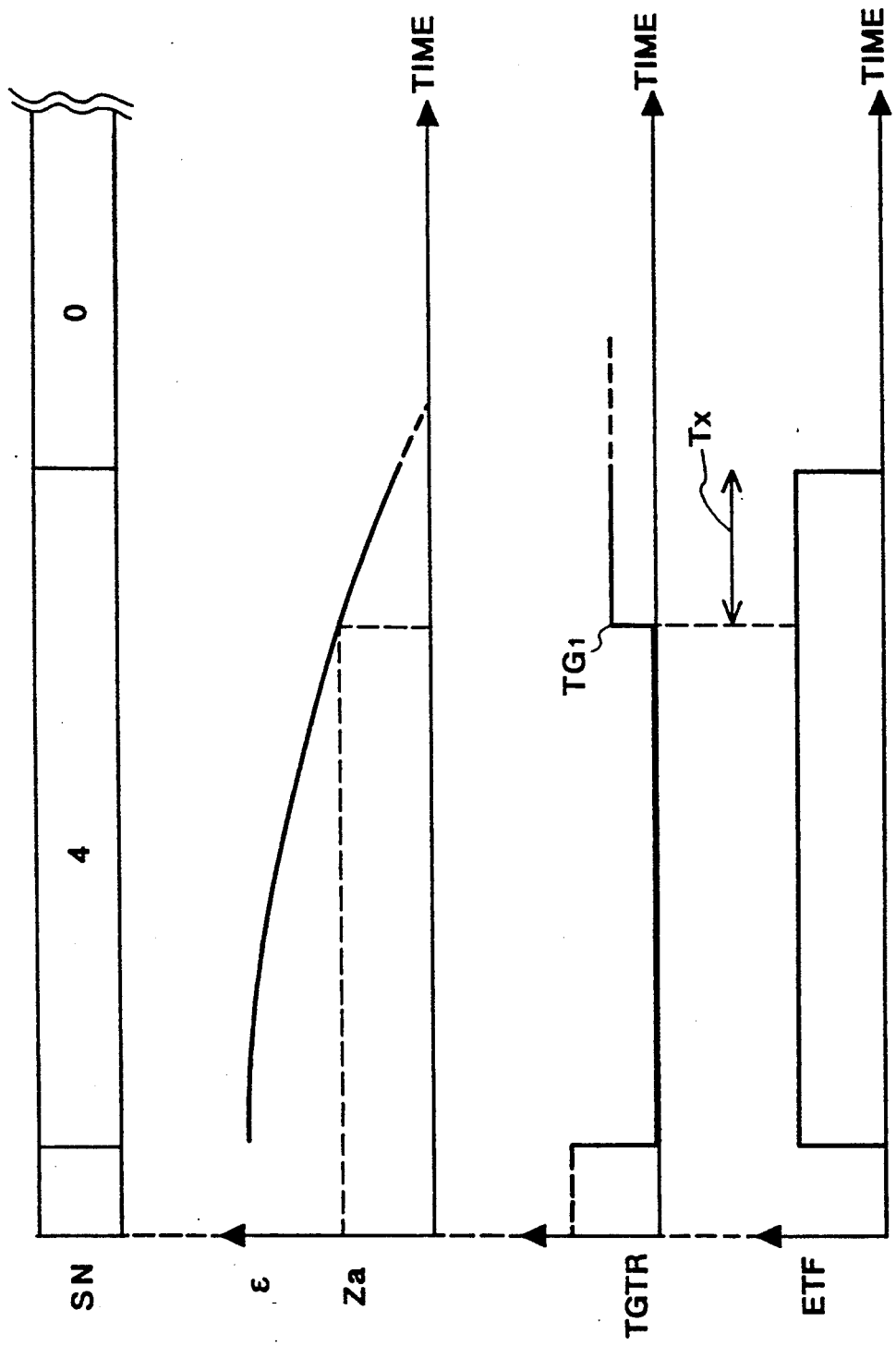
FIG. 2B shows a timing chart illustrating changes in various control variables used for the slip control when four wheels are slipped.

As shown in FIG. 2B, when the slip control is restarted, the brake control is not conducted during a predetermined period Tx after the time at which the deviation $\epsilon$ has become the value of Za or less, but only the throttle control is conducted in such a manner that the target slip ratio TGTR is determined to be a value obtained by multiplying the determined value TG1 by the correction coefficient $\gamma$. However, if it has been determined that the open degree $\theta t$ of the throttle valve 14 is larger than the normal target throttle opening degree which is determined in accordance with the movement $\theta a$ of the accelerator pedal 66 ($\theta t > \theta a$) during the above-described throttle control, this throttle control is stopped and the normal throttle open degree control is started. That is, the throttle control conducted by a degree exceeding the degree of a drivers' requirement causes the driver to feel uneasy about it.

As described above, when it has been detected that all of the four wheels slips on the road by a degree exceeding a predetermined level, the brake control is stopped and the throttle valve 14 is retained at the full-close state until all of the four wheels substantially stops their slips so as to quickly lower the engine output. As a result of the control conducted as described above, a problem in that the running stability of the vehicle is influenced can be assuredly and quickly prevented. Furthermore, the four wheels are assuredly and quickly restored to a state in which they do not slip. Therefore, if the four wheels slip by degrees exceeding a predetermined level, the running condition, in which the estimated vehicle speed and the actual vehicle is equal or substantially equal to each other, can be realized in an extremely short time. There is a good possibility that the four wheels again slip during a period Tx after the slips of the four wheels have been substantially stopped. However, the generation of slips exceeding a predetermined level is stopped since only the throttle control is conducted during the above-described period as shown in FIG. 2B. Therefore, the running stability of the vehicle, immediately after the state has been realized in which the slips of the four wheels have been substantially prevented, can be assuredly secured.

When the slip control is conducted as described above, the control is conducted in such a manner that the value of the target slip ratio and that of TGTR are corrected in accordance with the number of the slipped wheels and the slip ratio of the slipped wheel is caused to coincide with the thus corrected values of the target slip ratios TGBR and TGTR. As a result, a proper slip control can be conducted in accordance with the running condition of the vehicle or the state of the road surface. Therefore, the running stability of the vehicle can be substantially secured and a target running characteristic can be obtained.

Torque Split Control

The throttle control portion and the brake control portion of the control unit 100 are arranged to receive control signals from the torque distribution control portion. The torque distribution control portion is arranged to receive, for example, an acceleration signal DFR supplied from the longitudinal acceleration sensor, a lateral acceleration signal DL supplied from the lateral acceleration sensor, a steering angle signal $\theta s$ supplied from the steering angle sensor 69, a throttle open degree signal $\theta t$ supplied from the throttle open degree sensor 65, a boost pressure detection signal B supplied from a boost pressure sensor, and an accelerator open-degree detection signal $\theta a$ supplied from the accelerator open degree sensor 67. Therefore, the change in torque distribution, for example, between the front wheels and the rear wheels and between the right wheels and the left wheels can be properly conducted at the time of acceleration or the turning operation.

The torque distribution control portion applies a braking force to each of the disc brakes 35A and 35B of the corresponding front wheels 20L and 20R when the load applied to the rear wheels 21L and 21R are shifted at the time of, for example, the starting and accelerating the vehicle. The torque distribution control portion increases engine torque by a degree corresponding to the braking force thus applied so that the torque split control is conducted in such a manner that sum of the operating torque applied to the road by the wheels 20L, 20R, 21L and 21R is the same but the distribution of the torque is different. When the vehicle is turning, a braking force is applied to each of disc brake 35A and 35B for the front wheels 20L and 20R at the time of approaching the corner. When the vehicle exits from the corner, a braking force is applied to each of disc brakes 35C and 35D of the corresponding rear wheels 21L and 21R. When the vehicle turns left, a braking force is applied to brakes 35A and 35B of the front left wheel 20L and the rear left wheel 21L since the loads applied to the front right wheel 20R and the rear right wheel 21R have been shifted. When the vehicle turns right, a braking force is applied to each of brakes 35B and 35D of the front right wheel 20R and the rear right wheel 21R. Furthermore, the engine torque corresponding to the torque loss taken place due to the applications of the braking force is increased on the other side so that the torque distributed to each of the wheels is changed.

Details of the Control According to the First Embodiment

The above-described slip control (the traction control) and the torque distribution control (the torque split control) are conducted on the basis of the operation of each of the control portions of the microcomputer included in the control unit 100. Then, each of the specific control program (the basic system) executed by the microcomputer will be described. First, the slip control will be described in detail with reference to flow charts shown in FIGS. 3 to 10.

Figure 3:
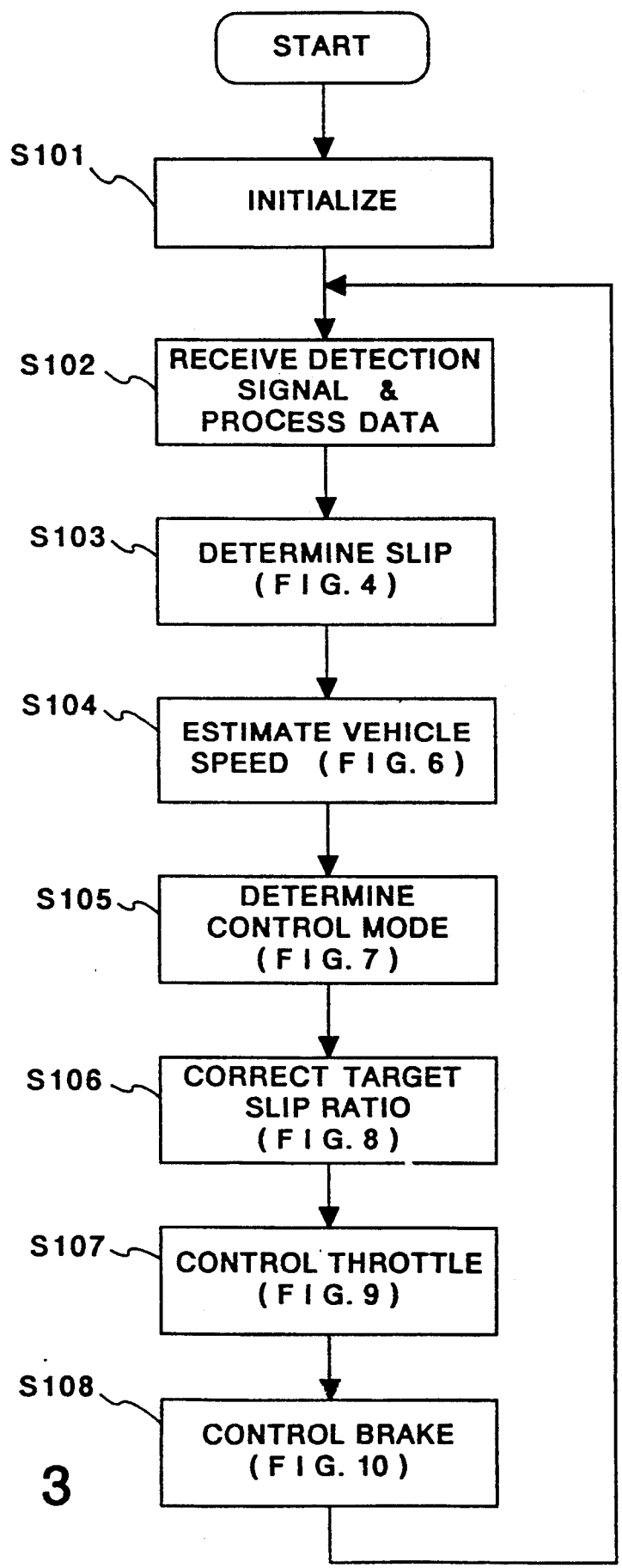
FIG. 3 is a flow chart of the main routine of a slip control (a traction control) system of the first embodiment of the apparatus according to the present invention.

FIG. 3 is a flow chart which illustrates the main program (the main routine) executed in the slip control. After the start, each of the portions is initialized in process step S101. Then, in process step S102, required data is processed with each of detection signals VFL or the like, $\theta t$, $\theta a$ and $\theta s$ received successively. In the following process steps S103 to S108, the slip decision processing, the vehicle speed estimating processing, the control mode decision processing, the target slip ratio correcting processing, the throttle control processing and the brake control processing are executed, the flow then being returned to the above-described process S102.

According to the slip decision program executed in the process step (the process step and the decision step will be abbreviated to "step" hereinafter) S103 shown in the flow chart shown in FIG. 3, the counter SN for counting the number of the wheels which have simultaneously slipped is set to zero in step S111 as shown in the flow chart shown in FIG. 4. In step S112, the value VFLn−1 of the circumferential speed of the front left wheel 20L is registered in a register VWO, the value VFLn−1 being the value which has been previously measured by one cycle. On the other hand, the value VFLn of the circumferential speed of the front left wheel 20L is registered in a register VWN. Furthermore, the front wheel slip flag SFFL which has been registered in the previous cycle is saved in SFQ. In step S113, a slip detection program shown in FIG. 5 is executed.

Figure 5:
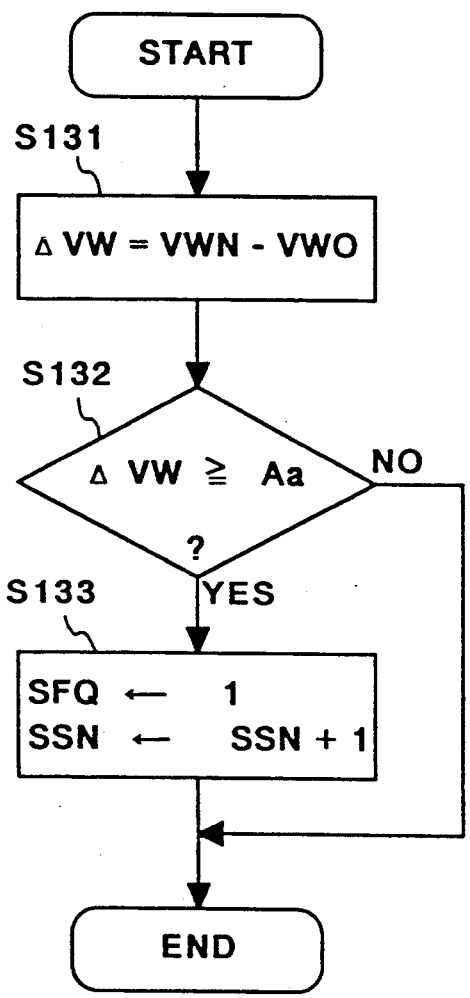
FIG. 5 is a flow chart of the sub-routine in a slip detection operation performed by the slip control system of the first embodiment.

According to the slip detection program shown in FIG. 5, the circumferential acceleration $\Delta VW$ of the front left wheel 20L is calculated in step S131 by subtracting the circumferential speed VWO of the previous cycle from the present circumferential speed VWN. Then, In step S132, it is determined whether or not the circumferential acceleration $\Delta VW$ is larger than the predetermined value Aa. If it has been determined that the circumferential acceleration $\Delta VW$ thus calculated is larger than the predetermined value A, it is decided that the front left wheel 20L has slipped by a degree which exceeds a predetermined level. Then, in the next step S133, the slipped wheel decision flag SFQ, which shows the above-described fact, is set to 1 (a slip has taken place). Simultaneously, the slip counter SN is updated with an increment of one. In step S132, if it has been decided that the circumferential acceleration $\Delta VW$ is less than the above-described reference value Aa, the slip detection program is ended without passing through the step S133.

Figure 4:
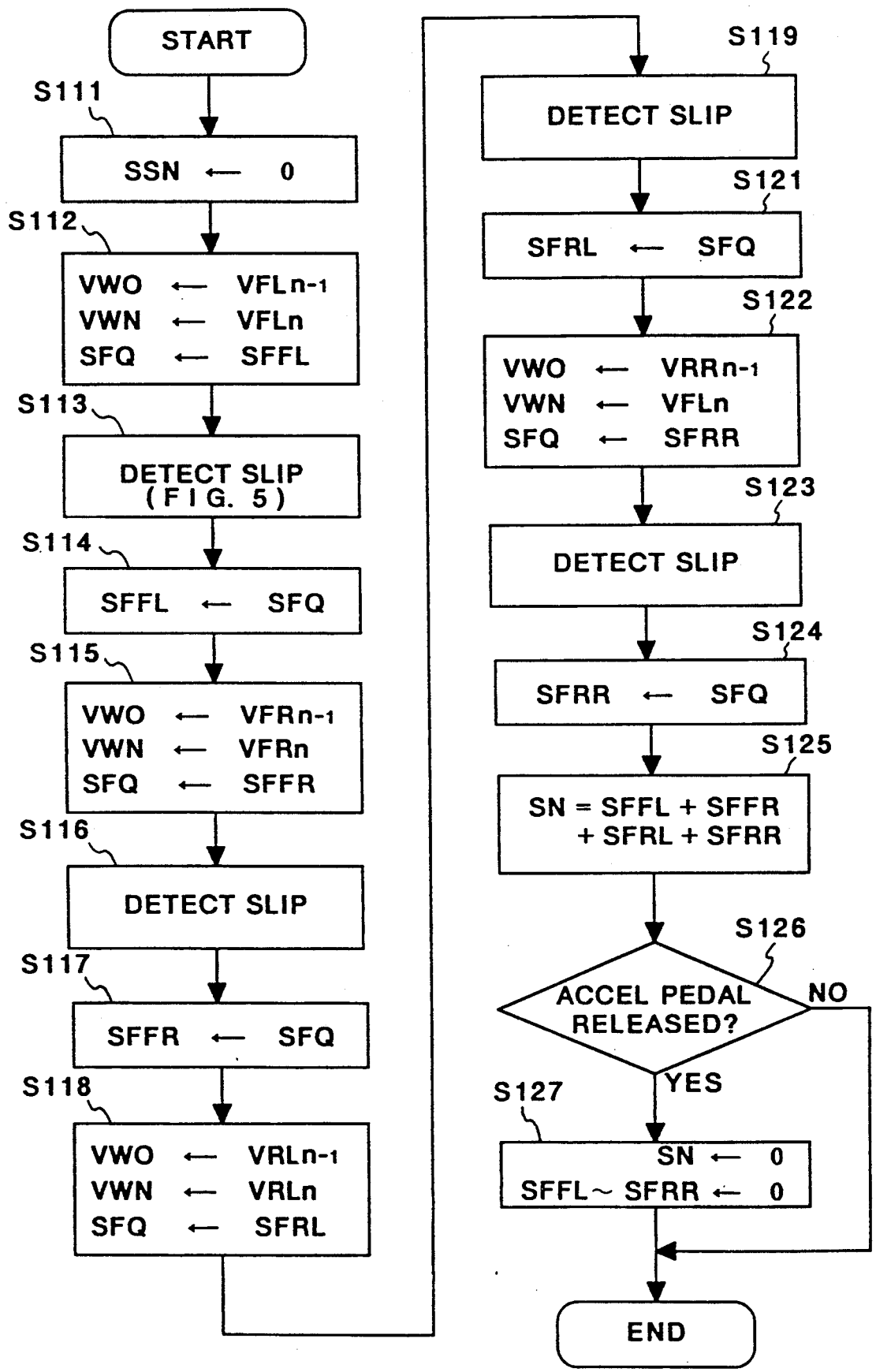
FIG. 4 is a flow chart of the sub-routine in a slip determining operation performed by the slip control systems of the first and second embodiments.

After the program shown in FIG. 5 has been ended, the front left wheel slip flag SFFL is replace by a slip wheel decision flag SFQ in step S114 in the flow chart shown in FIG. 4. Then, the flow advances to step S115. Then, in steps S115 to S117, the front left wheel is subjected to the slip decision, the rear left wheel is subjected to the same in steps S118 to S121, and the rear right wheel is also subjected to the same in steps S122 to S124.

In step S125, the number of the slipped wheels is registered in the slip wheel counter SN by adding the front left wheel slip flag SFFL, the front right wheel slip flag SFFR, the rear right wheel slip flag SFRL and the rear right wheel slip flag SFRR. In step S126, it is determined that the accelerator pedal 66 has been released (in a state where the throttle is required to be fully closed). If it has been determined that the accelerator pedal 66 has been released (in the case of YES), the above-described slip wheel counter flag SF is set to zero in final step S127, and then this program is ended. If it is determined that the accelerator pedal 66 has not been released in the step S126 (in the case of NO), the slip decision program is ended without passing through the step S127.

Figure 6A:
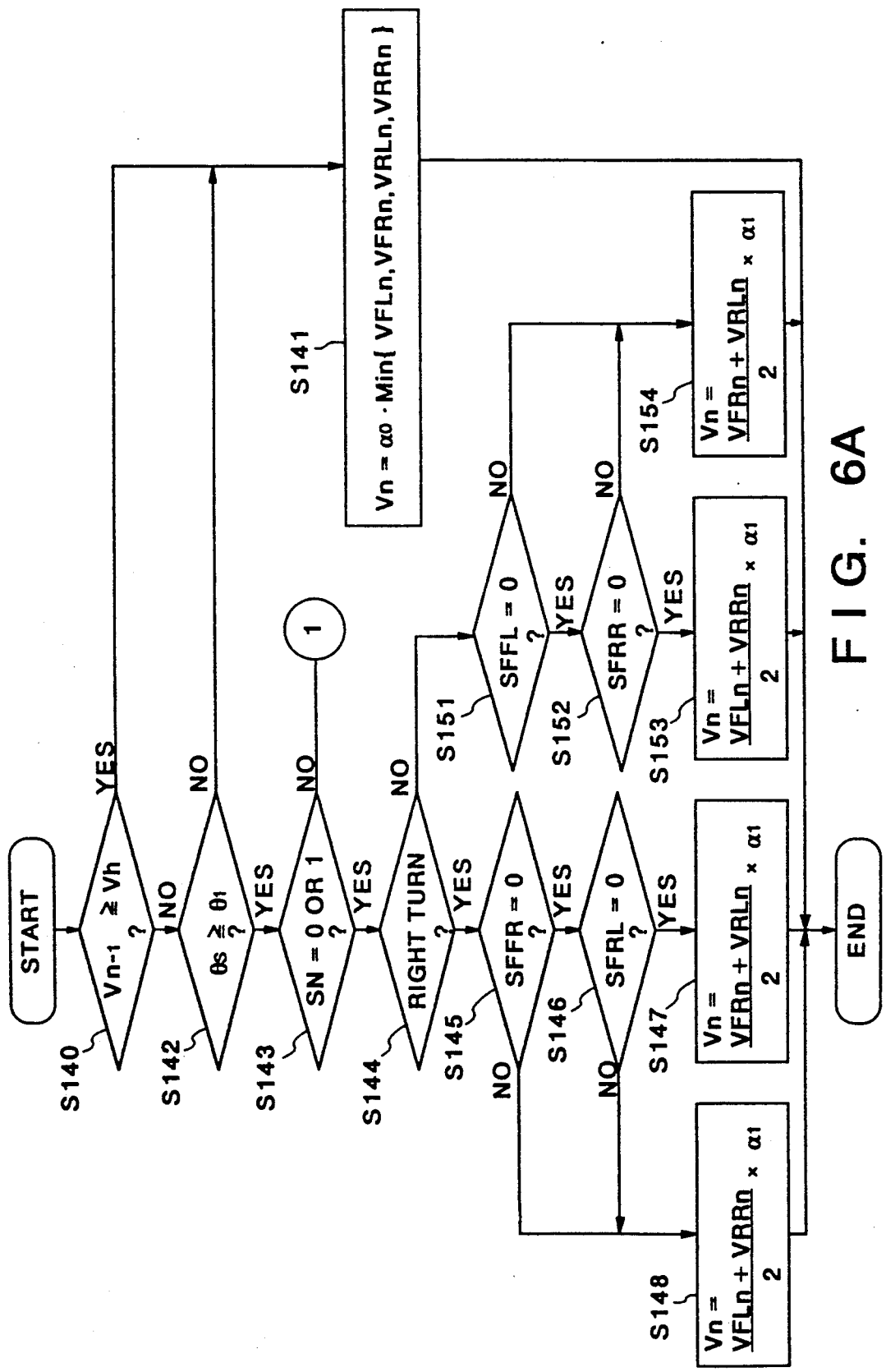
FIGS. 6A, 6BA and 6BB are flow charts of the sub-routine in a vehicle speed estimating operation performed in the slip controls of the first and second embodiments.
Figure 6B:
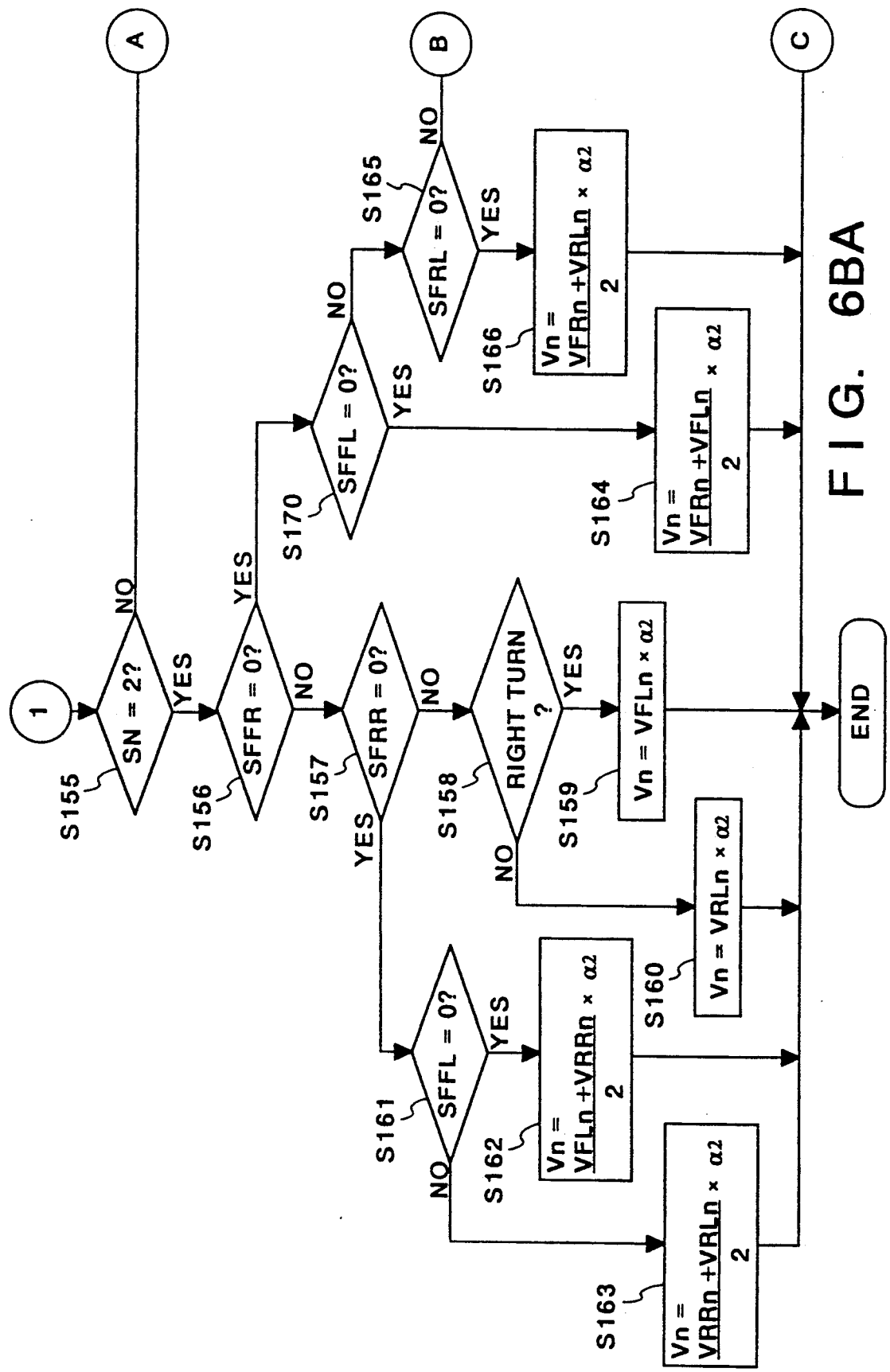
Figure 6B:
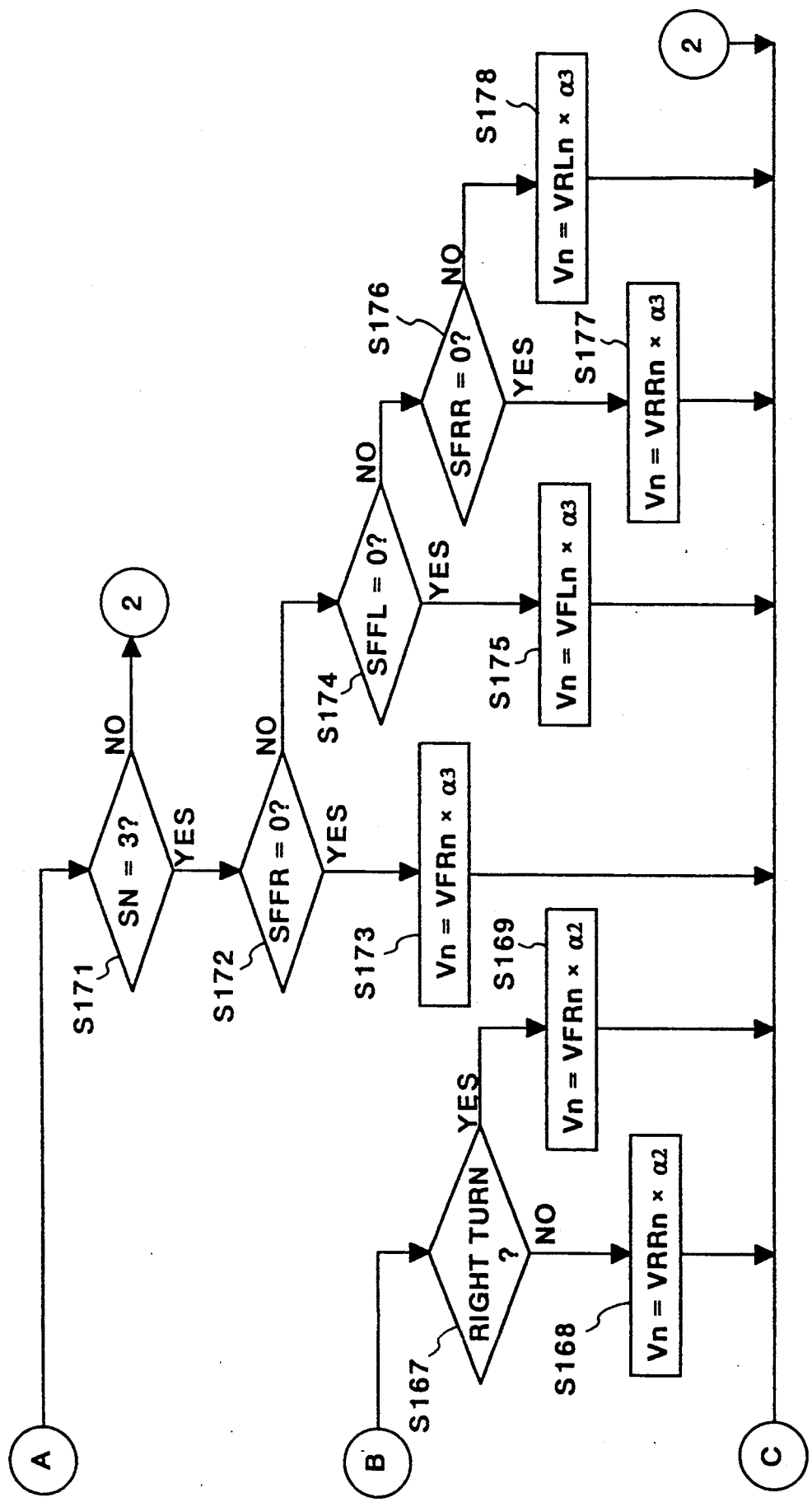

On the other hand, in the vehicle speed estimating processing to be executed in step S104 shown in the flow chart shown in FIG. 3, it is determined, after the start, whether or not the estimated vehicle speed $Vn-1$, which has been previously estimated by one cycle, is larger than the reference value Vh as shown in, for example, a flow chart shown in FIG. 6. If it is determined that the value of the estimated vehicle speed $Vn-1$ is larger than the reference value Vh (in the case of YES), the estimated vehicle speed Vh is calculated by multiplying the minimal one of the circumferential speed VFLn, VFRn, VRLn and VRRn of the front left wheel 20L, the front right wheel 20R, the rear left wheel 21L and the rear right wheel 21R by the correction coefficient $\Delta o$ in the next step S141. Then, the vehicle speed estimating program is ended. On the other hand, if it is determined that the value of the estimated vehicle speed $Vn-1$ is less than the reference value Vh in the step S140, it is determined in step S142 that the steering angle of the front left wheel 20L and the front right wheel 20R denoted by the steering angle detection signal Sd is larger than the predetermined value $\theta 1$. If it is determined that the steering angle is less than $\theta 1$, the above-described step S141 is executed as described above. Thus, the vehicle speed estimating program is ended. On the other hand, if it is determined in step S142 that the steering angle $\theta s$ is larger than $\theta 1$ (in the case of YES), it is determined whether or not the slipped wheel counter SN is either zero or 1 in step S143. If it is determined that the slipped wheel counter SN is either zero or 1, the flow advances to step S144 in which it is determined whether or not the vehicle is being turned right in accordance with the steering angle $\theta s$. If it is determined that the vehicle is being turned right, the flow advances to the next step S145 in which it is determined whether or not the front right wheel slip flag SFFR is zero. If it is determined that the front right wheel slip flag SFFR is zero, the flow advances to step S146 in which it is determined whether or not the rear left wheel slip flag SFRL is zero. If it is determined that the rear left wheel slip flag SFRL is zero, the flow advances to step S147 in which the estimated vehicle speed Vn is calculated from an equation:

$$Vn = \{(VFRn + VRLn)/2\} \times a1$$

Thus, the estimated vehicle speed determining program is ended.

On the other hand, if it is determined in steps S145 and 146 that each of the front right wheel slip flag SFFR and the rear left wheel slip flag SFRL is not zero, the flow advances to step S148 in which the estimated vehicle speed Vn is calculated from an equation:

$$Vn = \{(VFLn - VRRn)/2\} \times a$$

Thus, the vehicle estimating program is ended.

On the other hand, if it is determined that the vehicle is not being turned right in step S144, the flow advances to step S151 in which it is determined whether or not the front left wheel slip flag SFFL is zero. If it is determined that the front left wheel slip flag SFFL is zero, the flow advances to step S152 in which it is determined whether or not the rear right wheel slip flag SFRR is zero. If it is determined that the rear right wheel slip flag SFRR is zero, the flow advances to step S153 in which the estimated vehicle speed Vn is calculated from an equation:

$$Vn = \{(VFLn + VRRn)/2\} \times a1$$

Thus, the vehicle speed estimating program is ended.

On the other hand, if it is determined in steps S151 and S152 that each of the front left wheel slip flag SFFL and the rear right wheel slip flag SFRR is not zero, the flow advances to step S154 in which the estimated vehicle speed Vn is calculated from an equation:

$$Vn = \{(VFRn + VRLn)/2\} \times a1$$

Thus, the vehicle speed estimating program is ended.

On the other hand, if it has been determined that the slipped wheel counter SN is not zero or 1 in step S143, the flow advances to step S155 in which it is determined whether or not the slipped wheel counter SN is 2. If it is determined that the slipped wheel counter SN is 2, the flow advances to step S156 in which it is determined that the front right wheel slip flag SFFR is zero. If it is determined that the front right wheel slip flag SFFR is not zero, the flow advances to step S157 in which it is determined that the rear right wheel slip flag SFRR is zero. If it is determined that the rear right wheel slip flag SFRR is not zero, the flow advances to step S158 in which it is determined that the vehicle is being turned right. If it is determined that the vehicle is being turned right, the flow advances to step S159 in which the estimated vehicle speed Vn is calculated from an equation:

$$Vn = VFLn \times a2$$

Thus, the vehicle speed estimating program is ended.

If it is determined in step S158 that the vehicle is not being turned right, the flow advances to step S160 in which the estimated vehicle speed Vn is calculated from an equation:

$$Vn = VRLn \times a2$$

Thus, the vehicle speed estimating program is ended.

On the other hand, if it is determined in step S157 that the rear right wheel slip flag SFRR is zero, the flow advances to step S161 in which it is determined whether or not the front left wheel slip flag SFFL is zero. If it is determined that the front left wheel slip flag SFFL is zero, the flow advances to step S162 in which the estimated vehicle speed Vn is calculated from an equation:

$$Vn = \{(VFLn + VRRn)/2\} a2$$

Thus, the vehicle speed estimating program is ended.

If it is determined in step S161 that the front left wheel slip flag SFFL is not zero, the flow advances to step S163 in which the estimated vehicle speed Vn is calculated from an equation:

$$Vn = \{(VRRn + VRLn)/2\} \times a2$$

Thus, this program is ended.

If it is determined in step S156 that the front right wheel slip flag SFFR is zero, the flow advances to step S170 in which it is determined whether or not the front left wheel slip flag SFFL is zero. If it is determined that the front left wheel slip flag SFFL is zero, the flow advances to step S164 in which the estimated vehicle speed is calculated from an equation:

$$Vn = \{(VFRn + VFLn)/2\} \times a2$$

Thus, the vehicle speed estimating program is ended.

If it is determined in step S170 that the front left wheel slip flag SFFL is not zero, the flow advances to step S165 in which it is determined whether or not the rear left wheel slip flag SFRL is zero. If it is determined that the rear left wheel slip flag SFRL is zero, the flow advances to step S166 in which the estimated vehicle speed Vn is calculated from an equation:

$$Vn = \{(VFRn + VRLn)/2\} \times a2$$

Thus, the vehicle speed program is ended.

On the other hand, if it is determined in step S165 that the rear left wheel slip flag SFRL is not zero, the flow advances to step S167 in which it is determined whether or not the vehicle is being turned right. If it is determined that the vehicle is not being turned right, the flow advances to step S168 in which the estimated vehicle speed Vn is calculated from an equation:
$$Vn = VRRn \times a2$$

Thus, the vehicle speed estimating program is ended. If it is determined in step S167 that the vehicle is being turned right, the flow advances to step S169 in which the estimated vehicle speed Vn is calculated from an equation:

$$Vn = VFRn \times a2$$

Thus, the vehicle speed estimating program is ended.

If it is determined in step S155 that the slipped wheel counter SN is not 2, the flow advances to step S171 in which it is determined whether or not the slipped wheel counter SN is 3. If it is determined that the counter SN is 3, the flow advances to step S172 in which it is determined whether or not the front right wheel slip flag is zero. If it is determined that the front right wheel slip flag SFFR is zero, the flow advances to step S173 in which the estimated vehicle speed Vn is calculated from an equation:

$$Vn = VFRn \times a3$$

Thus, the vehicle speed estimating program is ended. If it is determined in step S172 that the front right wheel slip flag SFFR is not zero, the flow advances to step S174 in which it is determined whether or not the front left wheel slip flag SFFL is zero. If it is determined that the front left wheel slip flag SFFL is zero, the flow advances to step S175 in which the estimated vehicle speed Vn is calculated from an equation:

$$Vn = VFLn \times a3$$

Thus, the vehicle speed estimating program is ended. If it is determined in step S174 that the front left wheel slip flag SFFL is not zero, the flow advances to step S176 in which it is determined whether or not the rear right wheel slip flag SFRR is zero. If it is determined that the rear right wheel slip flag SFRR is zero, the flow advances to step S177 in which the estimated vehicle speed Vn is calculated from an equation:

$$Vn = VRRn \times a3$$

Thus, the vehicle speed estimating program is ended. If it is determined in step S176 that the rear right wheel slip flag SFRR is not zero, the flow advances to step S178 in which the estimated vehicle speed Vn is calculated from an equation:

$$Vn = VRLn \times a3$$

Thus, the vehicle speed estimating program is ended.

On the other hand, if it is determined in step S171 that the slipped wheel counter SN is not 3, the vehicle speed estimating program is ended.

An example of the control mode decision program to be executed in step S105 shown in a flow chart shown in FIG. 3 will be described with reference to FIG. 7. First, in step S179, it is determined, after the start of the control operation, whether or not a four wheel slip control flag CF4, to be described later, is zero which shows a normal condition. If it is determined that the four wheel slip control flag CF4 is zero (in the case of YES), the flow advances to step S180 in which it is determined whether or not the slipped wheel counter SN is 1. If it is determined that the slipped wheel counter SN is 1 (in the case of YES), the flow advances to step S181 in which the brake control execution flag EBF is set to 1 and the throttle control execution flag ETF is set to zero. Then, in step S182, the target slip ratio TGTR for controlling the throttle is set to a constant TG2. Then, in step S183, the target slip ratio for controlling the brake is set to a constant TG1. Thus, the control mode decision program is ended.

If it is determined in step S180 that the slipped wheel counter SN is not 1, the flow advances to step S184 in which it is determined whether or not the slipped wheel counter SN is 2. If it is determined that the slipped wheel counter SN is 2, the flow advances to step S185 in which it is determined whether or not the front right wheel slip flag SFFR is zero. If it is determined that the front right wheel slip flag SFFR is zero, the flow advances to step S186 in which it is determined whether or not the front left wheel slip flag SFFL is zero. If it is determined that the front left wheel slip flag SFFL is zero, the rear left wheel 21L and the rear right wheel 21R slipped on the road by a degree exceeding a predetermined level. Therefore, the brake control execution flag EBF is set to 1 (execution of the brake control) while the throttle control execution flag ETF is set to zero. Then, the flow advances to step S182 in which the processes from the step S182 are similarly executed. Thus, the control mode decision program is ended.

On the other hand, if it is determined that the front left wheel slip flag SFFL is not zero in step S186, the flow advances to step S188 in which it is determined whether or not the rear left wheel slip flag SFRL is zero. If it is determined that the rear left wheel slip flag SFRL is not zero, the front left wheel 20L and the rear left wheel 21L slipped on the road by a degree exceeding a predetermined level. Therefore, the target slip ratio TGTR is set to TG2 in step S189, and the flow advances to step S194. If it is determined in step S185 that the front right wheel slip flag SFFR is not zero, the flow advances to step S190 in which it is determined whether or not the rear right wheel slip flag SFRR is zero. If it is determined that the rear right wheel slip flag SFRR is zero, the flow advances to step S191 in which it is determined whether or not the front left wheel slip flag SFFL is zero. If it is determined that the front left wheel slip flag SFFL is not zero, the front left wheel 20L and the front right wheel 20R slipped on the road by a degree exceeding a predetermined level. Therefore, in step S192, the target slip ratio TGTR is set to a predetermined value TG3, and the flow advances to step S194. If it is determined in step S190 that the rear right wheel slip flag SFRR is not zero, the front right wheel 20R and the rear right wheel 21R slipped on the road by a degree exceeding a predetermined level. Therefore, the flow advances to step S193 in which the target slip ratio TGTR is set to the predetermined value TG2, and the flow advances to step S194. In step S194, both the brake control execution flag EFF and the throttle control execution flag ETF are set to 1. In the next step S183, the target slip ratio TGBR is set to the predetermined value TG1. Thus, the control mode decision program is ended. If it is determined in step S188 that the rear left wheel slip flag SFRL is zero, the front left wheel 20L and the rear right wheel 21R slipped on the road by a degree exceeding a predetermined level. Similarly, if it is determined in step S191 that the front left wheel slip flag SFFL is zero, the front right wheel 20R and the rear left wheel 21L slipped on the road by a degree exceeding a predetermined level. Therefore, in this case, the flow advances to step S187 in which each of the processes from step S187 is similarly conducted. Thus, the control mode decision program is ended.

On the other hand, it is determined in step S184 that the slipped wheel counter SN is not 2, the flow advances to step S196 in which it is determined whether or not the slipped wheel counter SN is 3. If it is determined that the slipped wheel counter SN is 3, the flow advances to step S197 in which it is determined whether or not the three-wheel simultaneous slip generation flag CF3 is zero. If it is determined that the three-wheel simultaneous slip generation flag CF3 is zero, the flow advances to step S198 in which it is determined whether or not the simultaneously slipped wheel counter SSN is 3. If it is determined that the simultaneously slipped wheel counter SSN is not 3, the flow advances to step S199 in which the target slip ratio TGTR is set to the predetermined value TG2 and both the brake control execution flag EBF and the throttle control execution flag ETF are set to 1. Then, in step S183, the target slip ratio TGBR is set to the predetermined value TG1. Thus, this program is ended. In the two cases where if it is determined in step S197 that the three-wheel simultaneous slip generation flag CF3 is not zero, and if the simultaneous slip counter SSN is 3, the flow advances to step S200 in which the target slip ratio TGTR is set to the predetermined value TG2, both the brake control execution flag EBF and the throttle control execution flag ETF are set to 1, and the three-wheel simultaneous slip generation flag CF3 is set to 1. Then, this program is ended after the processing in step S183 has been similarly conducted.

On the other hand, if it is determined in step S196 that the slipped wheel counter SN is not 3, the flow advances to step S201 in which it is determined whether or not the slipped wheel counter SN is 4. If it is determined that the slipped wheel counter SN is 4, the flow advances to step S202. If it is determined in step S179 that the four-wheel slip control flag CF4 is not zero, the flow also advances to step S202 in which it is determined whether or not the four-wheel slip control flag CF4 is 2 which shows the slip convergent condition. If it is determined that the four-wheel slip control flag CF4 is not 2, the flow advances to step S203 in which it is determined whether or not the four-wheel slip control flag CF4 is zero which shows the normal condition. If it is determined that the four-wheel slip control flag CF4 is zero which shows the normal condition, the flow advances to step S204 in which the target slip ratio TGTR is set to zero, the brake control execution flag EBF is set to zero, the throttle control execution flag ETF is set to 1, and the four-wheel flip control flag CF4 is set to 1 which shows the slip convergent condition. Then, the flow advances to step S205. On the other hand, if it is determined in step S203 that the four-wheel slip control flag CF4 is not zero, the flow advances to step S205.

In step S205, as described above, the average circumferential speed VAV is, first, calculated by dividing the sum of the circumferential speed VFLn, VFRn, VRLn and VRRn by four. Then, in the next step S206, the sum deviation ε is calculated from the equation:

$$\epsilon = (VFLn - VAV)^2 + (VFRn - VAV)^2 + (VRLn - VAV)^2 + (VRRn - VAV)^2$$

In the following step S207, it is determined whether or not the sum deviation ε thus obtained is Za or less. If it is determined that the sum deviation ε is not Za or less, the flow advances to step S183 in which the operation (TGBR is set to TG1) in the step S183 is conducted similarly to the cases of the above-described cases of steps S183, S194, S199 and S200. Thus, this program is ended.

On the other hand, if it is determined in step S207 that the sum deviation ε is Za or less, the flow advances to step S208 in which the target slip ratio TGTR is set to the predetermined value TG1, and the four-wheel slip control flag CF4 is set to 2. Furthermore, the built-in timer is started so as to start the measurement of elapsed time T. In the next step S210, it is determined whether or not the elapsed time T is longer than a predetermined time period Tx. If the elapsed time is shorter than Tx, the processing in step S183 is similarly executed. Thus, this program is ended. If it is determined that the elapsed time T is Tx or longer, the flow advances to step S213 in which each of the brake control execution flag EBF, the throttle control execution flag ETF, the three-wheel simultaneous slip generation flag CF3, the four-wheel slip control flag CF4 and the slipped wheel counter SN is set to zero. Furthermore, the built-in timer is reset, and the processing in step S183 is similarly conducted. Thus, this program is ended.

If it is determined in step S201 that the slipped wheel counter SN is not four, the processing in steps S213 and S183 are similarly conducted. Then, the flow returns to the origin.

Figure 8:
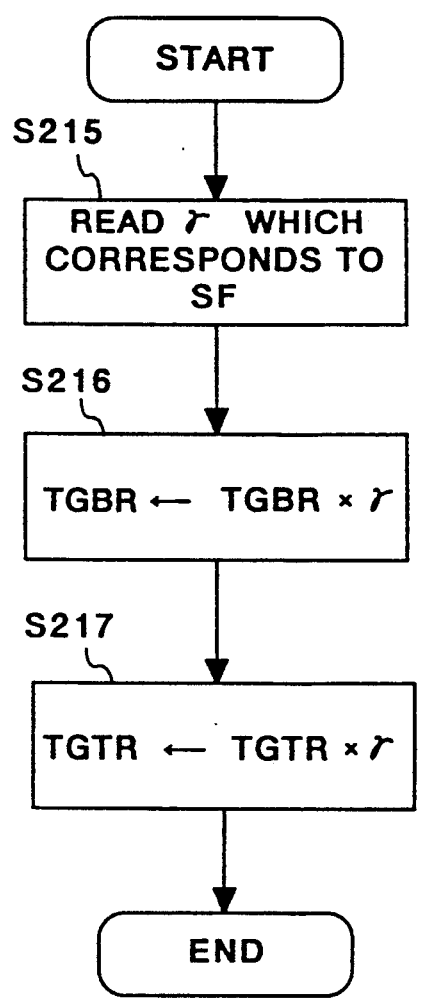
FIG. 8 is a flow chart of the sub-routine in an operation for correcting the target slip ratio performed in the slip controls of the first and second embodiments.

Then, the target slip ratio correction program to be executed in step S106 shown in the flow chart shown in FIG. 3 will be described. As shown in FIG. 8, correction coefficient $\gamma$ corresponding to the number of the slipped wheels denoted by the slipped wheel counter SN is read from the included memory in step S215 after the control has been started, where $\gamma$ represents a constant which becomes 1 when SN=0 and decreases in inverse proportion to SN. In step S215, the target slip ratio TGBR is multiplied by the correction coefficient $\gamma$ thus read out so as to determine a novel target-slip ratio TGBR. In step S217, the target slip ratio TGTR is multiplied by the correction coefficient $\gamma$ thus read out in step S215 so as to determine a novel target-slip ratio TGBR. Thus, this program is ended.

Figure 9:
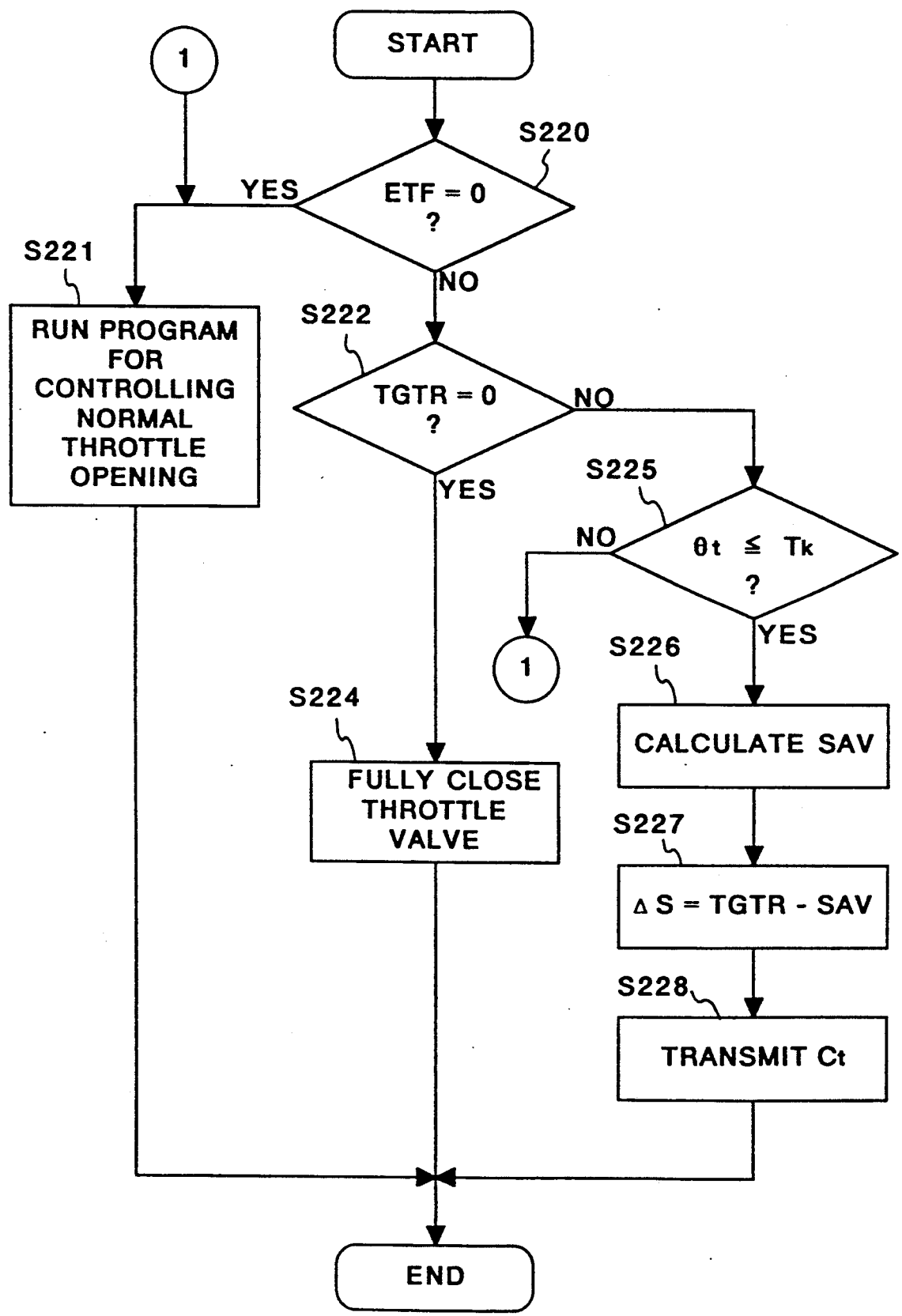
FIG. 9 is a flow chart of the sub-routine in a throttle control operation performed in the slip control.

According to the throttle control program to be executed in step S107 shown in the flow chart shown in FIG. 3, it is first determined in step S220 whether or not the throttle execution flag ETF is zero after the control start as shown in, for example, FIG. 9. If it is determined that the throttle execution flag ETF is zero, the flow advances to step S221 in which a normal throttle open degree control program is conducted. Thus, this program is ended. If it is determined in step S220 in which the throttle control execution flag ETF is not zero, the flow advances to step S222 in which it is determined whether or not the target slip ratio TGTR is zero. If it is determined that the target slip ratio TGTR is zero, the flow advances to step S224 in which the throttle valve operating signal CT is supplied to the throttle actuator 13 so as to fully close the throttle valve 14. Thus, this control program is ended.

If it is determined in step S222 that the target slip ratio TGTR is not zero, the flow advances to step S225 in which it is determined whether or not the open degree $\theta t$ of the throttle valve 14 is a normal target throttle open degree TK or less. If the open degree $\theta t$ of the throttle valve 14 is larger than the normal throttle open degree TK, the flow advances to step S221 in which the normal throttle open degree control program is conducted. Thus, this program is ended.

If it is determined in step S225 that the open degree $\theta t$ of the throttle valve 14 is the normal target-throttle open degree TK or less, the flow advances to step S226 in which an average slip ratio SAV of the wheels which are being slipped on the road by a degree exceeding a predetermined level is calculated by using the above-described estimated vehicle speed Vn, the wheels being determined from the front left wheel 20L, the front right wheel 20R, the rear left wheel 21L and the rear right wheel 21R. In step S227, difference $\Delta S$ is calculated by subtracting the average slip ratio SAV from the target slip ratio TGTR. In the next step S228, the throttle valve operation signal (the feedback control signal) Ct corresponding to the difference $\Delta S$ is formed in order to make the average slip ratio SAV coincide with the target slip ratio TGTR. The throttle valve operation signal Ct thus formed is supplied to the throttle actuator 13. Thus, this control program is ended.

Figure 10:
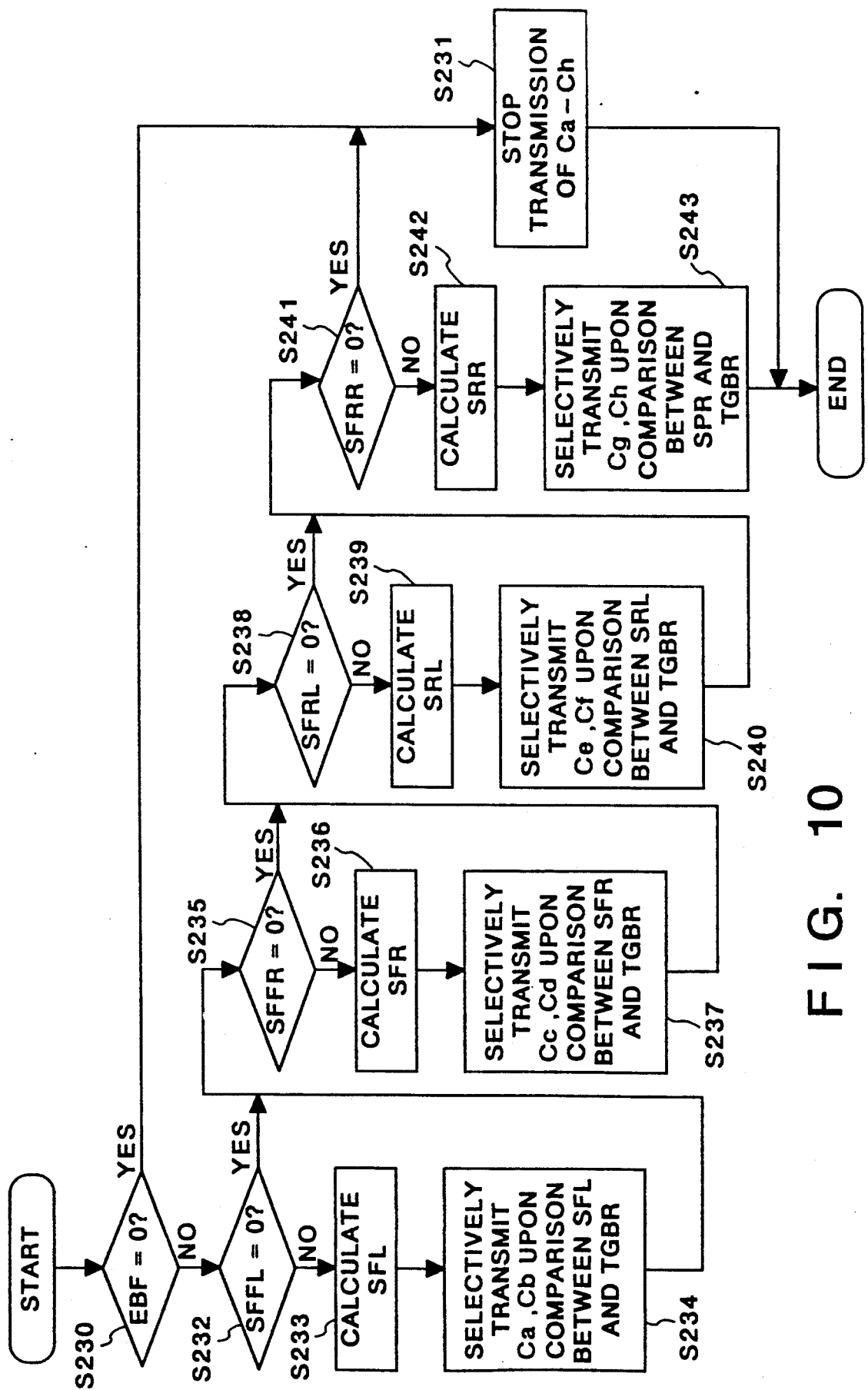
FIG. 10 is flow chart of the sub-routine of a brake control operation performed in the slip control of the first embodiment.

According to the brake control program to be executed in step S108 shown in the flow chart shown in FIG. 3, it is determined in step S230 whether or not the brake control execution flag EBF is zero after the start of the control for example as shown in a flow chart shown in FIG. 10. If it is determined that the brake control execution flag EBF is zero, the flow advances to step S231 in which the supply of the operation signals Ca to Ch is stopped so as to release each of the disc brakes 35A to 35D. Thus, this program is ended.

If it is determined in step S230 that the brake control execution flag EBF is not zero, the flow advances to step S232 in which it is determined whether or not the front left wheel slip flag SFFL is zero. If it is determined that the front left wheel slip flag SFFL is not zero, the flow advances to step S233 in which the actual slip ratio SFL of the front left wheel 20L is calculated by using the estimated vehicle speed Vn from an equation:

$$SFL=(VFLn-Vn)/VFLn.$$

In the next step S234, the operation signals Ca and Cb are selectively supplied to the electromagnetic valves 51 and 52 in accordance with a result of a comparison made between the actual slip ratio SFL and the target slip ratio TGBR for the purpose of causing the actual slip ratio SFL and the target slip ratio TGBR to coincide with each other. Then, the flow advances to step S235. If it is determined in step S232 that the front left wheel slip flag SFFL is zero, the flow also advances to step S235. In step S235, it is determined whether or not the front right wheel slip flag SFFR is zero, If it is determined that the front right wheel slip flag SFFR is not zero, the actual slip ratio SFFR is calculated by using the estimated vehicle speed Vn from an equation in step S236:

$$SFR=(VFRn-Vn)/VFRn$$

In the next step S237, the operation signals Cc and Cd are selectively supplied to the electromagnetic valves 53 and 54 in accordance with a result of a comparison made between the actual slip ratio SFR and the target slip ratio TGBR for the purpose of causing the actual slip ratio SFR and the target slip ratio TGBR to coincide with each other. The flow then advances to step S238. If it is determined that the front right wheel slip flag SFFR is zero in step S235, the flow also advances to step S238. In step S238, it is determined whether or not the rear left wheel slip flag SFRL is zero. If it is determined that the rear left wheel slip flag SFRL is not zero, the flow advances to step S239 in which the actual slip ratio SRL of the rear left wheel 21L is calculated by using the estimated vehicle speed Vn from an equation:

$$SRL=(VRLn-Vn)/VRLn$$

In the next step S240, the operation signals Ce and Cf are selectively supplied to the electromagnetic valves 55 and 56 in accordance with a result of a comparison made between the actual slip ratio SRL and the target slip ratio TGBR for the purpose of causing the actual slip ratio SRL and the target slip ratio TGBR to coincide with each other. The flow then advances to step S241. If it is determined that the front right wheel slip flag SFRL is zero in step S238, the flow also advances to step S241. In step S241, it is determined whether or not the rear right wheel slip flag SFRR is zero. If it is determined that the rear right wheel slip flag SFRR is not zero, the flow advances to step S242 in which the actual slip ratio SRR of the rear right wheel 21R is calculated by using the estimated vehicle speed Vn from an equation:

$$SRR-(VRRn-Vn)/VRRn$$

In the next step S243, the operation signals Cg and Ch are selectively supplied to the electromagnetic valves 57 and 58 in accordance with a result of a comparison made between the actual slip ratio SRR and the target slip ratio TGBR for the purpose of causing the actual slip ratio SRR and the target slip ratio TGBR to coincide with each other. Then, this program is ended. If it is determined in step S241 that the rear right wheel slip flag SFRR is zero, the processing in step S231 is similarly conducted, and this program is ended.

As is shown from the description made about the control unit 100, the power train control apparatus according to the first embodiment comprises torque distribution (torque split control) means in addition to the above-described slip control (the traction control) system so as to use the torque distribution control together with the slip control system.

In order to make the description easier, the contents (the basic program) of the torque distribution control system will be described prior to the description about the system combined with the above-described slip control (the correlated control program).

Figure 11A:
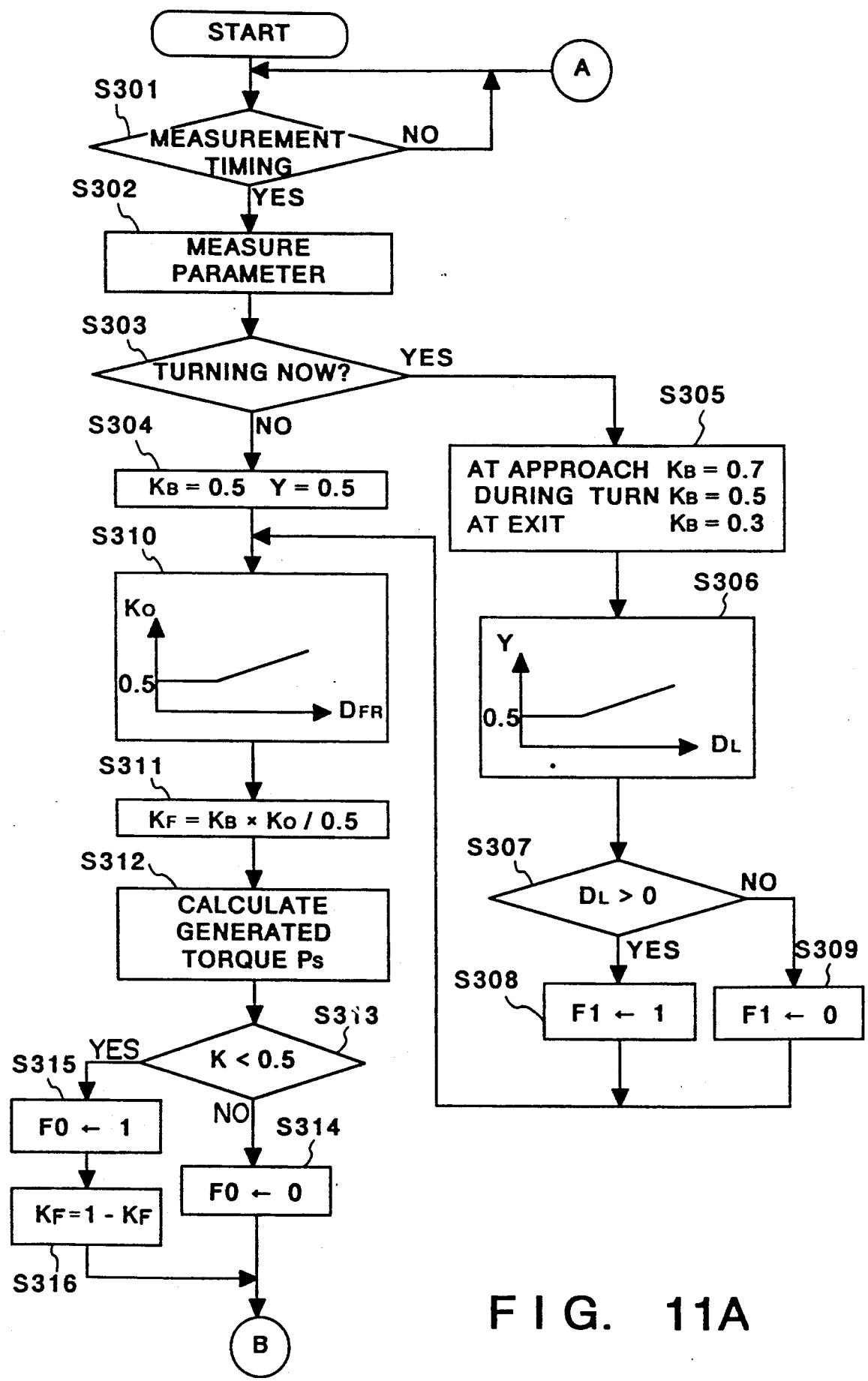
FIGS. 11A and 11B are flow charts of the operations performed in a torque distribution control (the torque split control) system of the first embodiment.
Figure 11B:
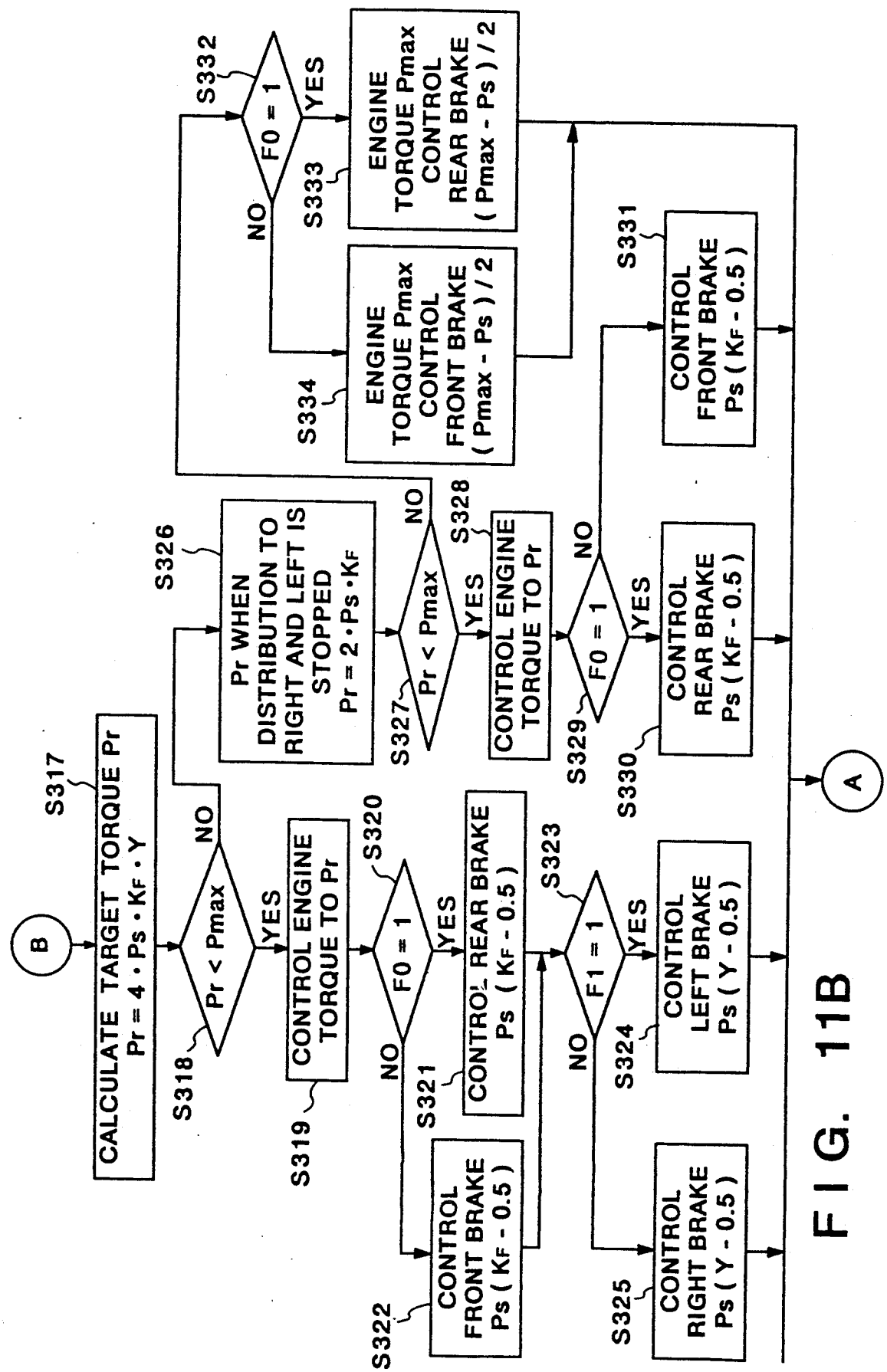

FIG. 11 is a flow chart of the program to be executed in the torque distribution control (the torque split control).

After the control operation has started, it is determined whether or not the time counting timing at every predetermined clock time has come in step S301. If it is determined that the time counting timing has come (in the case of YES), the longitudinal acceleration of the vehicle, the lateral acceleration, the accelerator open degree, the boost pressure, and the steering angle are measured in accordance with a signal supplied from each of sensors (step S302).

In step S303, it is determined whether or not the steering angle $\theta d$ is a predetermined value $\theta b$ or more, which shows the fact that the vehicle is being turned. If it is determined to be NO, which shows the fact that the vehicle is not being turned, the flow advances to step S304 in which the basic torque distribution ratio, that is, a torque distribution ratio KB between the front and the rear wheels is set to 0.5, while the lateral distribution ratio Y is also set to 0.5. Thus, the torque is equally distributed between the front wheels and the rear wheels and between the right wheels and the left wheels.

On the other hand, if it is determined in step S303 to be YES, which shows the vehicle is being turned, the flow advances to step S305 in which a longitudinal distribution ratio k is determined so as to correspond to the state in which the vehicle is being turned. The longitudinal distribution ratio KB is set to KB=0.7 so as to make the torque distribution to the rear wheels 21L and 21R large when the vehicle approaches the corner. The longitudinal distribution ratio KB is set to KB=0.5 so as to equally distribute torque to the front and rear wheels when the vehicle is being turned. Furthermore, the longitudinal distribution ratio is set to KB=0.3 when the vehicle exits from the corner so as to distribute larger torque to the front wheels. Thus, a good turning performance is obtained since the turning performance is improved by enlarging the force for rotating the rear wheels when the vehicle starts the turning, while the straight running performance is improved by enlarging the force for rotating the front wheels when the vehicle ends the running.

The torque distribution to the right and left wheels, when the vehicle is being turned, is arranged to be conducted in step S306 in such a manner that the more the lateral acceleration of the vehicle, the larger the lateral distribution ratio y is. In step S307, it is determined whether or not the lateral acceleration DL is a positive value (left turn). If it is determined to be YES, that is, if it is determined that the vehicle is being turned left, the turning flag F1 is set to 1 (step S308). If it is determined to be NO, that is, if it is determined that the vehicle is being turned right, the turning flag 1 is reset to 0 (step S309).

In step S310, a rear wheel distribution ratio KO is determined so as to correspond to the longitudinal acceleration DFR in such a manner that the larger the acceleration of the vehicle, the larger the torque is distributed to the rear wheels 21L and 21R. The longitudinal distribution ratio KB determined in step S304 or 305 is corrected (step S311) with the rear wheel distribution ratio KO. Thus, the rear wheel distribution ratio KF is finally obtained. When the vehicle is being turned, a larger torque is distributed to the rear wheels regardless of whether or not the vehicle is being turned.

Step S312 is a step in which a present torque Ps generated by the engine is calculated, the present engine torque Ps being obtained from a engine boost pressure B, a throttle open degree TVO or an accelerator open degree ACC. In step S313, it is determined whether or not the distribution ratio KF is larger than 0.5 (equal distribution). If it is determined to be NO, that is, if it is determined to be 0.5 or more, which shows a fact that a larger torque is distributed to the rear wheels, the flow advances to step S314 in which the torque distribution flag F0 is reset to 0. If it is determined to be YES, that is, if it is determined to be less than 0.5, which shows a fact that a larger torque is distributed to the front wheels, the distribution flag F0 is set to 1 in step S315. In addition, the longitudinal distribution ratio k is replaced by $1-k$ which is a value larger than 0.5.

Then, a required torque Pr, which is necessary to realize the above-described longitudinal distribution ratio KF and the lateral distribution ratio Y, is calculated in step S317, this required torque Pr being obtained by multiplying four times the distribution torque $Ps \times KF \times Y$, which is the torque distributed to the wheel to which the largest torque is distributed. It is determined whether or not the above-described required torque Pr is smaller than the engine maximum torque Pmax (step S318). If it is determined to be YES, which shows the fact that the engine torque has a margiral portion, the throttle open degree is increased in order to make the engine torque the same as the above-described required torque Pr (step S319). It is determined in step S320 whether or not the above-described torque distribution flag F0 has been set to 1. When the torque distribution flag F0 is reset to 0, which shows the fact that the vehicle is being accelerated, the load is shifted to the rear wheels. Therefore, in step S322, in order to decrease the torque to be applied to the front wheels in step S322, the control is so conducted that the disc brakes 35A and 35B of the front wheels 20R and 20L apply braking force to the front wheels 20L and 20R by a degree which is a half of the difference between the equal torque distribution and the longitudinal torque distribution. On the other hand, if it is determined in step S320 to be YES, which shows the torque distribution flag F0 has been set to 1, in order to decrease the torque to be applied to the rear wheels 21L and 21R in step S321, the control is so conducted that the disc brakes 35C and 35D of the rear right and the rear left wheels 20R and 20L apply braking force to the rear wheels by a degree which is a half of the difference between the equal torque distribution and the longitudinal torque distribution.

It is determined in step S323 whether or not the above-described turning flag F1 has been set to F1=1. If it is determined that it has been set to 1, which shows the fact that the vehicle is being turned left, the load is shifted to the left wheels 20L and 21L. Therefore, in order to decrease the torque to be applied to the left wheels 20L and 21L in step S24, the control is so conducted that the disc brakes 35A and 35C of the left wheels 20L and 21L apply braking force by a degree which is a half of the difference between the equal torque distribution and the longitudinal torque distribution. If it is determined in step S323 to be NO, which shows the fact the torque distribution flag F1 has been reset to 0, which shows the fact that the vehicle is being turned right, the load is shifted to left wheels 20L and 21L. Therefore, in order to decrease the torque to be applied to the right wheels in step S325, the control is so conducted that the disc brakes 35B and 35D of the right wheels 20R and 21R apply braking force by a degree which is a half of the difference between the equal torque distribution and the lateral torque distribution.

If it is determined in step S318 to be NO, which shows the fact that the required torque Pr is larger than the maximum engine torque Pmax, the desired torque Pr, when the lateral distribution is cancelled and the lateral distribution Y is set to 0.5, is calculated in step S326. Furthermore, it is determined whether or not the required torque Pr is smaller than the maximum engine torque Pmax (step S327). If it is determined to be YES, which shows the fact that the required torque Pr is smaller than the maximum torque Pmax, the throttle open degree is controlled so as to make the engine torque the same as the required torque Pr (step S328). Furthermore, similarly to steps S320 to S322, the control is conducted in steps S329 to S330 in such a manner that the braking force is applied to the front wheels at the time of acceleration, while the braking force is applied to the rear wheels at the time of deceleration in accordance with the state of the above-described torque distribution flag F0 with respect to the determined longitudinal distribution ratio Y.

If it is determined in step S327 to be NO, which shows a case in which the required torque Pr is larger than the maximum torque Pmax even if the lateral distribution is cancelled, the flow advances to step S332 in which it is determined whether or not the torque distribution flag F0 has been set to 1. If it has been reset to 0 at the time of acceleration, the flow advances to step S334 in which the engine torque is raised to the maximum torque Pmax and the control is conducted in such a manner that braking force is applied to the front wheels in order to conduct braking with the torque which corresponds to the half of the degree of increase in torque. At the time of deceleration in which the torque distribution flag F0 has been set to 1, the flow advances to step S333 in which the engine torque is raised to the maximum torque Pmax. Furthermore, the control is conducted in such a manner that braking force is applied to the rear wheels in order to conduct braking with the torque which corresponds to the half of the degree of increase in torque.

The above-described change in the torque distribution is, for example, conducted in such a manner that: assuming that the front wheels and the rear wheels are respectively rotated with the rotating torque of 50 kg.m, torque Ps generated by the engine corrected so as to be equivalent to the force for rotating the wheels by a transmission becomes 100 kg.m. In this state, assuming that a sum braking torque of 30 kg.m is applied to the right and the left wheels in accordance with the state of the acceleration and the rotating torque which has been lost due to the application of the braking torque is compensated by an increase in the engine output, the necessary engine output torque Pr becomes 130 kg.m. The necessary engine output torque Pr is equally distributed by each 65 kg.m to the front and the rear wheels. Therefore, the finally-distributed torque for the front wheels becomes 65−30=35 kg.mm, while that for the rear wheels becomes 65 kg.m. As a result, the torque distribution ratio k for the rear wheels becomes 0.65.

Modification to the First Embodiment

Modification to Slip Control

According to the first embodiment, the first control mode, in which only the brake control is conducted in accordance with the combination of the slipped wheels in the case where the number of the slipped wheels is two, and the second control mode, in which the throttle control is conducted in addition to the brake control, are conducted. Furthermore, the system according to the first embodiment is arranged in such a manner that the different target slip ratios are employed between the case in which the left wheels or right wheels or the rear wheels are slipped wheels and the case in which the other two wheels are slipped wheels, the former case easily influencing the running stability of the vehicle. However, the slip control apparatus for a 4WD vehicle according to the present invention is not limited to be arranged as described above. For example, the structure may, of course, be arranged so as to conduct the slip control in the second control mode in such a manner that: both the brake control and the throttle control are conducted with the target slip ratios determined to be the same value; and the degree of the reduction in the torque for rotating the above-described slipped wheels due to the brake control and the degree of the reduction in the same due to the throttle control are made different in accordance with the combination of the two slipped wheels.

According to the above-described embodiment, the specific slip ratio for a vehicle from which a slip of a level exceeding a predetermined level is calculated, and the torque for rotating the specific wheel is changed so as to make the thus calculated slip ratio coincide with the predetermined value. However, the slip control apparatus for a 4WD vehicle according to the present invention is not limited to the description above. For example, the quantity of the slip for the specific wheel is calculated by subtracting the estimated vehicle speed from the circumferential speed of the specific wheel from which the slip exceeding a predetermined level has been detected, and the torque for rotating the specific wheel is changed so as to make the thus calculated slip quantity coincide with the target value.

According to the above-described embodiment, the structure is arranged in such a manner that the engine output torque can be varied by changing the degree of the throttle opening at the time of the slip control. The present invention is not limited to the description above. For example, the change in the throttle opening may, of course, be replaced by changing the air-fuel ratio, the ignition timing, the quantity of the rotary flow, the suction and the exhaust valve timing, the supercharged pressure, and the fuel injection timing.

Furthermore, according to the above-described embodiment, the power train control system is applied to a full time 4WD vehicle arranged to be always in the 4WD mode. The present invention is not limited to this description. For example, the power train control system according to the present invention may, of course, be applied to a so-called a part time 4WD vehicle arranged to be optionally and selectively changed between the 4WD mode and the 2WD mode.

Modification to Torque Distribution

According to the above-described embodiment, the structure is arranged in such a manner that the braking force can be changed independently in each of the four wheels so as to make the torque distribution to each of the wheels capable of being changed. However, the braking force may, of course, be independently varied between the front wheels and the rear wheels so as to make the torque distribution capable of being changed only on the front wheel side or the rear wheels side or only on the right wheel side or the left wheel side.

Second Embodiment

Outline

As described above, the slip control (the traction control) and the torque distribution control (the torque split control) of the driving wheel according to the first embodiment significantly contribute to the vehicle running stability and thereby improve the driving stability and the accelerating performance. However, a problem caused from an interference with each other can take place when these two controls are simultaneously operated as described made about the prior art. Therefore, the inventors have classified the above-described problem caused from the above-described interference and arranged a second embodiment of overcome the problem.

Figure 12A:
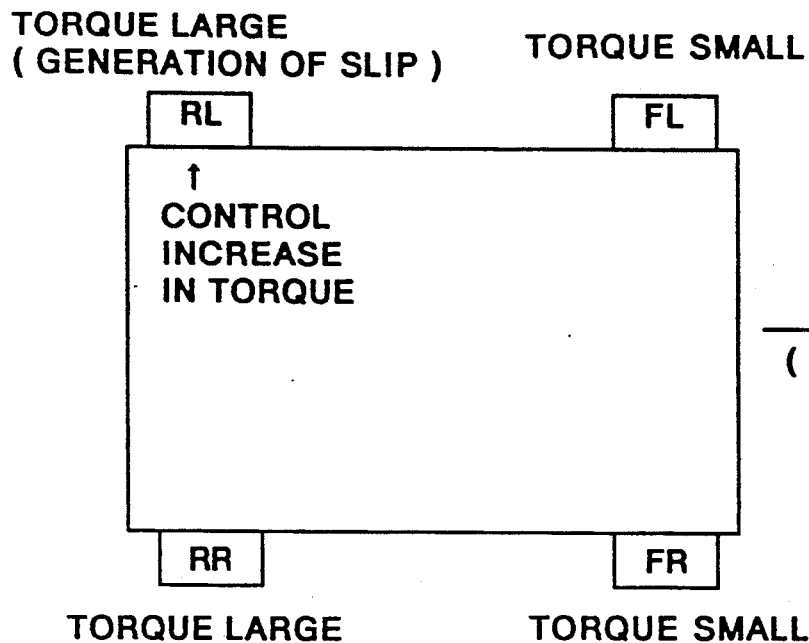
FIGS. 12A and 12B illustrate the problem which is intended to be overcome by the second embodiment of the present invention.

The first problem caused from the interference can take place in the case when the torque split becomes necessary during the slip control. For example, it is provided that the vehicle is started or turned on a road having a low friction coefficient. As shown in FIG. 12A, it is necessary for both the slip control to overcome the slip generated and the torque split control to overcome the non-uniform load distribution between the wheels to be conducted simultaneously. Furthermore, the wheels which are being subjected to the slip control are subjected to an increase in torque by the torque split control. When the rear wheel slips at the time of vehicle start, torque distributed to the rear wheel which is being subjected to the slip control is increased. Therefore, the convergence of the slipped state becomes difficult. That is, the superimposed control of the slip control and the torque split control arises a problem in this case. On the other hand, when the front wheel slips at the time of vehicle start, an increase in the torque distribution ratio to the rear wheels by the torque split control conducted in addition to the slip control conducted for the front wheel can improve the starting performance and the turning performance at the early stage of the turning operation if the turning of the vehicle is simultaneously conducted in addition to the vehicle start. Furthermore, a decrease in the torque to be distributed to the front wheel by the torque split control can cause the slip to be converged in a relatively short time. As described above, in the same starting cases of the vehicle on a road having a low resistance, the increase in the distribution of the driving force by the torque split control can improve the drivablity or can decrease the same depending upon the position of the slipped wheel and the number of the slipped wheels.

Therefore, according to the structure of the control according to the second embodiment, an increase in torque to be applied to the wheel which is being subjected to the above-described slip control is prevented by the torque split control. The details of the control will be apparent from the description made with reference to the control procedure shown in FIG. 15.

Figure 12B:
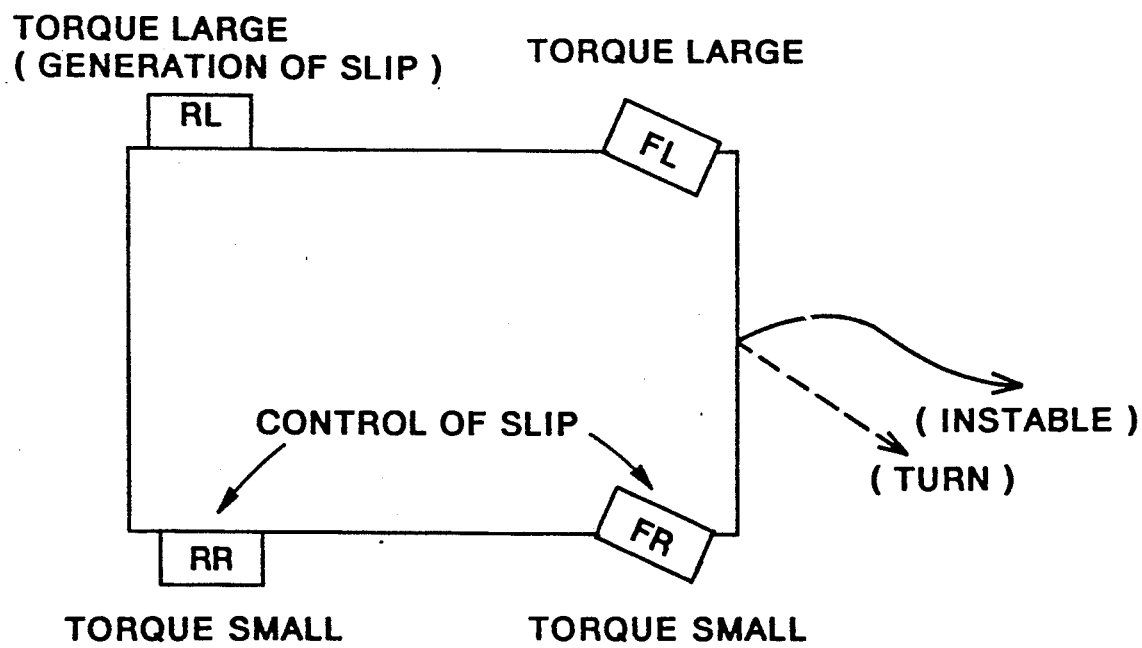

A further technology is employed in the second embodiment. That is, a second problem caused from the interference takes place as follows:

On the contrary to the first problem caused from the interference, a second problem caused from the interference takes place when a necessity of conducting the slip control arises during the torque split control. It is assumed that the vehicle is turned on a road having an excessive change in the road resistance. As shown in FIG. 12B, when a lateral acceleration is detected during the right turn of the vehicle, the torque split control in accordance with the shift of the load is conducted so that engine output torque is properly distributed in such a manner that a relatively large torque is distributed to the wheels (FL and RL) which are positioned at this turning operation. If the rear left wheel (RL) which is positioned outside slips due to change in the road at this time, the increase in torque to be applied to the rear left wheel RL which is positioned outside due to the torque split control must be stopped as described when the first problem caused from the interference. However, if the torque split control is simply stopped, the following problem takes place: that is, all of the wheels is not always slipped. According to this example, at the time when the rear left wheel RL slips, torque applied to the inner wheels (FR and RR) is reduced since larger torque is being distributed o the outer wheels (FL and RL). It is easy to stop the torque split control in order to decrease torque to be applied to the slipped outer wheels. However, if the torque split control is stopped, torque is equally distributed to the wheels. Therefore, the inner wheels (FR and RR) to which reduced torque has been applied is rapidly applied with large torque. Therefore, there arises a fear of a novel slip of the inner wheels (FR and RR). If the whee's do not slip, the turning performance of the vehicle deteriorates due to the reduced turning force of the wheels which are positioned in the turning and being slipped and the turning force of the inner wheels to which torque, which is excessive amount to turn, is applied. Therefore, the motion of the vehicle becomes instable.

In order to overcome the problem caused from the second interference condition, the second embodiment is arranged as follows: in the case where any of the wheels slips during the torque split control and thereby the torque split control must be stopped, the control is conducted in such a manner that: the wheel, to which excessive torque is rapidly applied when the torque split control is stopped, is detected as an alternative to the immediately stopping the torque split control. The wheel thus detected is subjected to the slip control regardless of the fact that this wheel slips for the purpose of preventing the rapid rise in the applied torque. The control procedure for preventing the second interference condition will be described in detail with reference to a flow chart shown in FIG. 14.

Detailed Description of the Control

Figure 13:
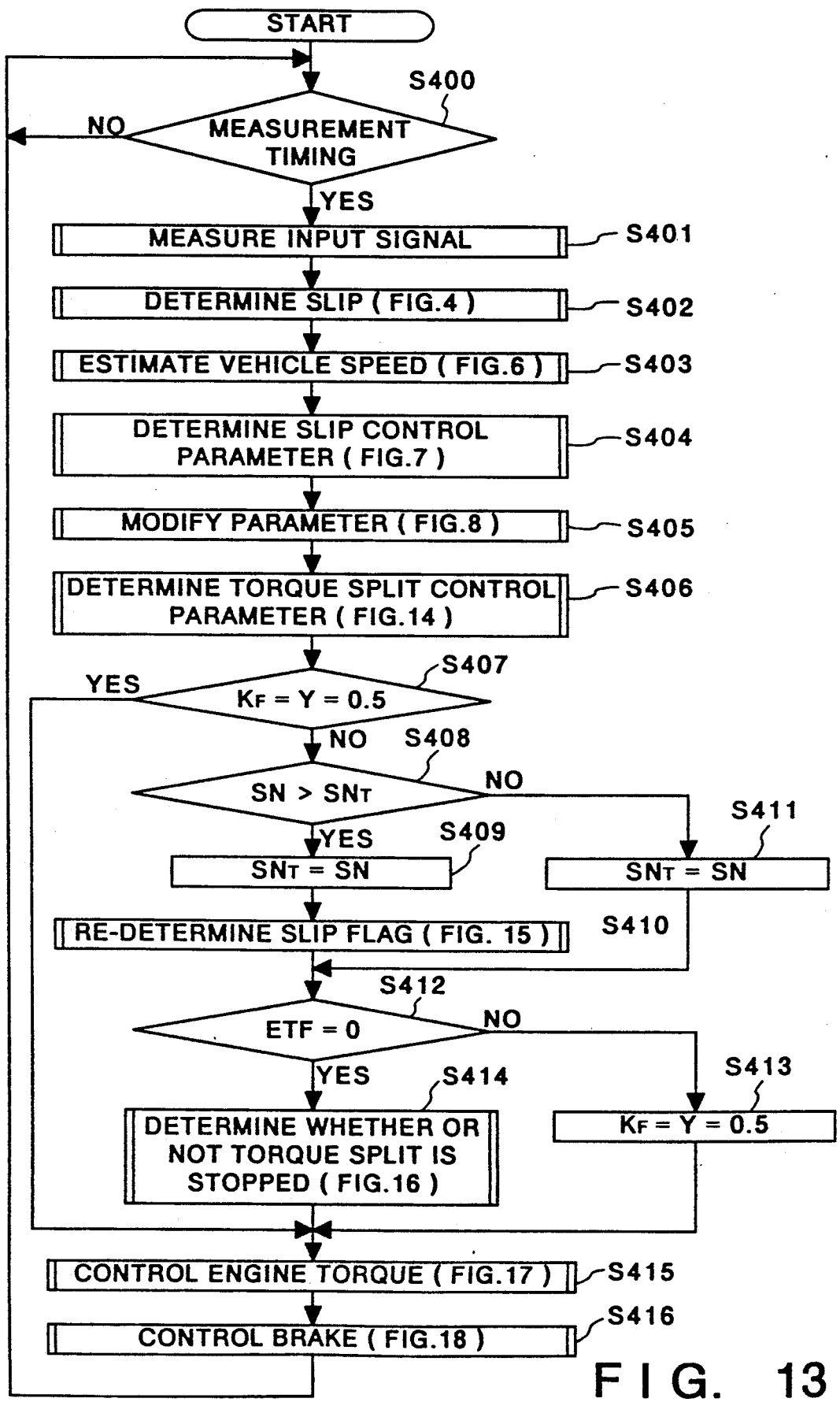
FIG. 13 is an overall view of the main flow chart of the control operations performed in the second embodiment.

FIGS. 13 to 19 illustrate the control in detail according to the second embodiment. FIG. 13 illustrates the main program of the control procedure according to the second embodiment. FIGS. 14 to 19 illustrate various sub-routines for use in the controls according to the second embodiment. As described above, both the torque split control and the slip control directly control the engine output (that is, the throttle open degree control signal Ct) and the brake control (that is, the actuator control signal Ca to Cn) of each of the wheels. Signals for use in the controls according to the second embodiment will be shown in Table 2.

TABLE 2

| Types | Sig's | Meaning |
|---|---|---|
| Input Signals | VFL | Circumferential speed of front left wheel |
| | VFR | Circumferential speed of front right wheel |
| | VRL | Circumferential speed of rear left wheel |
| | VRR | Circumferential speed of rear right wheel |
| | $\Theta a$ | Displacement of accelerator |
| | $\Theta t$ | Degree of opening of throttle |
| | $\Theta s$ | Steering angle |
| | $\beta$ | Boost pressure |
| | DFR | Acceleration in the longitudinal direction of car body |
| | DL | Acceleration in the lateral direction of car body |
| Output Signals | Ca to Ch | Brake control signals |
| | Ct | Throttle driving signal |
| Working Data | Vn | Estimated vehicle speed |
| | TGBR | Target slip ratio of braking |
| | TGTR | Target slip ratio of throttle |
| | SFL | Actual slip ratio of front left wheel |
| | SFR | Actual slip ratio of front right wheel |
| | SRL | Actual slip ratio of rear left wheel |
| | SRR | Actual slip ratio of rear right wheel |
| | SN | Total number of wheel which are being slipped |
| | SSN | Number of wheels slipped simultaneously |
| | SFFL | Flag showing slip of front left wheel (1: generation of slip) |
| | SFFR | Flag showing slip of front right wheel (1: generation of slip) |
| | SFRL | Flag showing slip of rear left wheel (1: generation of slip) |
| | SFRR | Flag showing slip of rear right wheel (1: generation of slip) |
| | EBF | Flag for executing brake control (1: execution of control) |
| | ETF | Flag for executing throttle control (1: execution of control) |
| | SAV | Average slip ratio |
| | VAV | Average speed of car body |
| | SFQ | Flag for determining slip (1: generation of slip) |
| | $\gamma$ | Correction coefficient for slip ratio |
| | $\epsilon$ | Deviation of speed |
| | TG1 to TG3 | Constants for target slip ratio |
| | KB | Basic ratio of distributing engine output torque to two rear wheels |
| | KF | Final ratio of distributing engine output torque to two rear wheels |
| | Y | Ratio of distributing engine output torque to two right wheels |
| | Ps | Engine output desired by driver |
| | PR | Necessary engine output |
| | PMAX | Maximum engine output |
| | FO | Torque distribution flag (1: torque to be distributed to front wheels is larger than rear wheels, |

TABLE 2-continued

| Types | Sig's | Meaning |
|---|---|---|
| | | 0: torque to be distributed to front wheels is smaller than rear wheels) |
| | Fl | Turn flag (1: left turn, 0: right turn) |
| | TBSTFL | Front left wheel brake torque for torque split control |
| | TBSTFR | Front right wheel brake torque for torque split control |
| | TBSTRL | Rear left wheel brake torque for torque split control |
| | TBSTRR | Rear right wheel brake torque for torque split control |
| | TBTRFL | Front left wheel brake torque for slip control |
| | TBTRFR | Front right wheel brake torque for slip control |
| | TBTRRL | Rear left wheel brake torque for slip control |
| | TBTRRR | Rear right wheel brake torque for slip control |
| | MBTRFL | Front left wheel brake torque correction for torque slip control |
| | MBTRFR | Front right wheel brake torque correction for torque slip control |
| | MBTRRL | Rear left wheel brake torque correction for torque slip control |
| | MBTRRR | Rear right wheel brake torque correction for torque slip control |

In step S400 shown in FIG. 13, it is determined whether or not the measuring timing for each of the input signals has come. In case of the measuring timing, the variety of the input signals shown in Table 2 are read from the corresponding sensors. In steps S402 and S403, the slip determination and vehicle speed estimation are conducted in accordance with the input signals thus read from the sensors. Since the slip state determination in step S401 is conducted in the same manner as that conducted in the first embodiment, the flow chart shown in FIG. 4 and employed in the first embodiment is invoked. In step S402, the state of slip taken place the wheels is stored in the corresponding flags SFFL, SFFR, SFRL and SFRR, the sum of the slipped wheels is stored in the counter SN, and the number of wheels which have slipped simultaneously is stored in the SSN. Since the process for estimating the vehicle speed Vn in step S403 is conducted in the same manner as that conducted in the first embodiment, the control procedure shown in the flow charts shown in FIGS. 6A and 6B for the first embodiment are invoked.

Determination of Slip Control Parameter

Then, in step S404, the parameters for use in the slip control are determined. In the parameter determining operation is conducted in such a manner that the whether or not the brake control and the throttle control are conducted in accordance with the slip state flag (SFFL or the like) and the slipped wheel counter SN or the like is registered in the flags EBF and ETF. Furthermore, the target slip ratios (TGBR and TGTR) are determined. In this step S404, the supervisory of the state of slip of the four wheels is also conducted. Since the details of step S404 for determining each of the parameters for use in the slip control are the same as those conducted in the first embodiment, the control procedure in S404 invokes that shown in the flow charts shown in FIGS. 7A and 7B for the first embodiment. Thus, the state of the brake control execution flag EBF the throttle control execution flag ETF, the target slip ratio TGBR for the brake control for the slip control, and the target slip ratio TGTR for the throttle control for the slip control are determined in accordance with the slipped wheel counter SN, the simultaneous slip wheel number SSN, and the position of the slipped wheel (SFFR or the like) in accordance with the control parameter determining routine in a manner shown in the table shown in FIG. 2A.

Then, the slip convergent supervising control in the case where the four wheels have slipped (SN=4) will be described in detail. The state of each of the control from the time at which the four wheels have slipped to the time at which the same is overcome is tracked by the value of the status counter CF4. When the slip of the four wheels is taken place, CF4=0, then, the value being changed CF4=1, 2 and 0.

Figure 7A:
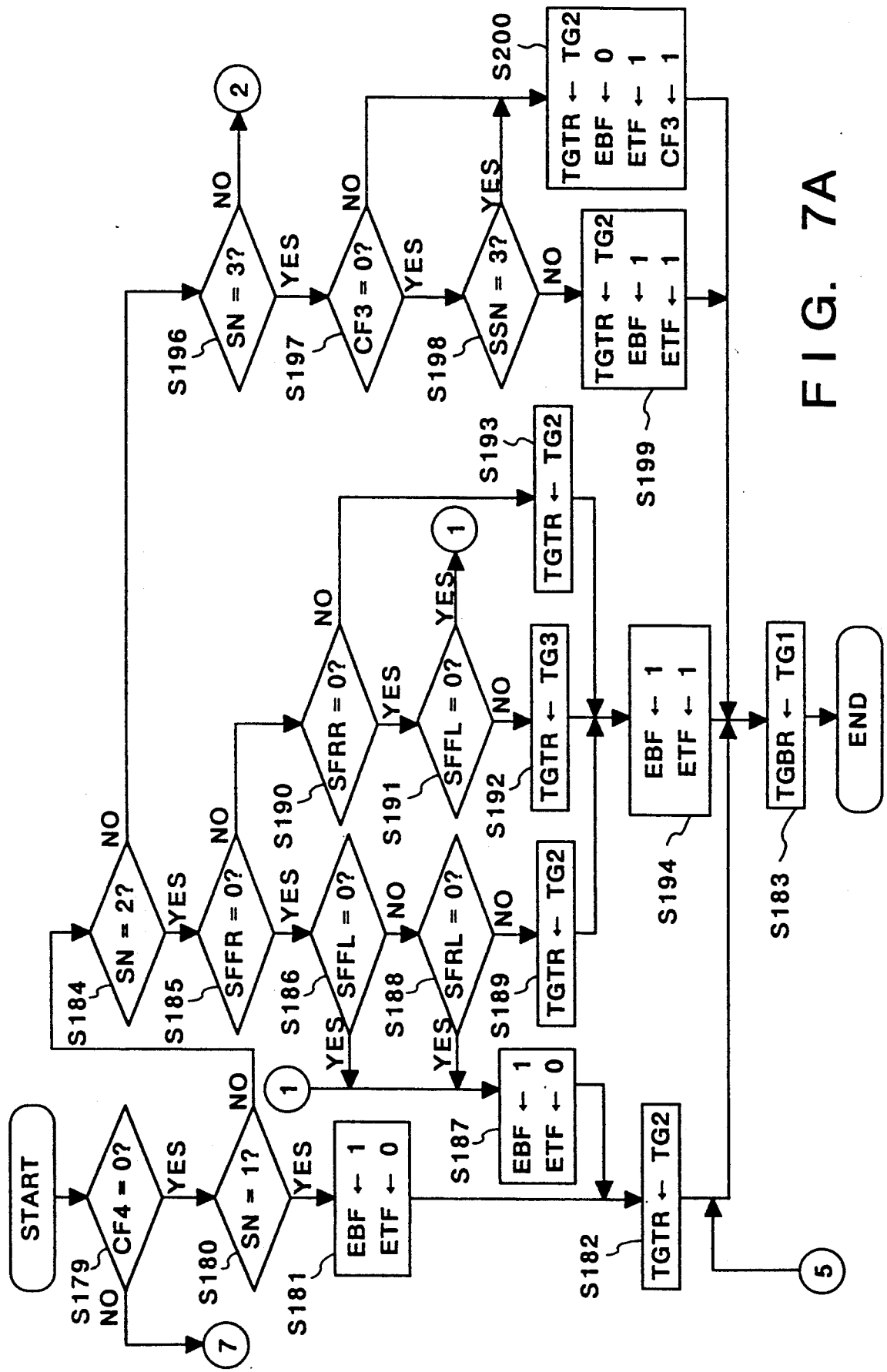
FIGS. 7A and 7B are flow charts of the sub-routine in an operation for determining the control mode performed in the slip control systems of the first and second embodiments.
Figure 7B:
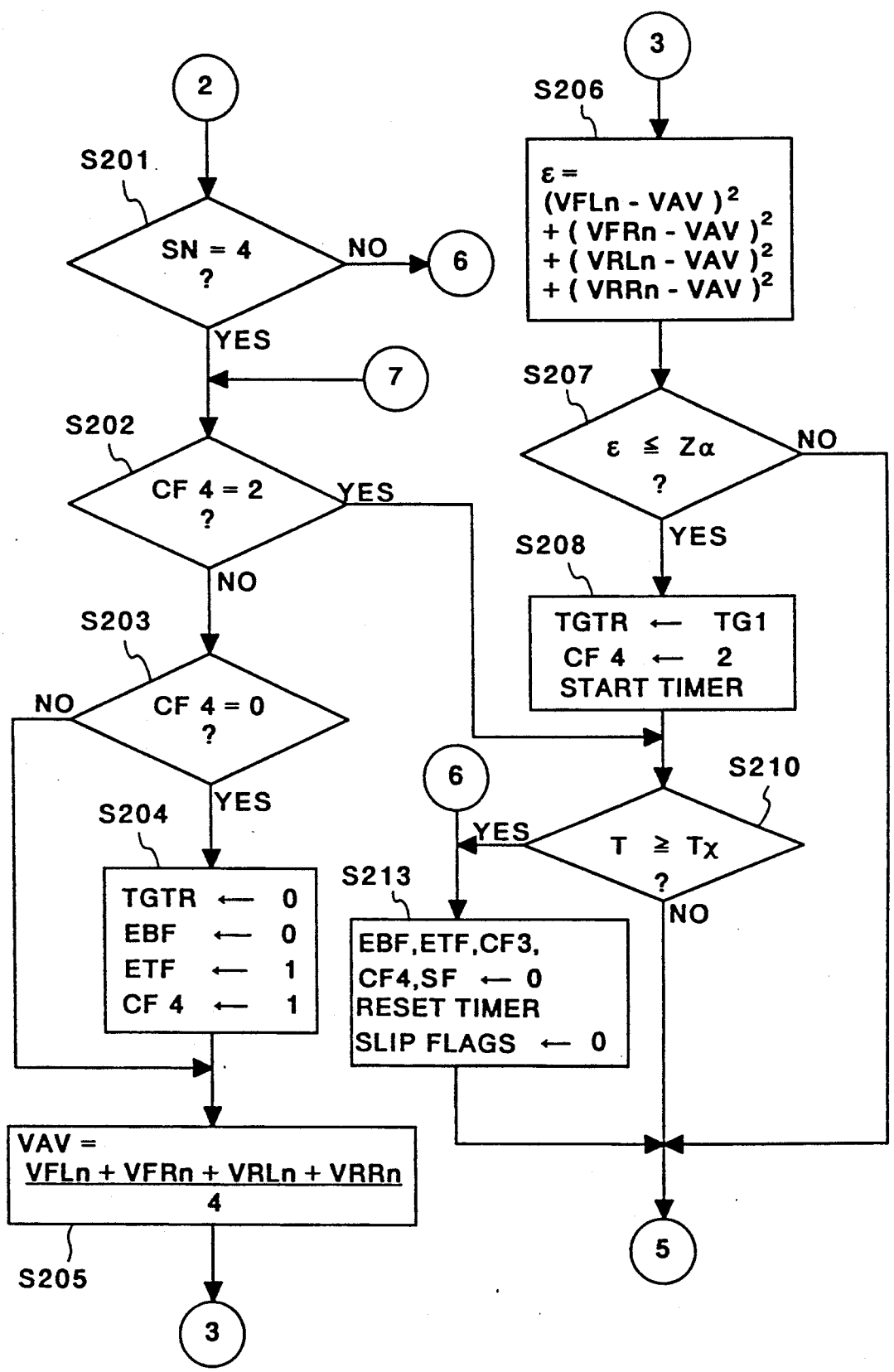

Immediately after the four wheels have slipped, the flow advances, as shown in FIG. 7B, from step S201 to step S204 via steps S202 and S204. In step S204, it is arranged that EBF=0 in order to stop the brake control. In order to fully close the throttle valve with the throttle control conducted, it is arranged that ETF=1 and also TGTR=0. In step S204, the status showing the fact that the control for converging the slipped state of the four wheels has been started is stored in the form of CF4=1.

In step S205, the average vehicle speed VAV is estimated from the following equation. In step S206, the deviation ε of the circumferential speed (VFL, VFR, VRL and VRR) of the four wheels is calculated.

The control procedure repeats the flow from step S201 to S183 via step 202, step S203, step S205, step S206 and step S207 until the fact that ε has become a threshold Za or less. During the above-described period, the following relationships are retained:
  CF4=1, EBF=0, ETF=1,
  TGTR=0 and TGBR=TG1

When it has been detected in step S207 that the slip of each of the wheels has been converged and the deviation ε of the circumferential speed has become Za or less (ε≦Za), the flow advances to step S208 in which the target slip ratio TGTR for the throttle control is replaced by TG1 (TGTR=TG1), and the throttle is slightly opened from the fully closed condition. Furthermore, the timer for the period Tx is started and CF4 showing the fact that the timer has been started is replaced by 2.

The control procedure repeats the flows from step S201 to S183 via step S202 and step S210 until the timer has counted up in step S210. During the above-described period, the followings are retained:
  CF4=2, EBF=0, ETF=1,
  TGTR=TG1 and TGBR=TG1

After time Tx which has been predetermined in which the slip of the four wheels can be completely converged has been elapsed, the determinations are made in step S213 in such a manner that: CF4, CF3, EBF, ETF, SN, SFFL, SFFR, SFRL and SFRR=2, EBF=0 and ETF=1.

Backing to the description with reference to FIG. 13, in step S405, the target slip ratios TGTR and TGBR determined in step S404 are modified. That is, TGTR and TGTR are multiplied by the coefficient γ which changes in accordance with the slipped wheel counter SN so as to be modified as follows:

TGBR=TGBR×γ   (step S216)

TGTR=TGTR×γ   (step S217)

Thus, they are modified to the proper target slip ratios in accordance with the present number of the slipped wheels.

Determination of Torque Split Control Parameter

Figure 14:
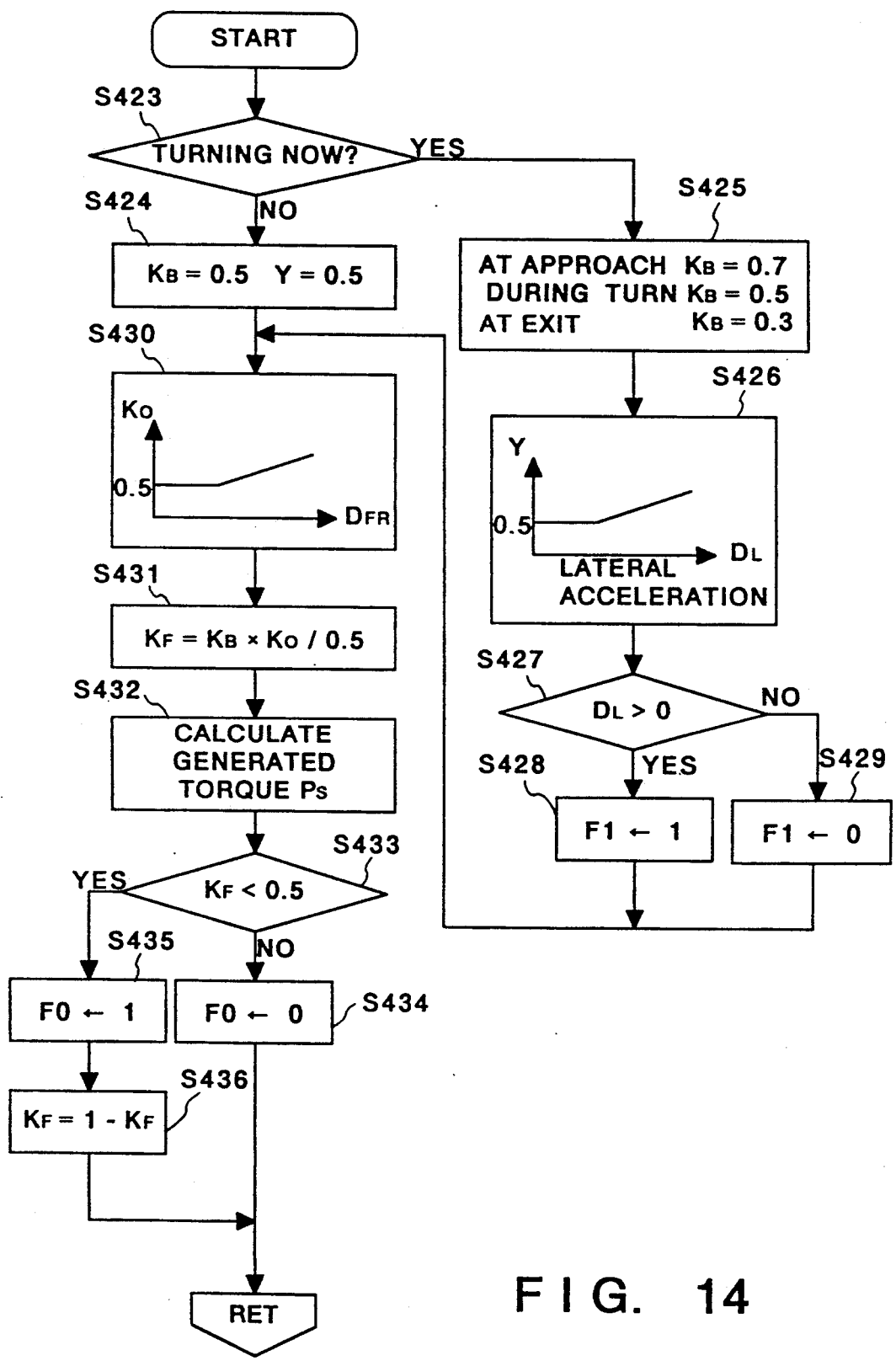
FIG. 14 is a flow chart of the sub-routine in the operations for determining a parameter for controlling the torque split according to the second embodiment.

The details of the torque split control parameter determining routine in step S406 are shown in FIG. 14. In step S423, it is determined from the steering angle signal $\theta s$ whether or not the vehicle is being turned, If it is determined that the vehicle is not being turned, the flow advances to step S424 in which the basic torque-distribution ratio Ks to the two rear wheels is set to 0.5, while the torque distribution ratio Y to the two right wheels is set to 0.5. That is, the torque distribution ratio is determined in such a manner that the same torque is distributed to the front wheels and the rear wheels and to the right wheels and the left wheels.

On the other hand, if it is determined in step S423 that the vehicle is being turned, the flow advances to step S425 in which the basic torque-distribution ratio Ks is set to 0.7 at the time of the turn start in which the vehicle turning performance is required, the basic torque distribution ratio KB is set to 0.5 during the turn, and the basic torque distribution ratio KB is set to 0.3 at the time of finish of the turn in which the straight running performance is required for the purpose of raising force for rotating the front wheels. Thus, proper torque-distribution ratios are suitably determined for each of the stages of the turning of the vehicle so that the vehicle turning performance is improved.

As for the torque distribution between the right wheels and the left wheels, the torque distribution ratio (the absolute value) Y to the right wheels is set to a value larger than 0.5 in accordance with the value of the lateral acceleration DL so as to be in proportion to the acceleration DL. More specifically, in the case where the vehicle is being turned left at which the acceleration DL becomes a positive value, that is, in the case where a relatively larger torque must be distributed to the right wheels, the flag F1 is set to "1" in step S428. In the case where the vehicle is being turned right at which the acceleration DL becomes a negative value, that is, in the case where a relatively larger torque must be distributed to the left wheels, the flag F1 is set to "0" in step S429.

After the basic torque distribution ratio KB to the rear wheels and the torque distribution ratio Y to the right wheels have been calculated, the flow advances to steps S430 to S436 in which the final torque-distribution ratio KF to the rear wheels is determined. That is, correction coefficient KO corresponding to the longitudinal acceleration DFR is determined in step S430. Then, in step S431, the final distribution ratio KF is calculated in step S431 from an equation:

$$KF = \frac{KB \times K0}{0.5}$$

where the numerator 0.5 is arranged for the purpose of normalizing the contribution of the correction KO to KF. In step S432, the engine torque Ps is obtained in accordance with the engine boost pressure B, the throttle open degree $\theta t$ or the accelerator open degree $\theta a$.

In step S433, the rear distribution ratio KF is compared with 0.5. If decision is made that KF is smaller than 0.5, the torque distribution flag is set to "1" in step S435. Then, KF is adjusted to a larger value than 0.5 by calculating KF=1−KF in step S 436. On the other hand, decision is made that KF is greater equal to 0.5 in step S433, the torque distribution flag F0 is set "0" in step S434. KF which was adjusted in step S436 will be restored into the original value in step S501 of FIG. 14.

Thus, the each of the parameters (the rear wheel torque distribution ratio KF and the right wheel torque distribution ratio Y) for the torque split control is properly determined in accordance with the result of the determination whether or not the vehicle is being turned or in accordance with the result of the determination of the fact that the vehicle starts the turning, is during the turning or the final stage of the turning.

Slip Control, Torque Split Control

Then, the actual control process of the slip control and the torque split control conducted in accordance with the various parameters thus determined will be described with reference to the control procedures in steps S407 to S416 shown in FIG. 13 and FIGS. 15 to 19.

Figure 18:
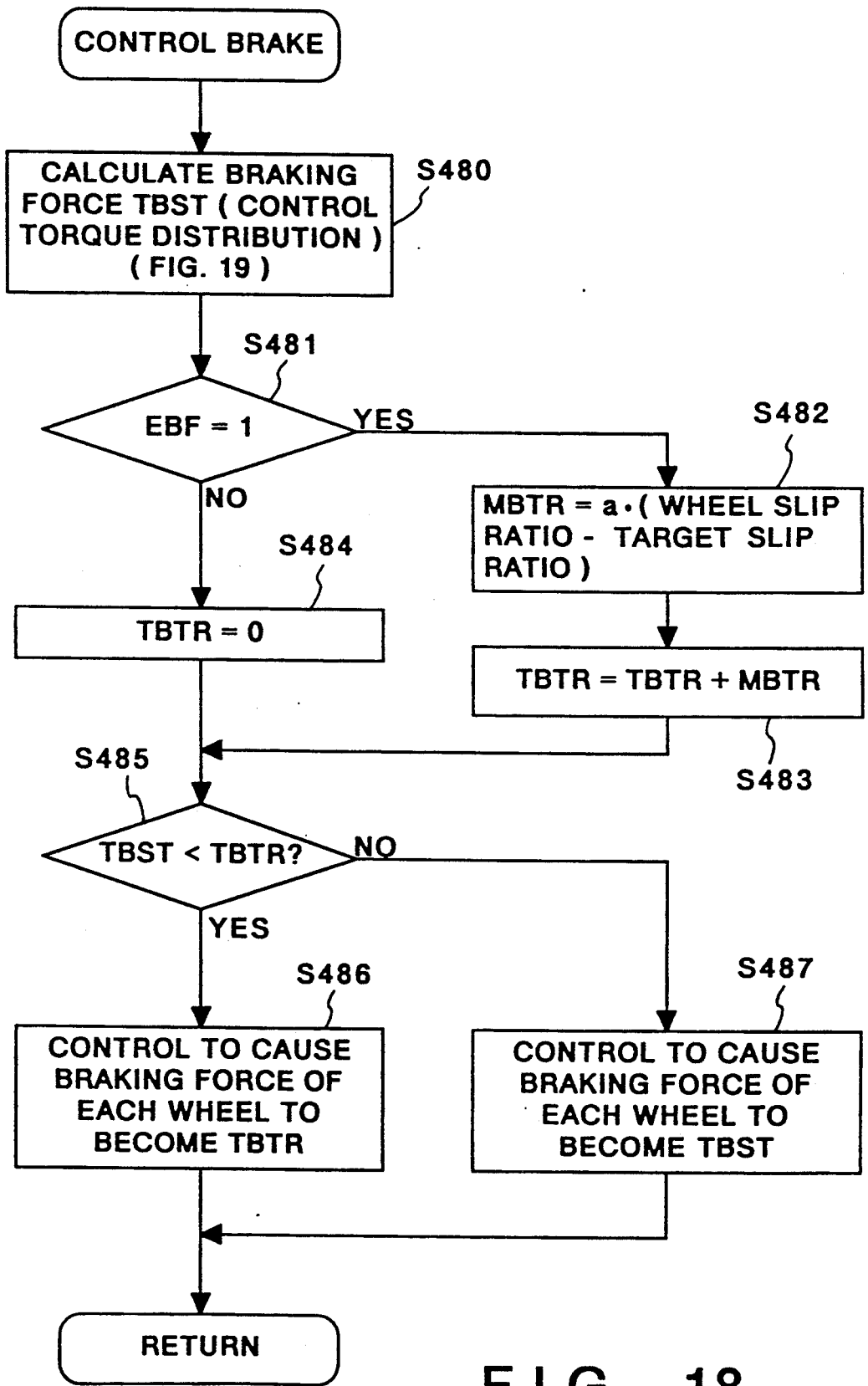
FIG. 18 is a flow chart of the sub-routine of the brake control according to the second embodiment.
Figure 19:
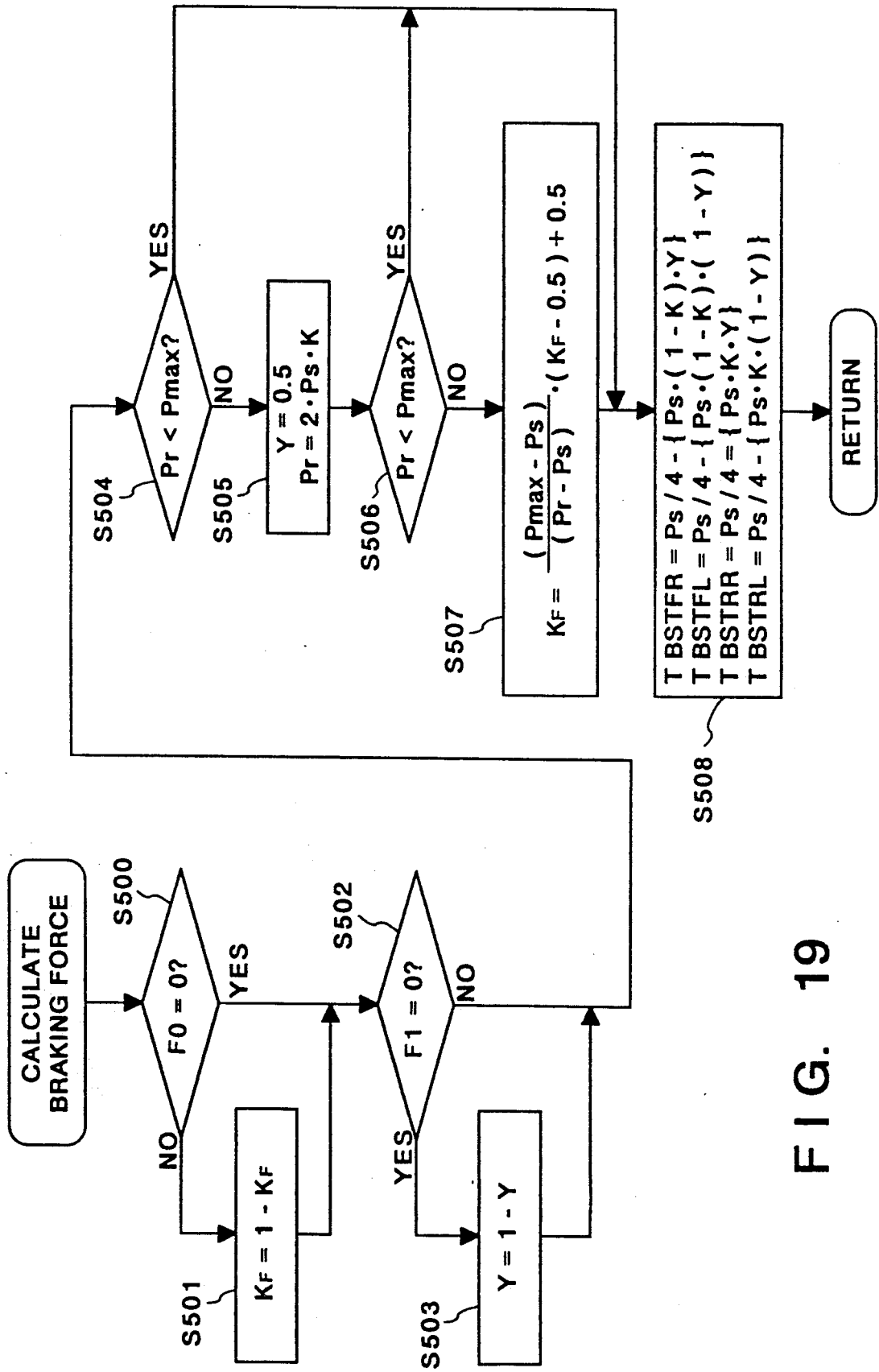
FIG. 19 is a flow chart of the sub-routine in the calculation of braking force according to the second embodiment.

As described above, each of the torque split control and the slip control according to the present invention comprises the engine torque control (the throttle control) and the brake control. The engine torque control for the torque split control and the slip control is executed in step S415 shown in FIG. 13. The details of step S415 are shown in FIG. 17. Referring to FIG. 17, the engine torque control for the torque split control is conducted in steps S521 to S526. The engine torque control for the slip control is conducted in steps S527 to S532. On the other hand, the brake control for the torque split control and the slip control is conducted in step S416 shown in FIG. 13. The details of this control are shown in FIG. 18. Referring to FIG. 18, the brake control for the torque split control is conducted in step S480 (the details of which are shown in FIG. 19). The brake control for the slip control is conducted in steps S481 to S484. Table 3 shows the relationships between the above-described controls.

TABLE 3

| Torque split control | Engine torque control | Step S521 to Step S526 |
|---|---|---|
|  | Brake control | Step S480 and FIG. 19 |
| Slip Control | Engine torque control | Step S527 to Step S532 |
|  | Brake control | Step S481 to Step S484 |

In steps S407 to S414 shown in FIG. 13, the parameters (which are determined prior to step S406) for use in the engine torque control and the brake control for each of the torque split control and the slip control are modified so as to correspond to the generations of the above-described two interference states. The control for overcoming the first interference condition is shown in the flow chart shown in FIG. 16. The control for overcoming the second interference condition is shown in the flow chart shown in FIG. 15. Tables 4 and 5 shows the above-described two interference conditions in detail and the controls for overcoming these interference conditions are briefly described.

TABLE 4

| (when the torue split control must be conducted during the slip control) | |
|---|---|
| Condition | Control for Overcoming |
| ETF = 0 (only the brake control is conducted | (a) when torque to be applied to the "wheel which is subjected to the slip control" is less than ¼ |

TABLE 4-continued

| (when the torue split control must be conducted during the slip control) | |
|---|---|
| Condition | Control for Overcoming |
| as the slip control) | of the overall torque, the torque split control is executed (if NO in step S461 or the like) (b) when torque to be applied to at one of the wheels which is subjected to the slip control exceeds ¼ of the overall torque, the torque split control is stopped (if in step S462 or the like, KF = Y = 0.5) |
| ETF = 1 (during the engine torque control) | (c) the torque split control is stopped (if in step S413, KF = Y = 0.5) |

TABLE 5

| (when the slip control must be conducted during the torque split control) | |
|---|---|
| Condition | Control for Overcoming |
| When torque of wheel which is being subjected to slip control is less than ¼ of overall torque | (a) when ETF = 0, the torque split control is continued. (b) when ETF = 1, the torque split control is stopped (if KF = Y = 0.5 in step S413) |
| When torque of the wheel which is being subjected to the slip control exceeds ¼ of overall torque | (c) the torque split control is stopped. (if KF = Y = 0.5 in step S462 or the like) |

Furthermore, steps S407 to S416 will be described in detail with reference to the drawings.

First, it is determined in step S407 whether or not the torque split control must be conducted. This can be recognized upon a fact determined whether both the rear wheel torque distribution ratio KF and the right wheel torque distribution ratio $\gamma$ are 0.5. If it is determined that KF=Y=0.5, the flow advances to step S415. In step S415, the engine torque control which is shown in detail in FIG. 17.

In the case where there is not necessary for the torque split control to be conducted Then, the engine torque control shown in FIG. 17 will be described by making a description about a case in which it is not necessary for the torque split control to be conducted. First in step S520 shown in FIG. 17, it is determined whether or not the throttle control execution flag ETF is zero. The case, in which ETF=0, that is, there is not necessary for the throttle control for the slip control to be conducted, will be described. The case where ETF=0 is the case where, for example, the number of the slipped wheel is one as shown in FIG. 2A. In this case, the flow advances to step S521 in which the driver's desire torque Ps is calculated, where Ps is the engine torque corresponding to the accelerator open degree $\theta$s or the boost pressure B. Then, in step S522, torque Pr which is necessary for making the determination for the torque distribution is calculated.

$$Pr = 4 \cdot Ps \cdot KF \cdot Y$$

In the case where no torque split control is conducted KF=Y=0.5, PR=Ps. When the torque split control is substantially conducted (when KF≠0.5, Y≠0.5), $Pr = 4 \cdot Ps \cdot KF \cdot Y$ denotes the maximum torque which is necessary to conduct the torque split control and the slip control.

Then, in step S523, torque Pr which is necessary for the engine and the maximum torque Pmax which is the largest torque which can be generated by the engine are subjected to a comparison in terms of their levels. If it is determined that Pr is less than Pmax (Pr<Pmax), there is a marginal torque in the engine. Therefore, the throttle open degree, at which the torque corresponding to Pr is generated, is calculated in step S525. If the required torque Pr is the same or larger than Pmax (Pr≦Pmax), it is impossible for the engine to conduct an output exceeding Pmax, the flow advances to step S524 in which Pr is replaced by Pmax. Then, in step S525, the throttle open degree, at which the torque corresponding to Pr is generated, is calculated. In step S526, the control signal Ct which corresponds to the thus calculated open degree is transmitted to the throttle actuator 13.

Then, a case in which the engine torque control for the slip control is conducted (ETF=1) in step S520 will be described. This case is a case in which, for example, only the front right and the front left wheels have slipped. In this state, the flow advances to step S527, it is determined whether or not the target throttle slip ratio TGTR is zero. The case in which the target throttle slip ratio TGTR is zero is a case in which the four wheels have slipped as shown in FIG. 2A. If it is determined that TGTR is zero, the flow advances to step S528 in which the throttle valve is fully closed. If it is determined that TGTR is not zero, the flow advances to step S530 in which the average value SAV of the slip ratios of the wheels is calculated. For example, in a case where the front left wheel and the front right wheel slip, it can be obtained from the following equation:

$$SAV = \frac{1}{2} \left( \frac{VFLn - Vn}{VFLn} + \frac{VFRn - Vn}{VFRn} \right)$$

Then, the deviation ΔS between the thus obtained average slip ratio SAV and the target slip ratio TGTR in the throttle control is calculated in step S531 from the following equation:

$$\Delta S = TGTR - SAV$$

Then, in step S532, the throttle valve control signal Ct which corresponds to the thus calculated ΔS is supplied to the actuator 13. When the control signal Ct is transmitted to the actuator 13, the opening of the throttle control valve is controlled by the degree so as to correspond to the signal Ct. As a result, the engine torque is reduced, and the slip ratio of the wheels is controlled.

As described above, the engine torque control (which is shown in FIG. 17) is conducted. That is, the engine torque control for the torque split control is conducted in steps S521 to S526, while the engine torque control for the slip control is conducted in steps S527 to S532.

Returning to the description with reference to the flow chart shown in FIG. 13, when the torque control in step S415 has been ended, the flow advances to step S416 in which the brake control is conducted. The details of this brake control is shown in FIG. 18. First, in step S480, the braking torque TBST (TBSTFR, TBSTFL, TBSTRR and TBSTRL) for the torque split control for each of the wheels is calculated. The calculation routine for obtaining TBST is shown in FIG. 19 in detail.

Each of the procedures in steps S500 to S503 shown in FIG. 19 is employed for the purpose of defining the braking force (torque) for the torque split control to be applied to each of the wheels by the following equations in step S508:

$$TBSTFR = \frac{Ps}{4} - \{Ps \cdot (1 - KF) \cdot Y\}$$
$$TBSTFL = \frac{Ps}{4} - \{Ps \cdot (1 - KF) \cdot (1 - Y)\}$$
$$TBSTRR = \frac{Ps}{4} - \{Ps \cdot KF \cdot Y\}$$
$$TBSTRL = \frac{Ps}{4} - \{Ps \cdot KF \cdot (1 - Y)\}$$

The first term ¼ Ps on the right side of each of the equations denotes torque when the driver's desired torque (request) Ps is equally distributed to each of the wheels. The second term denotes the torque distributed to each of the wheels in accordance with the parameter KF and Y determined by the parameter determining routine shown in FIG. 14. The braking force TBST to be applied to each of the wheels for the purpose of conducting the torque split control is calculated from the above-described equations by subtracting the second term from the first term.

The torque distribution ratios KF and Y are modified so as to correctly express the distribution ratios with respect to the front/rear and turning directions in steps S500 to S503 shown in FIG. 19

The braking force for the torque split control is determined in the procedures from step S504 in accordance with the thus modified torque distribution ratios.

That is, in step S504, it is confirmed that the torque Pr required for the engine in the present driving is smaller than the maximum torque Pmax which can be the largest torque generated by the engine, that is, it is confirmed that a torque increase control can be conducted. In the case where Pr<Pmax, that is, there is a marginal engine output, the flow advances to step S508 in which TBSTFR, TBSTFL, TBSTRR and TBSTRL are calculated.

If it is determined in step S501 that Pr>Pmax, the flow advances to step S505. In order to uniform the torque distribution between the right wheel and the left wheel, the distribution ratio Y is set to Y=0.5 and the engine desired torque Pr=2·Ps·K at this time is calculated. Then, in step S506, it is again determined whether or not the engine desired torque Pr is smaller than the maximum engine torque Pmax when the right and left distribution ratio has been uniformed, that is, it is determined whether or not the Pr has been reduced due to the above-described change in the distribution ratio.

If it is determined in step S506 to be NO, that is, if it is determined that the engine desired torque Pr cannot be reduced to be smaller than the maximum torque Pmax after the torque distribution to the right and the left wheels has been uniformed, the flow advances to step S607 in which the following calculation is conducted:

$$KF = \frac{PMAX - Ps}{Pr - Ps} (KF - 0.5) + 0.5$$

The equation express the fact that the distribution ratio KF is reduced by 0.5 in accordance with the ratio between the difference (Pr−Ps) between the engine desired torque Pr and the generated torque Ps and the difference (Pmax−Ps) between the maximum torque Pmax and the engine torque Ps.

Returning to the description with reference to FIG. 18, the flow advances to step S481 after the calculation of the braking force in step S480 has been ended. In steps S481 to S484, the braking force TBTR (TBTRFL, TBTRFR, TBTRRL, TBTRRR) for the slip control is calculateed. Then, steps S481 to 484 will be described.

In step S481, it is determined in accordance with the value of the flag EBF whether or not the brake control for the slip control must be conducted. If it is determined that the brake control is not conducted (EBF=0), the flow advances to step S484 in which the following settings are made:
TBTRFL=0, TBTRFR=0,
TBTRRL=0, TBTRRR=0

When the brake control is conducted (EBF=0), the flow advances to step S482 in which the correction value MBTR is calculated. That is, assuming that a is a predetermined constant, the following relationships hold:
MBTRFL=a·(SFL−TGBR)
MBTRFR=a·(SFR−TGBR)
MBTRRL=a·(SRL−TGBR)
MBTRRR=a·(SRR−TGBR)

In step S483, the braking force TBTR is updated as follows:
TBTRFL=TBTRFL+MBTRFL
TBTRFR=TBTRFR+MBTRFR
TBTRRL=TBTRRL+MBTRRL
TBTRRR=TBTRRR+MBTRRR Thus, the braking force TBTR for the slip control is calculated.

Then, the flow advances to step S485 in which a comparison between the braking force TBST for the torque split control and the braking force TBTR for the slip control is made. If TBST<TBTR, the flow advances to step S486 in which the brake control is conducted in order to make the braking force for each of the wheels becomes the obtained value TBTR taking preference of the slip control. If it is determined that TBST>TBTR, the control is conducted in such a manner that the torque split control is taken preference and the braking force for each of the wheels becomes TBST.

In step S485, the comparison between TBST and TBTR is conducted for each of the wheels. As a result, there is a possibility that the brake control for the torque split control is conducted for either of the wheel while the other wheel is subjected to the brake control for the slip control. For example, if it is determined for the front right wheel to be:
TBSTFR>TBTRFR
it is subjected to the brake control for the torque split control, while the rear right wheel is determined to be:
TBSTRR<TBTRRR
so that it is subjected to the brake control for the slip control.

When only torque split control is executed

When only the torque split control is executed, the slipped wheel counter SN is zero and the brake control and the torque control for the slip control are not conducted. Therefore, ETF=EBF=0. Furthermore, the relationship KF ≠0.5 and/or Y≠0.5 are held corresponding to the non-uniform load distribution applied to each of the wheels. Therefore, when the flow advances to step S407 after the various parameters have been determined in steps S404 and S406, determination NO is made. Then, in step S408, it is determined whether or not the relationship SN>SNT holds is determined for the purpose of examining whether or not the number of the slipped wheels increases, where SNT represents a register for temporarily comparing the number of the slipped wheels when the number of the slipped wheels is being increased. In steps S409 to S411, the generation of the second interference state is detected. Since it has been assumed that no slip has been taken place, determination NO is made in step S408 and the flow does not advance to step S409. The flow advances from step S411 to step S412. Since it has been assumed that ETF=0, the flow advances to step S412 in which determination YES is made. Then, a determination routine (see FIG. 16) in which whether or not the torque distribution in step S414 is stopped is executed.

Figure 16:
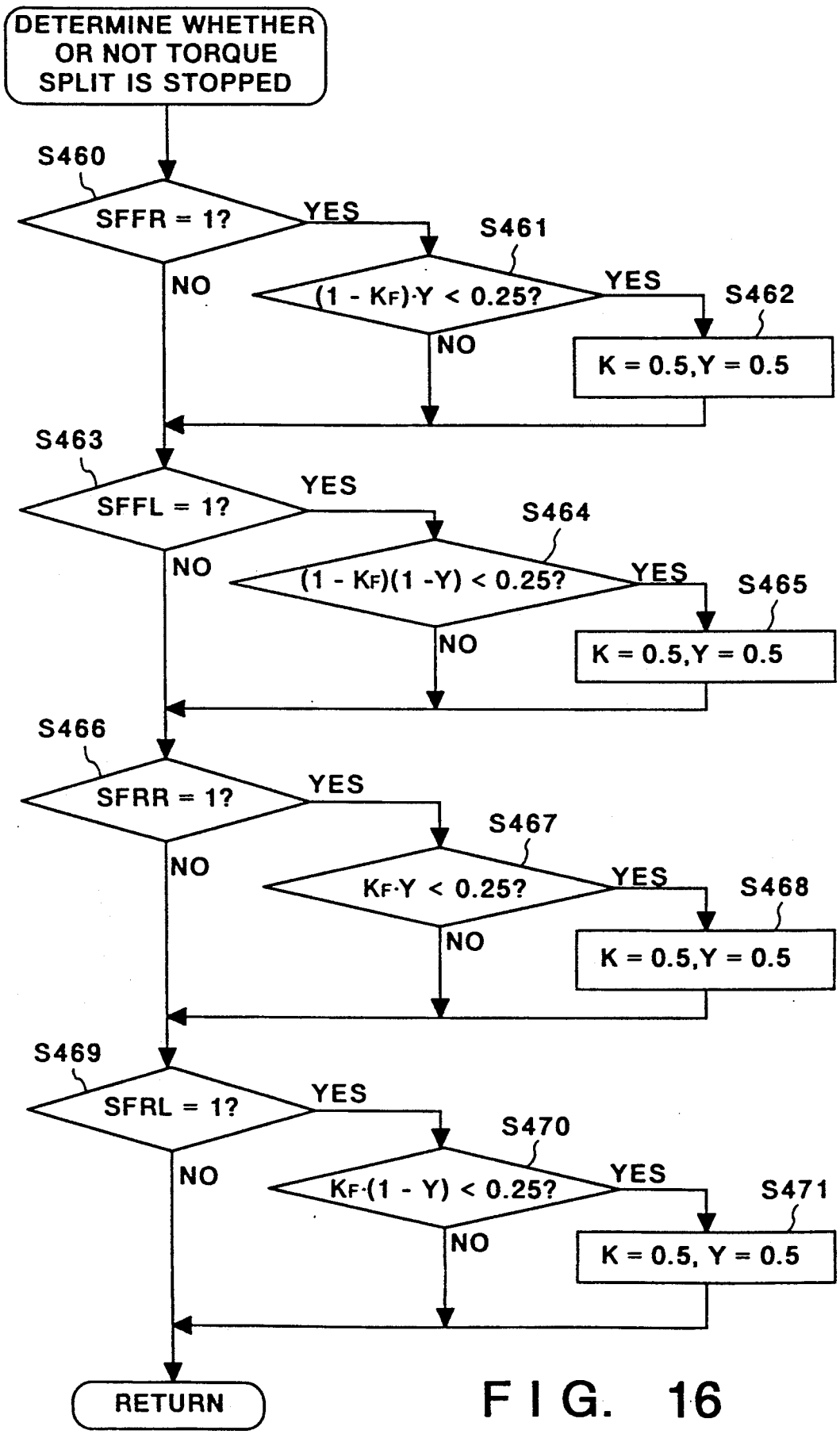
FIG. 16 is a flow chart in the sub-routine in the operations for determining whether or not the torque distribution is stopped according to the second embodiment.

In the control procedure in FIG. 16, since the slip determination flag (SFFR or the like) is zero, no actual processing is conducted in this sub-routine. The flow returns to steps S415 and S416 shown in FIG. 13 in which the processing in these steps are successively conducted. That is, in the engine torque control shown in FIG. 17, the steps S521 to S526 are executed. In step S480 shown in FIG. 18, the braking force for the torque split control is calculated. On the other hand, since EBF=0, TBTR=0 in step S484. Therefore, the brake control for the torque split control is conducted in step S487.

When the second interference state is generated

In order to make the description easier, the case in which the second interference state has been generated will be first described.

As described with reference to FIG. 12B, the second interference state is a state in which there is a necessity of determining whether or not the slip control may be executed with the torque split control stopped immediately when the slipped wheel is detected during the torque split control.

For example, it is assumed that the front left wheel and the rear left wheel which are positioned outside have slipped during the right turn.

In this case, the parameters have been determined in steps S402, S404 and S406 shown in FIG. 13 as follows:
SFFL=SFRL=1
SFFR=SFRR=0
SN=2
EBF=ETF=1
TGTR=TG2 ×γ
TGBR=TG1

Furthermore, for example, the parameters showing the fact that the vehicle is being turned right have been determined in step S406 (see FIG. 14) as follows:
KF=0, Y=0.3
F1=0.

Furthermore, the following results have been obtained from the torque split control (step S580 shown in FIG. 19):
TBSTFR=TBSTRR=0.1 Ps
TBSTFL=TBSTRL=−0.1 Ps Since the torque split control is being conducted, determination NO is made in step S407. Furthermore, since SN>SNT, determination YES is made in step S408. Then, the flow advances to step S409 in which SNT is updated. Then, in step S410, the slip flag redetermination routine in step S410 is conducted (see FIG. 15).

Figure 15:
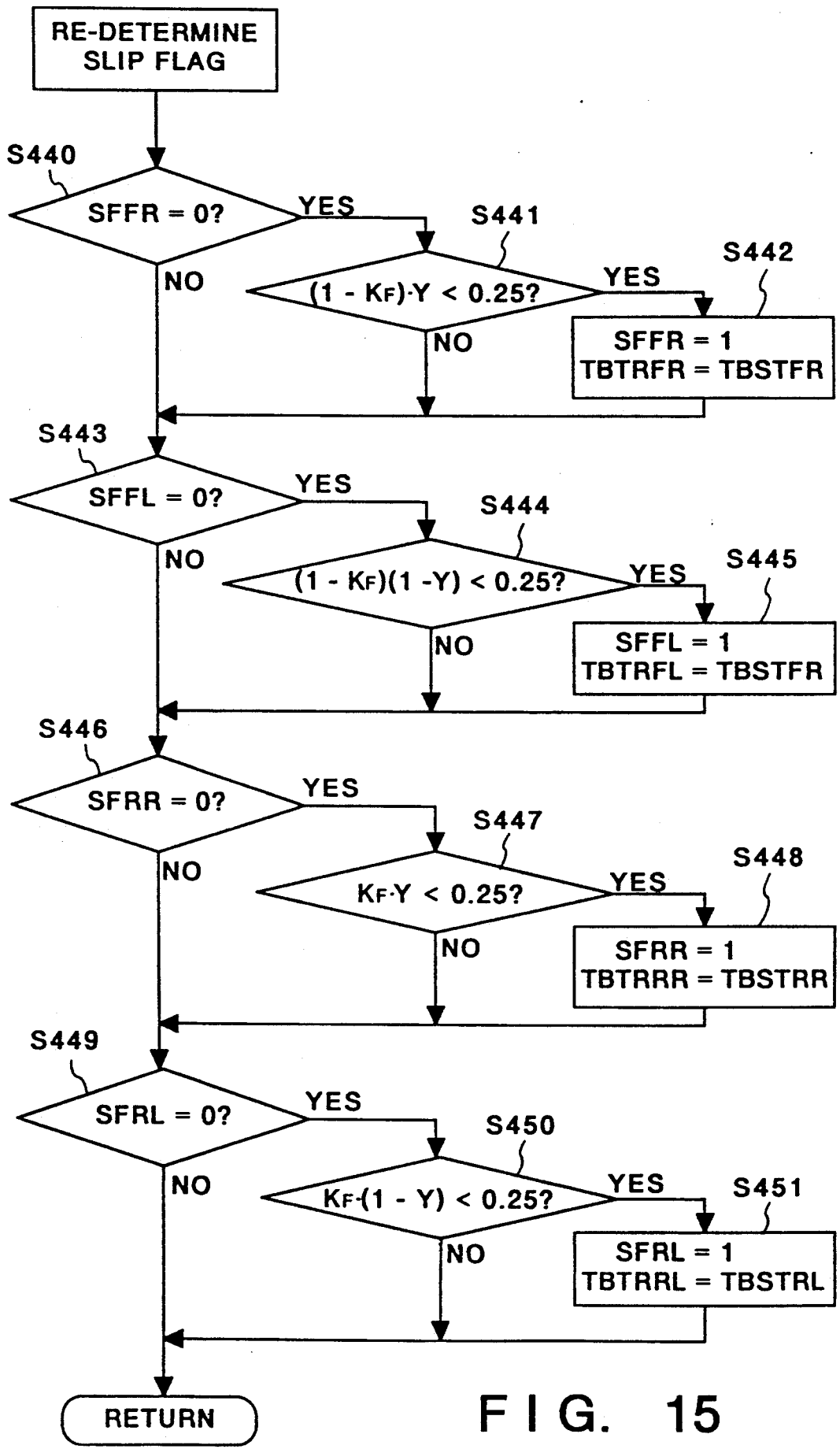
FIG. 15 is a flow chart of the sub-routine in the operations for re-determining a slip flag according to the second embodiment.

Since SFFR=SFRR=0, there are two right wheels which can be subjected to the parameter determination change in steps S440 to S451 shown in FIG. 15. That is, as for the front right wheel, the flow advances from step S440 to step S441 in which the following calculation is conducted:

(1−KF)·Y=0.15

Then, determination YES is made in step S441. In step S442, the following is executed:

SFFR=1,
TBTRFR=TBSTFR=0.1 Ps

In step S442, the wheel which does not slip is assumed to be slipped and braking force TBSTFR to be applied to the front right wheel for the torque split control is assumed to be braking force TBTRFR to be applied to the wheel for the slip control. The rear right wheel which does not slip is subjected to the same operation n steps S447 and S448.

When each of the wheels slips during the torque split control, a wheel to which torque smaller than 25% of the engine output is distributed due to the torque split control is detected. Then, the wheel thus detected is changed in its braking force TBST for the torque split control which has been determined in a previous cycle is replaced by braking force for the slip control. The slip flag re-determining routine is thus conducted in step S410.

After the calculations in step S410 have been ended, the flow advances to step S412 in which it is examined whether or not the engine torque control for the slip control must be conducted (ETF=1).

According to this example, the case, in which, for example, the front left wheel and the rear left wheel have slipped and the engine torque control and the brake control must be simultaneously conducted for the slip control, is assumed. Therefore, since the relationship ETF=1 holds, the flow advances from step S412 to S413 in which the torque split control is stopped by making KF=Y=0.5. That is, TBST obtained in step S508 becomes zero by making KF=Y=0.5. Thus, as shown in Table 5, when slip takes place during the torque split control, the slip control is conducted by making the wheel, to which torque of 25% of the overall torque is applied, is changed in its braking force as follows:

TBTR=TBST

If the engine torque control is being conducted (ETF=1), the toque split control is forcibly stopped (step S413). As a result of the control thus conducted, the wheel, to which torque of 25% of the overall torque is applied, is subjected to the slip control regardless of the fact whether or not the wheel thus subjected to the slip control actually slips. Therefore, a rapid increase in torque applied to the wheel is prevented and the wheel is prevented from novel slip. The contents of (b) shown in Table 5 are conducted as described above. In the case where the inner wheels in the turning of the vehicle slip, the interposing of the slip control and the torque split control can cause an excessive yaw moment.

Item (a) shown in Table 5 will be described with reference to a case in which only one wheel slips during the torque split control. As is shown from Table shown in FIG. 2A, when only one wheel slips, only the brake control is conducted (EBF=1) for the slip control and no engine torque control is conducted (ETF=0). In this case, the flow advances to step S410 (see FIG. 15), the slip flag (SFFR or the like) is set for the wheel to which torque less than 25% is distributed and TBTR of which is caused to be TBST regardless of the fact that the wheel slips actually. The wheel which is being subjected to the slip control is subjected to the brake control (step S485 shown in FIG. 18) of a larger braking force selected from the brake control for the slip control and the brake control or the torque split control. The description "the wheel which is subjected to the slip control" shown in Table 5 is a wheel from which slip is first detected and a wheel to which the slip flag has been forcibly set. That is, the torque split control is continued. The control thus conducted is the content of (a) shown in Table 5.

Item (c) shown in Table 5 means the following: when no engine torque control is conducted (ETF=0) for the slip control, that is, when only the brake control is conducted, the flow advances to step S414 shown in FIG. 16 in which the slip flag is set for one of the four wheels. Furthermore, when engine torque applied to the wheel exceeds 25%, the torque split control is stopped. However, if the torque split control is stopped in (c) shown in Table 5 since there is one or more wheels to which torque exceeding 25% is applied, the braking force for the slip control is retained because the wheel which is subjected to the slip control is arranged to be:

TBTR=the previous TBST and it is arranged that TBTR=0 in step S508.

Generation of first interference state

The first interference state is a state in which the torque split control is stopped when the slipped wheel is subjected to the slip control during the torque split control and simultaneously, torque to be applied to the slipped wheel is increased. The stop of the torque split control is classified into the two modes (b) and (c) as shown in Table 4.

An example of the control (b) shown in Table 4 is shown in FIG. 20B. When only the brake control is conducted as the slip control and is applied to only the front left wheel FL (ETF=0) and there is a possibility that torque, applied to at least one of the wheels which is subjected to the slip control, exceeds 25%, the torque split control is stopped. Since the wheel which is subjected to the slip control is being slipped or has a possibility to be slipped, the torque split control is stopped for the purpose of quickly stop the state of slip if there is a possibility that torque exceeding 25% is applied to the wheel, the torque split control being stopped even if the engine torque control is not conducted (ETF=0).

In order to clarify the wheel which is subjected to the slip control, the wheel is illustrated in the form of a hatching section in FIG. 20. The rear left wheel RL shown in FIGS. 20A and 20B is the wheel which has been forcibly determined to be the slipped wheel in the slip flag redetermining routine shown in FIG. 15.

The item (c) shown in the table corresponding to FIG. 20C in which the torque split control is completely stopped when the engine torque control is being conducted In the slip control regardless of the torque distribution ratio determined by the torque split control.

The control shown in item (a) shown in Table 4 corresponds to FIG. 20A, in which, the torque split control is executed at the request when the torque split control becomes necessary during the slip control. This case is a case in which torque, applied to all of the wheels which are subjected to the slip control, is less than 25%.

According to an example shown in FIG. 20A, torque, to be applied to the wheels (FL and RL) which are subjected to the slip control, is less than 25%. In this case, since there is no fear of a novel slip or enlarging the degree of the slip, the torque split control is conducted. According to the control shown in item (a) shown in Table 4, since there is considered to be no fear of a problem in terms of the slip even if torque exceeding 25% is applied to a wheel which is other than the wheel which is subjected to the slip control, the torque split control is executed at the request.

The essential step numbers for the controls (a), (b) and (c) are shown in Table 4.

In the control mode shown in item (a) shown in Table 4 in which the torque split control is conducted, the following setting is conducted in step S442 or the like to the wheel which has been forcibly determined to be the slipped wheel according to the control shown in FIG. 15:

TBTR=TBST

As a result, both the brake control for the slip control and the brake control for the torque split are present in the control mode shown in item (a). However, a brake control of a larger braking force is selected from TBTR and TBST in step S485 shown in FIG. 18.

Modification

The present invention can, of course, be variously modified within the scope of the thesis thereof.

According to the first and the second embodiments, means for varying the braking force of each of the disc brakes 35A to 35D is employed for the purpose of controlling the torque distribution. However, means for the same purpose is not limited to this description. For example, a friction clutch may, of course, be provided for each of the portions of the right and left output shafts of the front and the rear differential mechanisms 25 and 27 and the portions of the propeller shafts 24 and 26 so that the clamping force is independently controlled for varying the braking force.

As this invention may be embodied in several forms without departing from the spirit of essential characteristics thereof, the present embodiment is therefore illustrative and not restrictive, since the scope of the invention is defined by the appended claims rather than by the description preceding them, and all changed that fall within meets and bounds of the claims, or equivalence of such meets and bounds are therefore intended to embraced by the claims.

What is claimed is:

1. A power train control apparatus for totally controlling the transmission of engine output torque to vehicle wheels, comprising:

torque distribution means for independently distributing said engine output torque to each of said wheels with controlling the quantity of torque to be distributed;

slip control means for detecting a slipped state of each of said wheels and controlling the torque distributed to thus detected slipped wheel so as to reduce the slip level below a predetermined level;

determination means for determining whether or not torque, to be transmitted to a wheel which is subjected to the control of said slip control means, is to be increased when said torque distribution means further will act on said wheel; and torque restricting means, arranged to receive an output from said determination means indicating that torque to be transmitted to said wheel which is subjected to the control of said slip control means is increased, for controlling at least one of said slip control means and said torque distribution means so as to reduce torque to be transmitted to at least said wheel, whereby torque to be transmitted to said wheel is restricted.

2. The apparatus according to claim 1, wherein said apparatus further comprises brake means for independently braking said wheels;

said torque distribution means comprises:

detection means for detecting accelerations in a plurality of directions of the car body;

distribution ratio calculating means for calculating a torque distribution ratio for each of said wheels in accordance with said accelerations thus detected;

first braking-force controlling means for controlling said brake means by independently calculating, in accordance with said distribution ratio, a first brake control signal which controls the braking force to be applied to each of said wheels; and first engine-output control means for controlling the output from the engine by calculating and outputting a first output control signal to the engine for the purpose of compensating loss in engine output caused by said braking force, and said slip control means comprises:

braking slip ratio calculating means for calculating a target braking slip ratio in accordance with an actual slip ratio of each of said wheels;

second braking force controlling means for controlling said brake means by calculating a second brake control signal which controls the braking force of each of said wheels in accordance with said target braking slip ratio; and, second engine-output control means for controlling the engine output by calculating and outputting a second engine-output control signal to said engine for the purpose of reducing the engine output for said slip control.

3. The apparatus according to claim 2, wherein said determination means determines whether or not torque to be transmitted to said wheel on which said slip control means acts will be increased by an action of said torque distribution means, said determination means determining it in accordance with said first and said second brake control signals and said first and said second engine-output control signals.

4. The apparatus according to claim 2, wherein when the vehicle is a four wheel drive vehicle, said determination means determines whether the torque transmitted to a wheel on which said slip control means acts has been increased by detecting whether the torque transmitted to said wheel exceeds 25% of the engine output.

5. The apparatus according to claim 2, wherein said slip control means further comprises:

first slipped wheel detection means for detecting the number and the positions of slipped wheels; and first enabling/disabling means for enabling or disabling said second engine-output control means in accordance with said number and said positions of said slipped wheels thus detected, whereby, when said first enabling/disabling means enables said second engine-output control means, said determination means responsively determines that the torque to be transmitted to said slipped wheel is increased, and said torque restricting means stops said torque distribution means in response to determination made by said determination means.

6. The apparatus according to claim 2, wherein said slip control means further comprises:
second slipped wheel detection means for detecting the number and the positions of slipped wheels; and
second enabling/disabling means for enabling or disabling said second engine-output control means in accordance with said number and said positions of said slipped wheels thus detected, whereby said torque restricting means is stopped when said second enabling/disabling means disables said second engine-output control means and the torque to be transmitted to all of the wheels, which are subjected to the control of said slip control means, is 25% or less of overall engine output.

7. The apparatus according to claim 2, wherein said slip control means further comprises:
third slipped wheel detection means for detecting the number and the positions of slipped wheels; and
third enabling/disabling means for enabling or disabling said second engine-output control means in accordance with said number and said positions of said slipped wheels thus detected, whereby said torque restricting means is stopped when said third enabling/disabling means disables said second engine-output control means and the torque to be transmitted to any one of the wheels which are subjected to said slip control is 25% or less of overall engine output.

8. A power train control apparatus for totally controlling a transmission of engine output torque to vehicle wheels, comprising:
torque distribution means for independently distributing said engine output torque to each of said wheels with controlling the quantity of torque to be distributed;
slip control means for controlling slip of said wheels so as to reduce said slip below a predetermined level;
first detection means for detecting a wheel which is subjected to a slip control performed by said slip control means;
second detection means, arranged to receive an output from said first detection means, for detecting a fact that said slip control is applied to said wheel which is subjected to said slip control when said torque distribution means is being operated; and
restricting means, arranged to receive an output from said second detection means, for restricting increase in torque to be applied to said wheel which is subjected to said slip control when torque to be distributed to said wheel which is subjected to said slip control exceeds a predetermined level.

9. The apparatus according to claim 8, wherein said wheel which is subjected to said slip control is defined to include a wheel which is being slipped actually and a wheel to which a quantity of torque distribution below a predetermined level is distributed by said torque distribution means.

10. The apparatus according to claim 9, wherein said apparatus comprises brake means for independently braking said wheels, said torque distribution means comprises:
acceleration detection means for detecting acceleration in a plurality of directions of a car body;
distribution ratio calculating means for calculating a torque distribution ratio for each of said wheels in accordance with said acceleration thus detected;
first braking-force control means for controlling said brake means by independently calculating a first brake control signal which controls braking force to be applied to each of said wheels; and
first engine-output control means for controlling the engine output by calculating and outputting a first engine-output control signal for the purpose of compensating the engine output loss due to said braking force; and
said slip control means comprises:
braking slip ratio calculating means for calculating a target braking slip ratio in accordance with an actual slip ratio of each of said wheels;
second braking force control means for controlling said brake means by calculating a second brake control signal which controls the braking force to be applied to each of said wheels in accordance with said target braking slip ratio; and
second engine-output control means for controlling the engine output by calculating and outputting a second engine-output control signal to said engine for the purpose of reducing the engine output for said slip control.

11. The apparatus according to claim 10, wherein, when said second engine-output control means is operated, said restricting means stops said torque distribution means, whereby the increase in torque to be applied to said wheel which is subjected to the control of said slip control means is restricted.

12. The apparatus according to claim 10, wherein said torque distribution means is stopped when torque distributed to said wheel which is subjected to the control of said slip control means exceeds 25% of overall engine torque.

13. The apparatus according to claim 10, wherein the operation of said torque distribution means is continued when said second engine-output control means is not operated.

* * * * *

UNITED STATES PATENT AND TRADEMARK OFFICE
CERTIFICATE OF CORRECTION

PATENT NO. : 5,041,978
DATED : August 20, 1991
INVENTOR(S) : Yasunari Nakayama et al.

It is certified that error appears in the above-identified patent and that said Letters Patent is hereby corrected as shown below:

Column 11, line 35:
"wheel" should be --wheels--;

Column 23, line 29:
after "speed" insert --estimating--;

Column 27, line 8:
"SN-0" should be --SN = 0--;

Column 28, line 68:
"SRR-" should be --SRR = --;

Column 35, Table 2, line 42:
"wheel" should be --wheels--;

Signed and Sealed this

Tenth Day of August, 1993

Attest:

MICHAEL K. KIRK

Attesting Officer

Acting Commissioner of Patents and Trademarks